US012585256B2

(12) United States Patent
Chauvet et al.

(10) Patent No.: US 12,585,256 B2
(45) Date of Patent: Mar. 24, 2026

(54) SOFTWARE DEFINED AUTOMATION SYSTEM AND ARCHITECTURE

(71) Applicant: Schneider Electric Industries SAS, Rueil-Malmaison (FR)

(72) Inventors: Antonio Chauvet, Carros (FR); Philippe Wilhelm, Andover, MA (US); Merrill Harriman, Andover, MA (US); Eric Alfano, Andover, MA (US); Alen Mehmedagic, Wilmington, MA (US); Andrew Lee David Kling, Salem, MA (US); David Doggett, Andover, MA (US); Vijay Vallala, Andover, MA (US); Philippe Nappey, Grenoble (FR)

(73) Assignee: Schneider Electric Industries SAS, Rueil-Malmasion (FR)

( * ) Notice: Subject to any disclaimer, the term of this patent is extended or adjusted under 35 U.S.C. 154(b) by 580 days.

(21) Appl. No.: 18/095,865

(22) Filed: Jan. 11, 2023

(65) Prior Publication Data

US 2023/0161332 A1 May 25, 2023

Related U.S. Application Data

(63) Continuation of application No. 15/700,443, filed on Sep. 11, 2017, now Pat. No. 11,579,595, which is a (Continued)

(51) Int. Cl.
G05B 19/418 (2006.01)
G06F 9/455 (2018.01)
(Continued)

(52) U.S. Cl.
CPC ....... G05B 19/4185 (2013.01); G05B 19/418 (2013.01); G06F 9/455 (2013.01); (Continued)

(58) Field of Classification Search
None
See application file for complete search history.

(56) References Cited

U.S. PATENT DOCUMENTS 6,830,658 B2 12/2004 Kumamoto et al.
7,058,712 B1 6/2006 Vasko et al.
(Continued)

FOREIGN PATENT DOCUMENTS

EP 2 293 164 A1 3/2011
EP 2 325 748 A1 5/2011
(Continued)

OTHER PUBLICATIONS

Nastic et al., "Provisioning Software-defined IoT Cloud Systems", 2014, IEEE Computer Society, 2014 International Conference on Future Internet of Things and Cloud, pp. 288-295. (Year: 2014).*
(Continued)

*Primary Examiner* — Qing Yuan Wu
(74) *Attorney, Agent, or Firm* — Kinney & Lange, P.A.

(57) ABSTRACT

Embodiments of a software defined automation system that provides a reference architecture for designing, managing and maintaining a highly available, scalable and flexible automation system. In some embodiments, an SDA system can include a localized subsystem including a system controller node and multiple compute nodes. The multiple compute nodes can be communicatively coupled to the system controller node via a first communication network. The system controller node can manage the multiple compute nodes and virtualization of a control system on a compute node via the first communication network. The virtualized control system includes virtualized control system elements connected to a virtual network that is connected to a second communication network to enable the virtualized control system elements to control a physical
(Continued)

control system element via the second communication network connected to the virtual network.

26 Claims, 41 Drawing Sheets

Related U.S. Application Data continuation of application No. PCT/IB2016/001609, filed on Oct. 12, 2016.

(60) Provisional application No. 62/406,932, filed on Oct. 11, 2016, provisional application No. 62/354,799, filed on Jun. 26, 2016, provisional application No. 62/354,683, filed on Jun. 24, 2016, provisional application No. 62/348,770, filed on Jun. 10, 2016, provisional application No. 62/241,028, filed on Oct. 13, 2015, provisional application No. 62/240,742, filed on Oct. 13, 2015.

(51) Int. Cl.
    *H04L 9/40*         (2022.01)
    *H04L 12/46*      (2006.01)
    *H04L 41/08*      (2022.01)
    *H04L 41/0806*    (2022.01)

(52) U.S. Cl.
    CPC ...... *G06F 9/45558* (2013.01); *H04L 12/4641* (2013.01); *H04L 41/08* (2013.01); *H04L 41/0806* (2013.01); *H04L 63/20* (2013.01); *G06F 2009/45595* (2013.01)

(56) References Cited

U.S. PATENT DOCUMENTS

| | | | |
|---|---|---|---|
| 7,151,966 | B1 | 12/2006 | Baier et al. |
| 8,954,780 | B1 | 2/2015 | Yalamanchili et al. |
| 9,292,312 | B2 | 3/2016 | Bealkowski et al. |
| 2011/0072506 | A1 | 3/2011 | Law et al. |
| 2014/0228978 | A1 | 8/2014 | Neubert et al. |
| 2015/0078200 | A1 | 3/2015 | Kalkunte et al. |
| 2015/0128052 | A1 | 5/2015 | Grehan et al. |
| 2015/0163151 | A1 | 6/2015 | Li |
| 2015/0188849 | A1 | 7/2015 | Richardson et al. |
| 2015/0236901 | A1 | 8/2015 | Nagashima |
| 2016/0065656 | A1 | 3/2016 | Patin et al. |
| 2016/0202684 | A1 | 7/2016 | Pauchet et al. |

FOREIGN PATENT DOCUMENTS

| | | |
|---|---|---|
| EP | 2 801 941 A1 | 11/2014 |
| EP | 2 801 942 A1 | 11/2014 |
| EP | 2 899 604 A1 | 7/2015 |
| EP | 2 924 575 A2 | 9/2015 |
| EP | 2 778 816 B1 | 10/2015 |
| EP | 2 790 101 B1 | 1/2016 |
| GB | 2 521 376 A | 6/2015 |
| WO | WO 201058241 | 5/2010 |
| WO | WO 2014207572 | 12/2014 |
| WO | WO 2015034458 | 3/2015 |
| WO | WO 2016032467 | 3/2016 |

OTHER PUBLICATIONS

Virtualization for Process Automation Systems, Rockwell Automation Publication, Dated Jan. 2013.

International Search Report and Written Opinion Corresponding to PCT Application No. PCT/IB2016/001609 Mailed Jan. 31, 2017, 12 Pages.

* cited by examiner

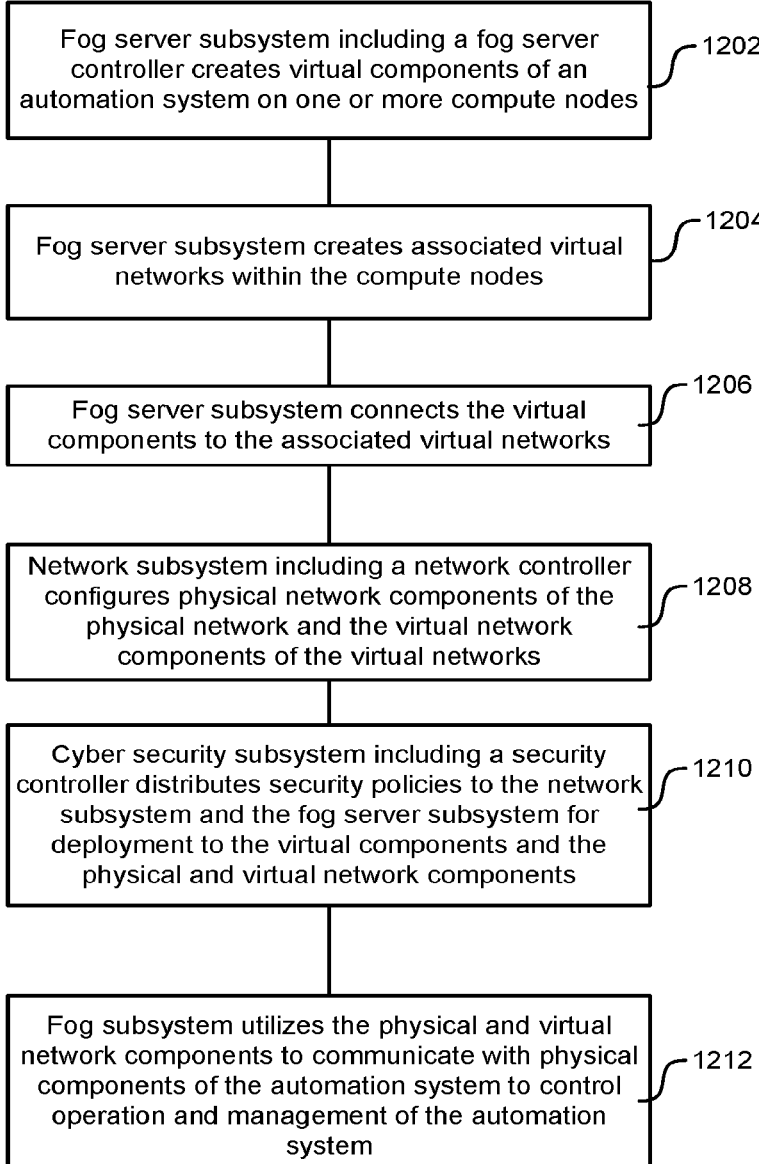

Fog server subsystem including a fog server controller creates virtual components of an automation system on one or more compute nodes — 1202

Fog server subsystem creates associated virtual networks within the compute nodes — 1204

Fog server subsystem connects the virtual components to the associated virtual networks — 1206

Network subsystem including a network controller configures physical network components of the physical network and the virtual network components of the virtual networks — 1208

Cyber security subsystem including a security controller distributes security policies to the network subsystem and the fog server subsystem for deployment to the virtual components and the physical and virtual network components — 1210

Fog subsystem utilizes the physical and virtual network components to communicate with physical components of the automation system to control operation and management of the automation system — 1212

FIG. 12

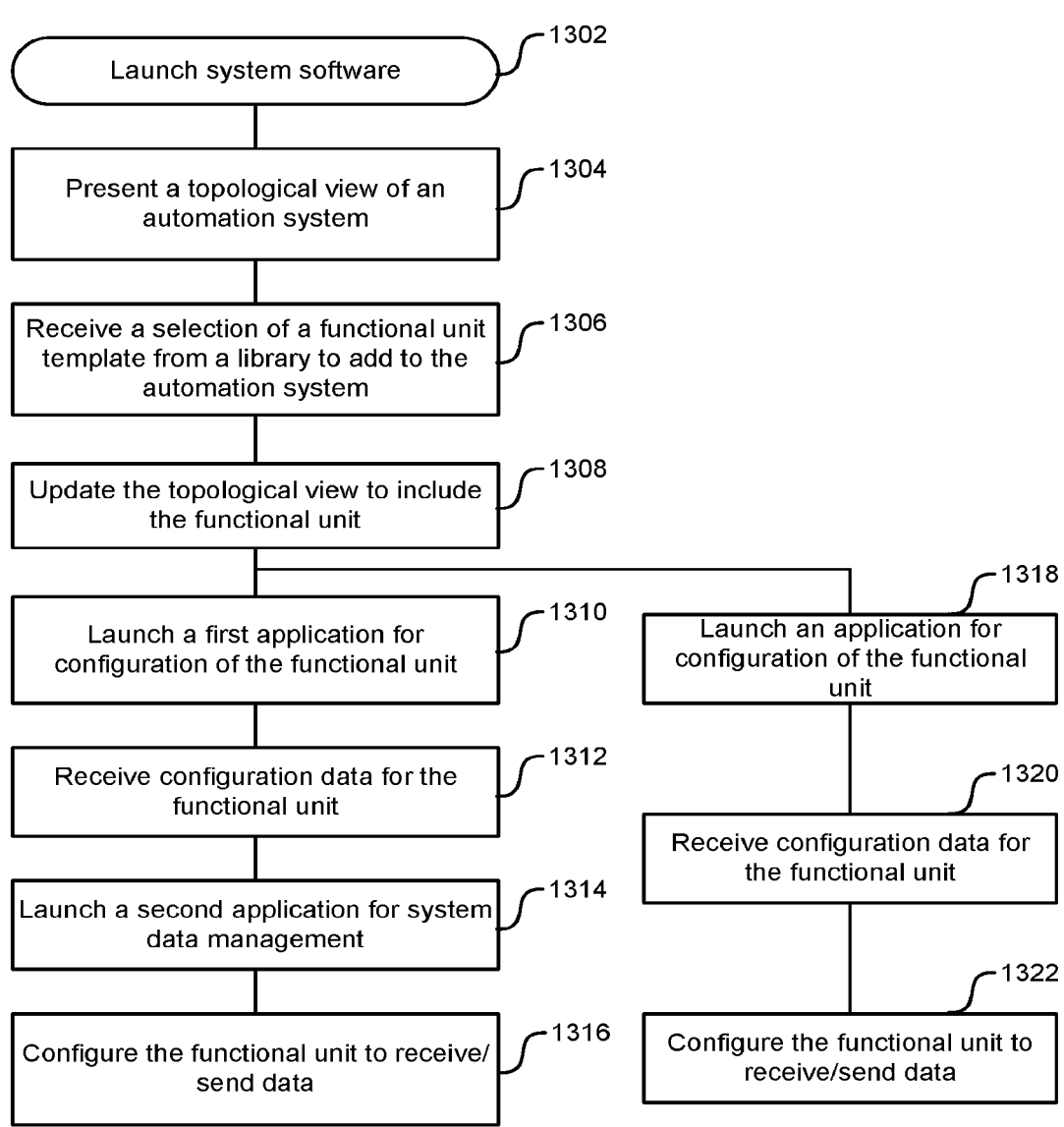

Launch system software ⌐1302

Present a topological view of an automation system ⌐1304

Receive a selection of a functional unit template from a library to add to the automation system ⌐1306

Update the topological view to include the functional unit ⌐1308

Launch a first application for configuration of the functional unit ⌐1310

Receive configuration data for the functional unit ⌐1312

Launch a second application for system data management ⌐1314

Configure the functional unit to receive/send data ⌐1316

Launch an application for configuration of the functional unit ⌐1318

Receive configuration data for the functional unit ⌐1320

Configure the functional unit to receive/send data ⌐1322

FIG. 13A

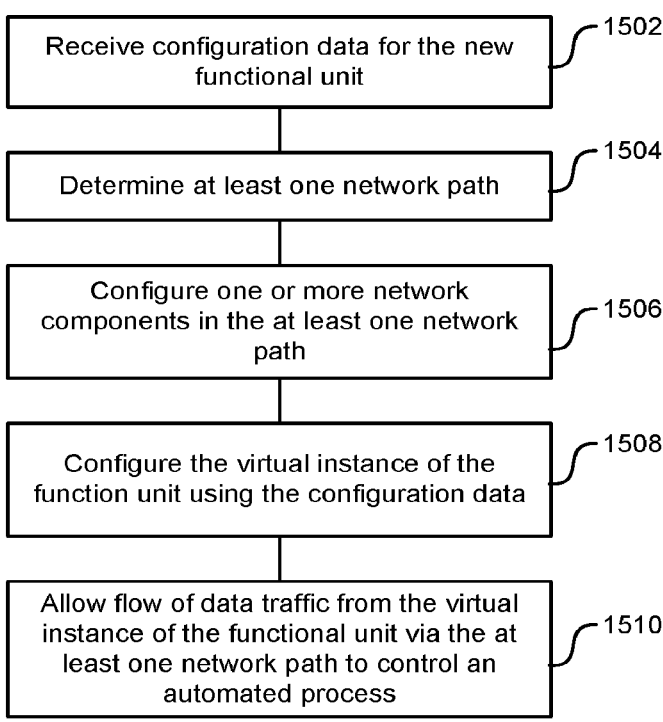

Receive configuration data for the new functional unit　　1502

Determine at least one network path　　1504

Configure one or more network components in the at least one network path　　1506

Configure the virtual instance of the function unit using the configuration data　　1508

Allow flow of data traffic from the virtual instance of the functional unit via the at least one network path to control an automated process　　1510

*FIG. 15*

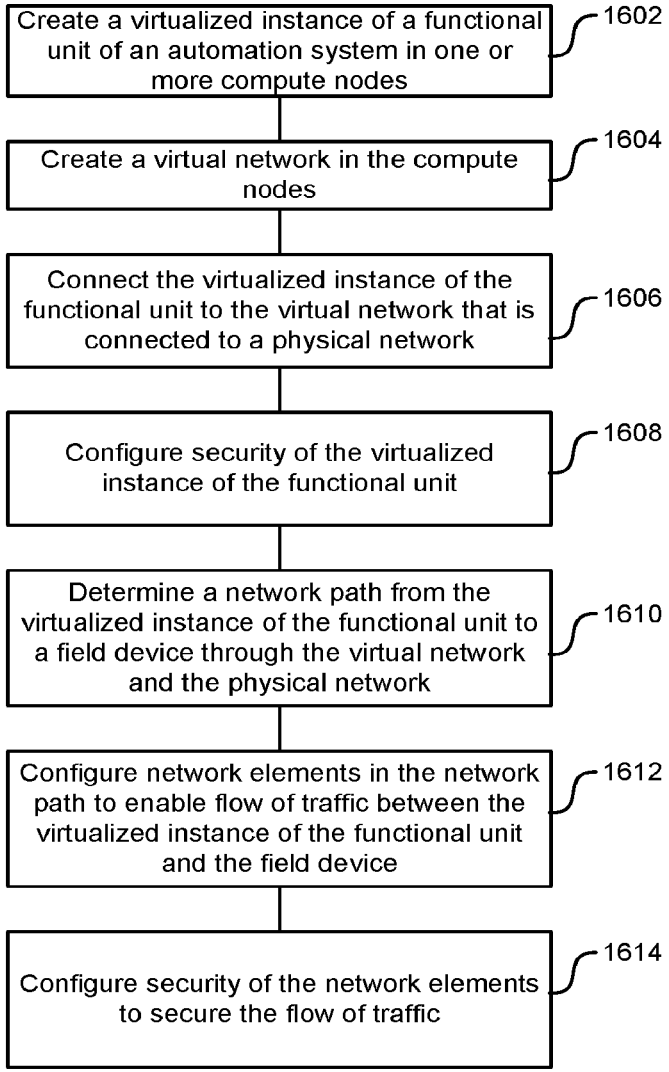

Create a virtualized instance of a functional unit of an automation system in one or more compute nodes ⌐1602

Create a virtual network in the compute nodes ⌐1604

Connect the virtualized instance of the functional unit to the virtual network that is connected to a physical network ⌐1606

Configure security of the virtualized instance of the functional unit ⌐1608

Determine a network path from the virtualized instance of the functional unit to a field device through the virtual network and the physical network ⌐1610

Configure network elements in the network path to enable flow of traffic between the virtualized instance of the functional unit and the field device ⌐1612

Configure security of the network elements to secure the flow of traffic ⌐1614

*FIG. 16A*

Receive a commissioning request to commission a functional unit in an automation system — 1616

Determine at least one network path for the functional unit that is connected to a physical network — 1618

Configure one or more network elements in the at least one network path to commission the functional unit in the automation system — 1620

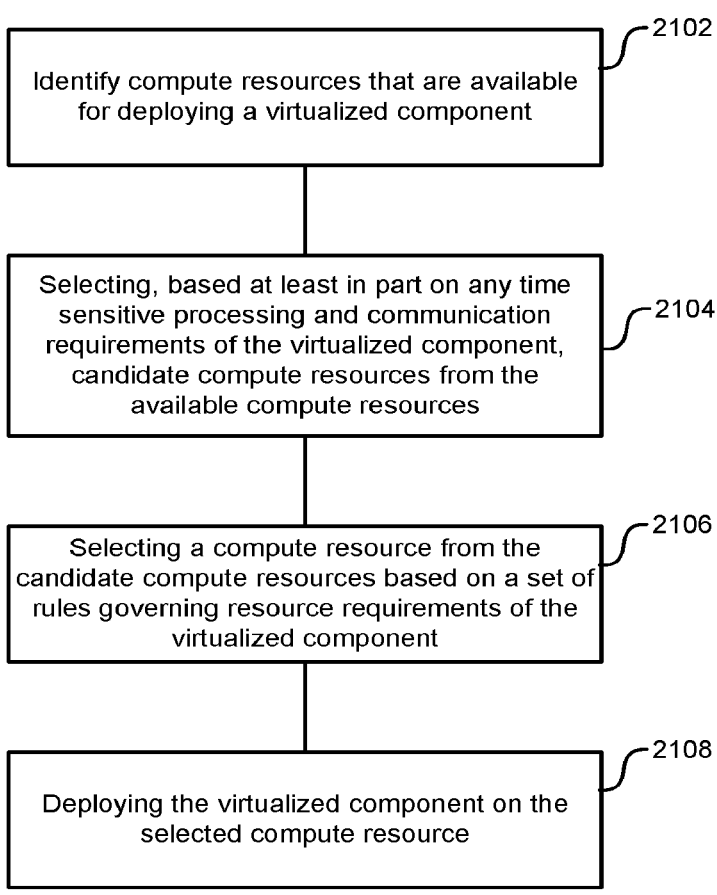

Identify compute resources that are available for deploying a virtualized component — 2102

Selecting, based at least in part on any time sensitive processing and communication requirements of the virtualized component, candidate compute resources from the available compute resources — 2104

Selecting a compute resource from the candidate compute resources based on a set of rules governing resource requirements of the virtualized component — 2106

Deploying the virtualized component on the selected compute resource — 2108

FIG. 21A

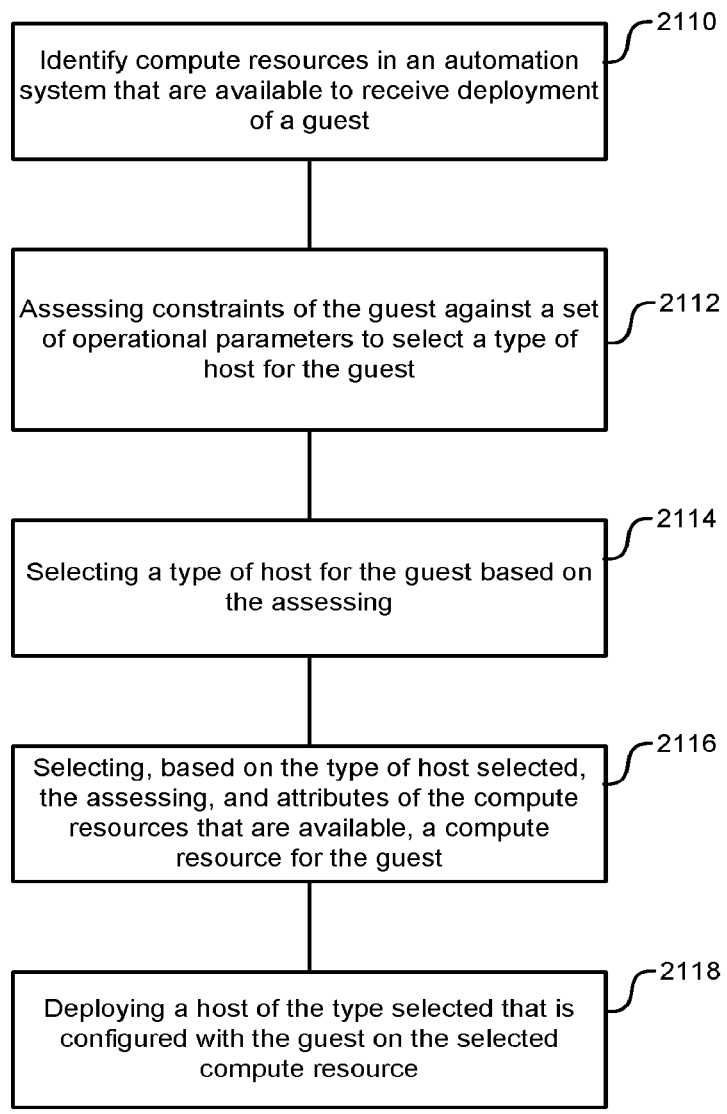

Identify compute resources in an automation system that are available to receive deployment of a guest ⟋2110

Assessing constraints of the guest against a set of operational parameters to select a type of host for the guest ⟋2112

Selecting a type of host for the guest based on the assessing ⟋2114

Selecting, based on the type of host selected, the assessing, and attributes of the compute resources that are available, a compute resource for the guest ⟋2116

Deploying a host of the type selected that is configured with the guest on the selected compute resource ⟋2118

*FIG. 21B*

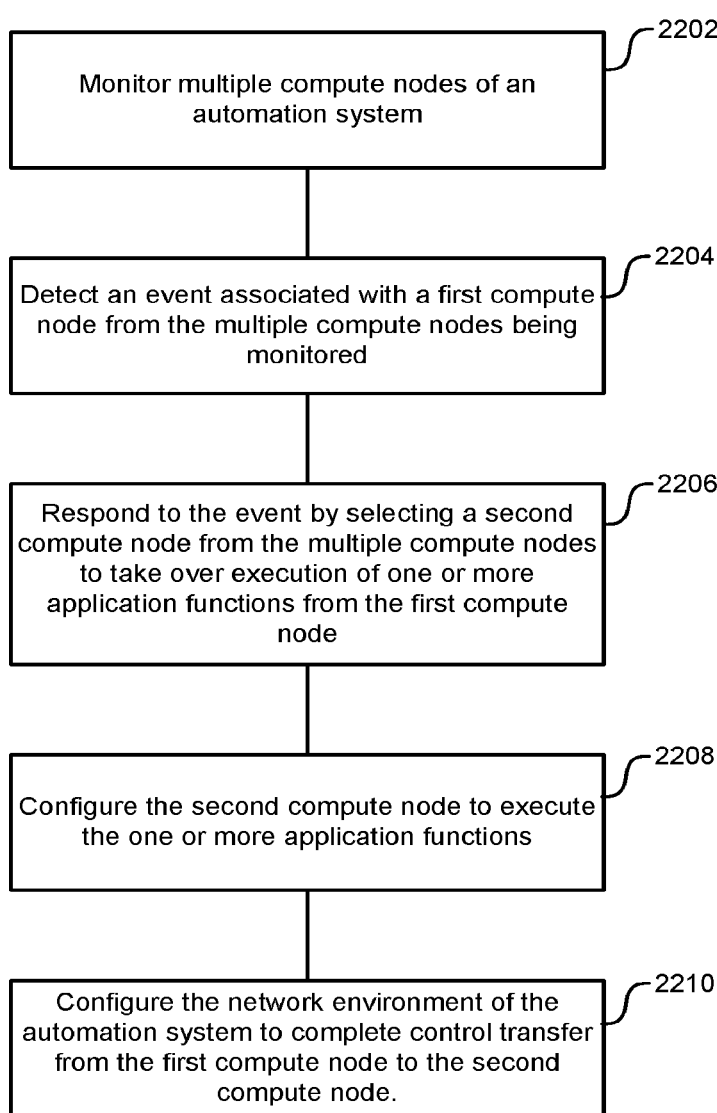

Monitor multiple compute nodes of an automation system
2202

Detect an event associated with a first compute node from the multiple compute nodes being monitored
2204

Respond to the event by selecting a second compute node from the multiple compute nodes to take over execution of one or more application functions from the first compute node
2206

Configure the second compute node to execute the one or more application functions
2208

Configure the network environment of the automation system to complete control transfer from the first compute node to the second compute node.
2210

*FIG. 22*

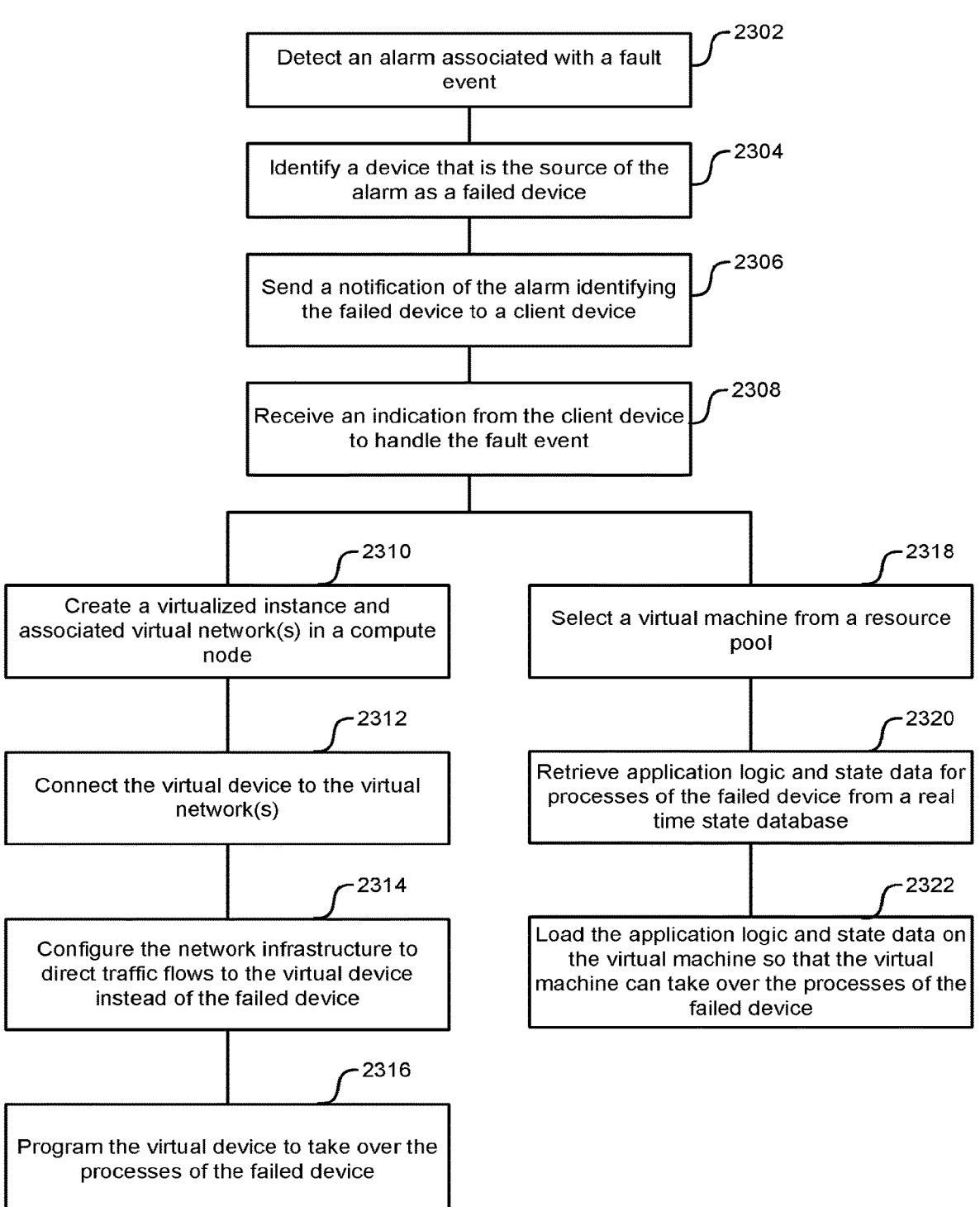

Detect an alarm associated with a fault event ⌐2302

Identify a device that is the source of the alarm as a failed device ⌐2304

Send a notification of the alarm identifying the failed device to a client device ⌐2306

Receive an indication from the client device to handle the fault event ⌐2308

Create a virtualized instance and associated virtual network(s) in a compute node ⌐2310

Connect the virtual device to the virtual network(s) ⌐2312

Configure the network infrastructure to direct traffic flows to the virtual device instead of the failed device ⌐2314

Program the virtual device to take over the processes of the failed device ⌐2316

Select a virtual machine from a resource pool ⌐2318

Retrieve application logic and state data for processes of the failed device from a real time state database ⌐2320

Load the application logic and state data on the virtual machine so that the virtual machine can take over the processes of the failed device ⌐2322

*FIG. 23*

SOFTWARE DEFINED AUTOMATION SYSTEM AND ARCHITECTURE

CROSS-REFERENCE TO RELATED APPLICATION(S)

This application is a continuation of U.S. Non-Provisional application Ser. No. 15/700,443 titled "Software Defined Automation System and Architecture," filed on Sep. 11, 2017, which is a continuation of International Application No. PCT/IB2016/001609 titled "Software Defined Automation System and Architecture," filed on Oct. 12, 2016, which claims priority to and benefit from the following provisional patent applications: (1) U.S. Provisional Application Ser. No. 62/241,028 titled "Software-Defined Automation" filed on Oct. 13, 2015, (2) U.S. Provisional Application Ser. No. 62/240,742 titled "Architecture for Connecting Objects in the Industrial Internet of Things" filed on Oct. 13, 2015, (3) U.S. Provisional Application Ser. No. 62/348,770 titled "Software-Defined Automation" filed on Jun. 10, 2016, (4) U.S. Provisional Application Ser. No. 62/354,683 titled "Software-Defined Automation Architecture" filed on Jun. 24, 2016, (5) U.S. Provisional Application Ser. No. 62/354,799 titled "Software-Defined Automation Architecture" filed on Jun. 26, 2016, and (6) U.S. Provisional Application Ser. No. 62/406,932 titled "Software Defined Automation System and Architecture" filed on Oct. 11, 2016. The entire contents of the aforementioned patent applications are expressly incorporated by reference herein.

BACKGROUND

Automation is the use of automatic control devices and various technologies to automate monitoring, operation and control of processes and installations without significant human intervention to achieve performance that is superior to manual control. Known automation systems for monitoring and controlling processes and installations (e.g., in plants, buildings, etc.) typically comprise various automation devices such as controllers (e.g., Programmable Logic Controllers (PLCs), Programmable Automation Controllers (PACs)), input/output devices (I/O devices), field devices (e.g., sensors and actuators), personal computers (PCs), Human Machine Interfaces (HMIs), and the like. The controllers execute user-defined programs to control automated processes. Typically, in a control system, controllers read input data from field devices such as sensors and metering devices and use the input data to generate control outputs based on the user-defined programs.

BRIEF DESCRIPTION OF THE DRAWINGS

FIG. 12 is a logic flow diagram illustrating an example method of creating an automation system in accordance with some embodiments.

FIG. 13A is a logic flow diagram illustrating an example method of adding a functional unit to an automation system via a system software in accordance with some embodiments.

FIG. 15 is a logic flow diagram illustrating an example method of configuring a functional unit in an SDA system accordance with some embodiments.

FIG. 16A is a logic flow diagram illustrating an example method of defining an automation system via software accordance with some embodiments.

FIG. 21A is a logic flow diagram illustrating an example method of selecting a compute resource for deploying a virtualized instance/component in accordance with some embodiments.

FIG. 21B is a logic flow diagram illustrating an example method of selecting a compute resource for deployment of a guest in accordance with some embodiments.

FIG. 22 is a logic flow diagram illustrating an example method of managing an SDA system in accordance with a first embodiment.

FIG. 23 is a logic flow diagram illustrating an example method of detecting and handling a fault event in accordance with some embodiments.

DETAILED DESCRIPTION

1. Overview

This disclosure describes Software-defined Automation (hereinafter "SDA") technology and system (hereinafter "SDA system") which provides a reference architecture for designing, managing and maintaining a highly available, scalable and flexible automation system.

This disclosure also describes systems and methods for providing centralized management of the SDA system including its compute resources, network resources and security resources.

In some embodiments, the SDA technology enables control system(s) and associated software to be run inside of a fog platform or a private cloud. Control system(s) of varying degrees of complexity can be found in traditional manufacturing facilities, refineries, submarines, vehicles, tunnels, baggage handling systems, energy management systems, building management systems, flood water control systems, grid control systems and the like. By moving the entire control system(s) or at least a portion thereof to a fog platform or a private cloud, and providing a software interface to the control system elements, the SDA technology enables engineering tasks over the whole lifecycle of automation engineering such as design, programming, configuration, installation, running, maintenance, evolution and shut down to be performed in a simpler, more efficient and cost effective way.

Figure 1:
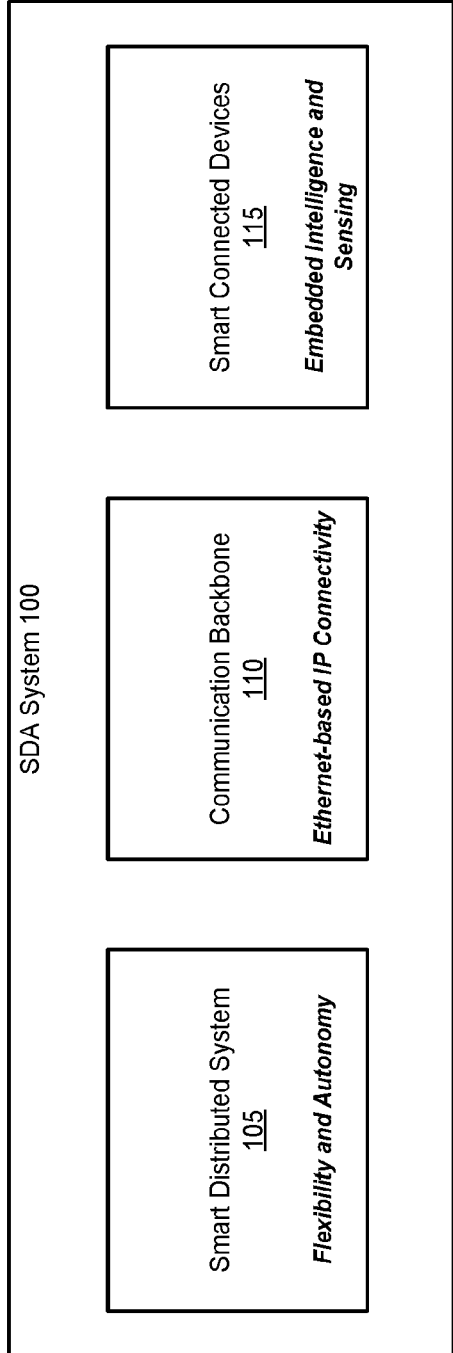
FIG. 1 is a block diagram illustrating aspects of a software defined automation ("SDA") technology in accordance with some embodiments.

As depicted in FIG. 1, the architecture of an SDA system 100 comprises of three aspects: (1) a smart distributed system 105, (2) a communication backbone 110, and (3) smart connected devices 115. The smart distributed system 105 takes a software based approach to manage various aspects of automation system(s) of an enterprise, throughout the life cycle. This software based approach means the SDA system is easy to setup, tune and adapt in regards to any evolving requirements to comply to changing business environment. In a smart distributed system, automation servers can host applications, databases, and the like and permit a high level of elasticity. In some embodiments, the system exhibits distributed intelligence by enabling a guest (e.g., a control/automation application) to be logically defined and distributed and re-distributed to run on one or more hosts (e.g., virtual machines, containers, bare metals) on a server, on a physical automation controller, an embedded system, and the like. The distribution can be initiated for various reasons, e.g., to optimize performance, to upgrade hardware, etc. For example, an application with heavy computational requirements can be deployed for execution on a compute resource that is able to provide the necessary computational resources. Similarly, an application with critical timing constraints can be deployed on a compute resource that is in close proximity to the field device it controls to reduce the impact of latency through network and/or other delays and improve the performance of the system.

The communication backbone 110 provides connectivity throughout the automation architecture from the control level to fieldbus, in the controller's backplane, to the smart connected devices 115, and so on. This connectivity, enabled by Ethernet, greatly improves accessibility of automation equipment and data and helps deliver the right information to the right entity at the right time. In some embodiments, the communication backbone 110 of an SDA system can use one or more networking technologies such as Software Defined Networking (SDN), Time Sensitive Networking (TSN) and/or the like in some embodiments. SDN enables network elements which include switches and routers as well as any nodes taking on a similar role to be configured and re-configured in a simpler way without having to access each physical device. For example, each network device can be accessed by the logically centralized SDN controller using a set of protocols. TSN enables real-time Ethernet networking that enables real time control throughout the network.

Smart connected devices (or smart connected products) 115 are complex systems that can connect to the network, generate data and execute a function. Smart connected devices are aware of their operating context, and as such can make intelligent decisions and adapt their behavior accordingly. For example, consider a sensor such as power meter that has a basic function of sensing electrical networks. One or more functions besides the basic function can be deployed into the power meter to transform the power meter to a smart connected device. Such a smart connected power meter can take advantage of its operating context to, for example, check for specific conditions, generate and send alarms, and the like. Smart connected devices 115 can comprise of hardware, software, sensors, storage, microprocessor(s), connectivity and the like. Some non-limiting examples of smart connected devices include: controllers (e.g., programmable logic controllers or PLCs, programmable automation controllers or PACs), drives, I/O concentrators, sensors, actuators, and the like.

An SDA system, in some embodiments, can be described as a collection of services. In some embodiments, it can be an infrastructure as a service (IaaS) providing virtual infrastructure on which customers can host their own applications. It can also be a network as a service (NaaS) as it enables the network to be configured and re-configured or modified in a simple manner based on customer needs. The SDA system can also be a software as a service (SaaS) as it can host software (e.g., SoMachine, Unity) on one or more servers and enable a user to access the software in a client/server manner using a smart phone, laptop, personal computer, tablet, and/or other client device. It can also be a data/information as a service that defines data management at solution/system level to avoid double definition and inconsistency and permit big data and analytics. It can be a platform as a service (PaaS) providing a platform comprising a set of servers offering hosts to execute on demand applications, embedded or not.

Figure 2A:
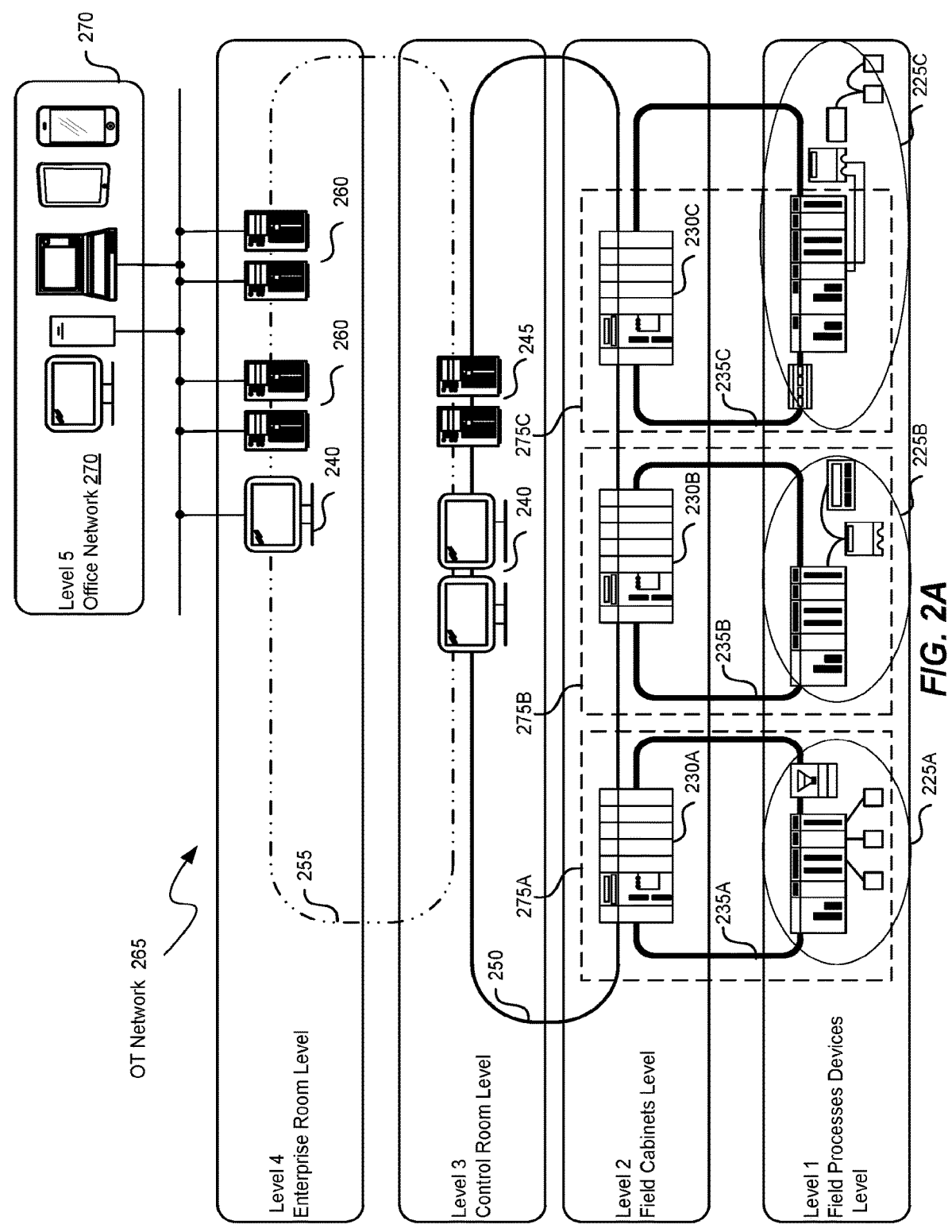
FIG. 2A is a block diagram illustrating an example of a traditional automation system architecture implemented in some industries.

FIG. 2A depicts a traditional automation system architecture that is widely implemented in many industries. In the traditional automation system architecture, automation devices at level 2 (e.g., PLCs 230A-C) are connected through device networks 235A-C to enable the automation devices (e.g., field devices 225A-C) at level 1 to be controlled by the PLCs 230A-C respectively. Similarly, the PLCs 230A-C at level 2 and engineering stations 240 and process and historian servers 245 at level 3 in the control room are connected to the same control network 250. This enables engineers to access and/or program PLCs 230A-C and access process data stored in the historian servers 245 directly from the engineering stations 240. At level 4, at the top of the automation system architecture, the enterprise room can include system/enterprise servers 260 which are connected to the engineering stations 240 and process and historian servers 245 at the control room level 210 through the enterprise network 255. Finally, at the highest level 5, the world of industrial equipment, machines, controllers, sensors and actuators ("Operational Technology" or OT 265) spanning all four levels is integrated with the office networks (i.e., Information Technology (IT) 270).

The traditional automation system architecture (e.g., the traditional OT architecture 265 depicted in FIG. 2A) has several drawbacks. One such drawback is the locked down architecture. In other words, there is no flexibility in the traditional automation system architecture to make dynamic changes to configuration on the application, device or network side. Moreover, the traditional automation system architecture is characterized by functional silos which create complexity and make control systems inflexible. The complexity and lack of flexibility limit the operational efficiency of the architecture, are a source of frustration to customers and require costly and inflexible configuration. For example, in FIG. 2A, each of the functional units 275A-C is depicted as having its own device network 235A-C respectively, which prevents different PLCs in different functional units from interacting with each other. If there is a need to shift an application running in a PLC 230A in functional unit 275A to a PLC 230B in functional unit 275B (e.g., because PLC 230A failed) and have that application control the I/O device in function unit 275A, such a change would require significant re-engineering and interruption of the industrial operation, which can be costly.

Another problem with the traditional automation system architecture is the complexity in terms of management of different applications and devices as well as the network infrastructure. A typical automation system can comprise of hundreds of automation devices (or automation equipment) and processes managed by as many applications. For example, PLCs are programmed using a programming software (e.g., Schneider Electric's Unity software for PLCs manufactured by Schneider Electric) and PLC configurations are stored in PLC software projects (e.g., Unity project). Similarly, supervisory control and data acquisition (SCADA) configurations are stored in SCADA projects. Device configurations (e.g., IP addressing, I/O configuration, access control lists, local sub-components and supporting libraries, event triggering, passwords, and the like) are also generally managed through different software applications. Similarly, automation device Internet Protocol (IP) configurations are not managed from a single point, but rather at each point. Managing these applications and devices individually for compatibility, versioning, maintenance, IP connectivity and so on is very complex and requires a significant expertise and effort. Moreover, because these applications and devices are not centrally managed, there is no way to recover the whole system in the event of disaster. As such, traditional automation system architectures are vulnerable to security risks (e.g., unauthorized changes to device configuration) and disasters (e.g., fire, flood).

Another downside to the lack of central management of applications and devices is the difficulty in accessing data generated by different parts of the system. Aggregating large quantities of different types and sets of data generated by different applications and devices into one place becomes a task that is too complex and time consuming. Without access to relevant data it becomes difficult to get a holistic view of the system to make performance optimizations. For example, consider a scenario where a few devices on a plant floor may have resources available to execute applications. Unless a plant engineer specifically accesses each of those devices and makes a determination as to what resources are available, information about the resource availability from those devices will not be known and hence will not be considered when deciding where to deploy an application, or whether to add a new automation device. As a result, inefficient and sub-optimal decisions can be made. By way of another example, consider a situation where a virus infects an industrial controller. In traditional automation systems, detection of such an event can bring most of the plant, if not the entire plant, down because an engineer may have to physically swap out the controller with a new one and configure and program it again.

The SDA technology described herein overcomes these and other drawbacks of the traditional automation system architecture by transforming the rigid, locked down traditional architecture into a flexible, "flatter," software-defined architecture. The transformed OT architecture enables network configuration and automation function/application deployments on the fly at the system level through the use of virtualization (e.g., of services, applications) technologies, configurable devices and/or networking technologies.

Figure 2B:
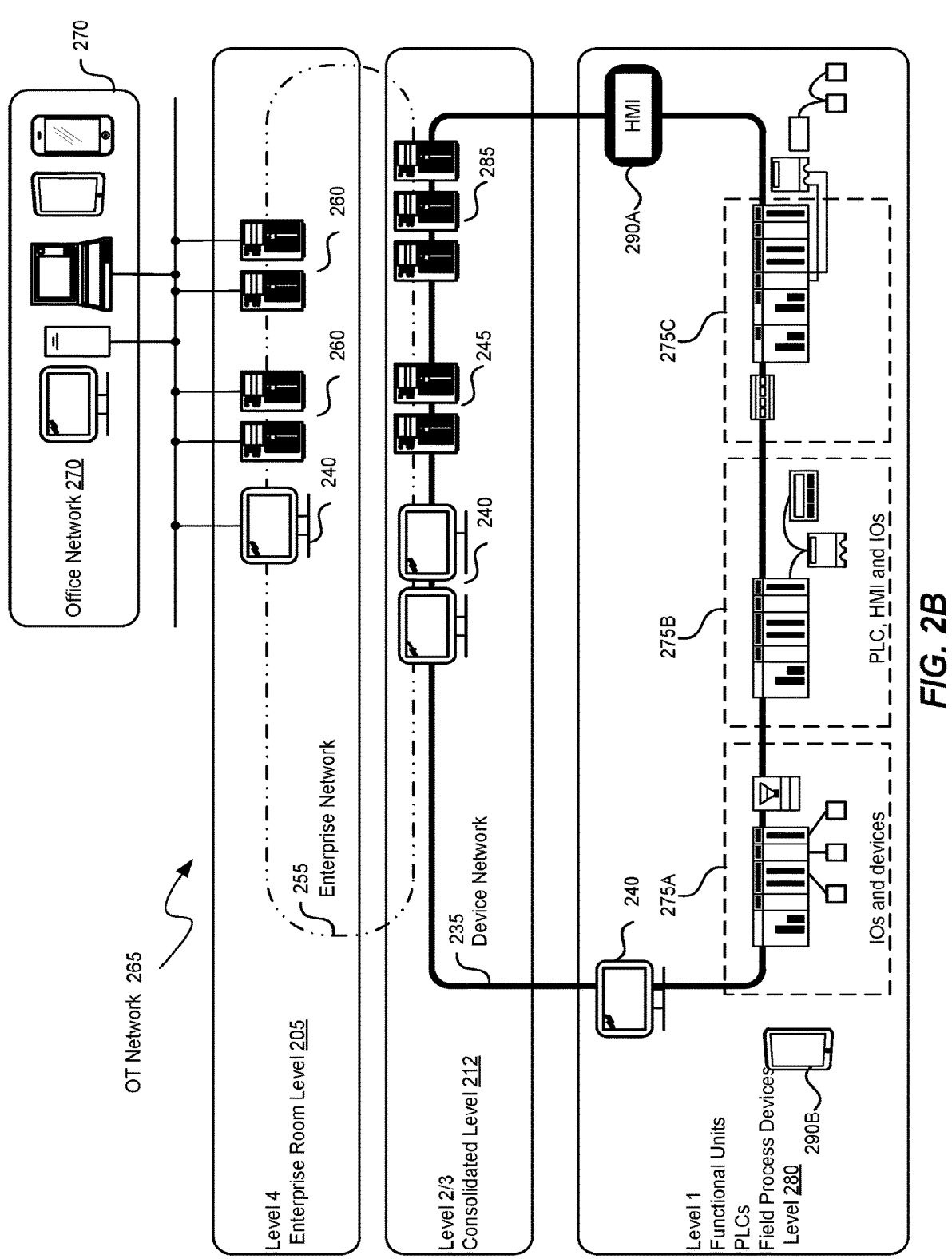
FIG. 2B is a block diagram illustrating an example of a simplified and flexible automation system architecture in accordance with some embodiments.

While the traditional automation architecture depicted in FIG. 2A is rigid and hierarchical with at least four levels of control, the example OT architecture as defined by the SDA technology depicted in FIG. 2B is considerably simpler, with three levels of control (hence the "flatter" description). These three levels of control include an enterprise room level 205 (level 4), functional units, PLC, field process devices level 280 (level 1) and a consolidated level 212 (level 3/4). The transformed OT architecture also comprises of an enterprise network 255 and a single device network 235 that replaces the fragmented device networks of the traditional OT architecture. For example, as depicted in FIG. 2B, all the automation devices such as the PLCs, 285, I/Os, HMIs 290A, 290B and engineering stations 240 are connected to a single device network 235. In this architecture, an application running in a PLC in functional unit 275B can be moved to the server(s) 285 (e.g., by creating a virtual PLC which is a software implementation of a PLC on a host such as a virtual machine or a container) and the network can be automatically configured to ensure traffic from the virtual PLC ("vPLC") in the server(s) 285 flows to the I/O devices in functional unit 275B in a timely manner to monitor and/or control input/output devices or field devices. Some non-limiting examples of input devices include: sensors, metering devices, pressure switch, level switch, and the like. Similarly, some non-limiting examples of output devices include: actuators, motors, relays or solenoids, analog devices, and the like. In this manner, SDA technology can simplify deployment and configuration of automation functions and/or applications.

One of the advantages of the disclosed SDA architecture is smart enterprise control. Smart enterprise control includes connecting existing automation systems with other systems (e.g., enterprise, lifecycle and value chain systems) to optimize the entire manufacturing enterprise as a whole, and better enable the tangible benefits of greater business control. Smart enterprise control facilitates break down the silos of the enterprise and allows closer integration of production systems with Enterprise Resource Planning (ERP) systems, Product Lifecycle Management (PLM) systems, Supply Chain Management (SCM) and Customer Relationship Management (CRM) systems. These different enterprise systems have historically been managed somewhat independently of each other, which prohibits a holistic view of the enterprise. The holistic approach of the disclosed SDA architecture can facilitate an enormous efficiency gain for enterprises.

For example, smart connected devices can be tightly integrated with the wider enterprise to facilitate more flexible and efficient manufacturing. Smart enterprise control is quite complex to implement, and the SDA architecture and standards enable the convergence of information technology (IT) and operational transformation (OT) systems. Tighter integration allows enterprises to not only be more efficient, but also to have greater flexibility and responsiveness to volatile market conditions. The notion of control can expand from the real-time control of a physical parameter, to the right-time control of the whole business, including both physical and non-physical parameters. Example benefits to enterprises include the ability to increase protection against cyber threats, be more innovative and be able to better manage safety, performance and environmental impact.

Some example applications of smart enterprise control include customization and lot sizes of one, reducing the size of product recalls, detecting defect products earlier in the manufacturing process and modifying product design to eliminate root causes, modifying production planning based on weather forecasts, modifying the production plan/recipes based on the spot price of raw materials, and so on.

Figure 3:
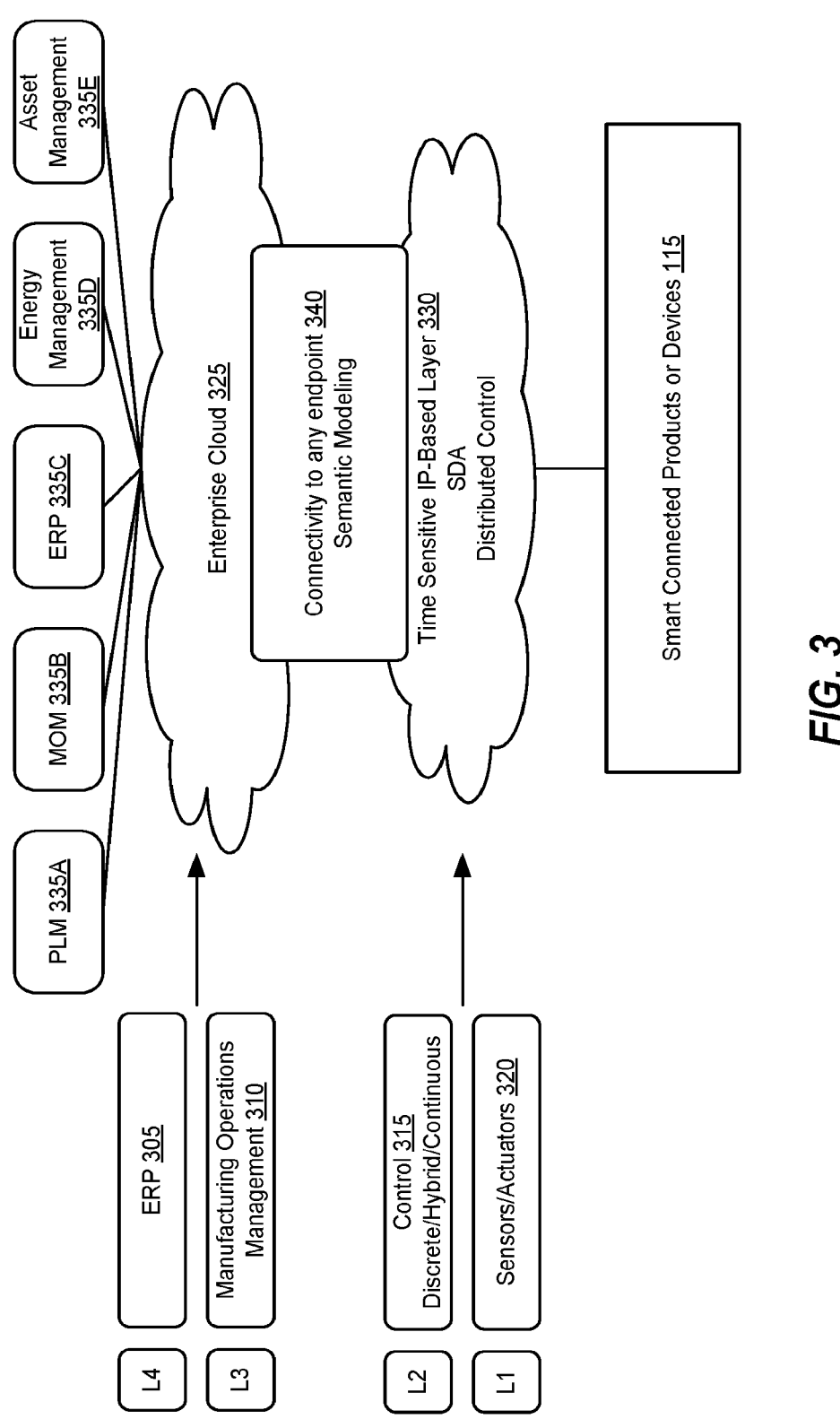
FIG. 3 is a block diagram illustrating an example of a flatter and flexible operational technology architecture for an enterprise in accordance with some embodiments.

FIG. 3 is a block diagram illustrating an example of a flatter and flexible operational technology ("OT") architecture for an enterprise in accordance with some embodiments. As depicted the flatter OT architecture in accordance with the SDA technology has two layers: a "time-sensitive" IP-based cloud layer 330 for real-time deterministic control and an enterprise cloud layer 325. The time sensitive layer 330 encompasses sensors and actuators level 320 (L1) and discrete, hybrid or continuous control level 315 (L2) and is enabled by cloud computing technologies optimized for real-time deterministic communications. In other words, the time sensitive layer 330 ensures that time sensitive control/ data traffic from L1 and L2 layers are managed to meet latency and/or reliability requirements. As used herein, "cloud" refers to the technologies used, rather than the physical location of the infrastructure. For example, in the automation industry, architectures with one or more "on premise" clouds may be used.

In some embodiments, the OT devices that comprise the time sensitive layer (e.g., sensors, actuators, and controllers in L1 and L2) are cloud-ready and capable of interfacing transparently with the IT systems of the enterprise cloud layer. These devices can also have a high degree of intelligence or logic in some embodiments. For example, control valves can be embedded with temperature, pressure and/or acoustic sensors which are capable of operating autonomously using set points received from the enterprise cloud layer, for example, to determine their own needs for preventive maintenance, and/or inform the maintenance department in a timely manner. The cloud enterprise layer 335 encompasses the manufacturing and operations management (MOM) level 310 (L3) and the enterprise resource planning (ERP) level 305 (L4) of the hierarchy. ERP 335A, MOM 335B, product lifecycle management (PLM) 335C and other functions such as asset management 335D, energy management 335E, etc.) in the enterprise cloud layer 325 interoperate with each other and with the time-sensitive industrial automation and control systems to provide a coordinated holistic view and management of the enterprise system. In some embodiments, information flow across both layers is completely transparent using semantics and discovery mechanisms (e.g., based on Industry standards).

The flatter architecture can provide many benefits for end users. For example, the flatter architecture is associated with a low implementation cost and increased flexibility. It can also support connectivity 340 to any end point, enabled by a standardized semantic information model. The semantic information model and associated services facilitate optimized push of field data to the cloud, and adapting of field device behavior based on analytics performed in the cloud.

Other benefits include implementation of additional incremental functions, lot size 1, transparent and cost-effective connection to enterprise systems enabling information driven manufacturing.

Another benefit of the OT architecture in accordance with the SDA technology is its application to large scale control network architectures. A large scale control network architecture is an engineering challenge for the whole lifecycle as it generally includes a large number of devices connected over a network (e.g., Ethernet/TCP-IP). The high number of connected devices means an unprecedented level of complexity. For example, such an architecture can include as many as 2800 PLCs and 5400 drives can be connected on 30 network loops. The OT architecture in accordance with the SDA technology can simplify the design, management and maintenance of such a large scale architecture. For example, in the OT architecture disclosed herein, data processing can be achieved in an organized and efficient manner, which in turn optimizes operating performance. Response time, for example, with respect to data storage and retrieval, can be monitored by an SDA system and adjustments can be made to optimize the operating performance. Similarly, health of the components can be monitored on a continuing basis by a centralized management component and any events that could potentially impact the performance of the system can be detected in a timely manner and remedied via a coordinated response on several fronts including virtualization, cyber security and network. Similarly, the OT architecture can provide improved control performance by distributing processing and designing networks accordingly taking into account various protocols for accessing device and application information. Moreover, system availability and sustainability can be improved by enabling fault diagnostics and redundancy.

These and various other aspects of the SDA system including various components, features, advantages and applications will now be discussed in detail.

2. SDA Architectures

A. Simplified Architecture

Figure 4:
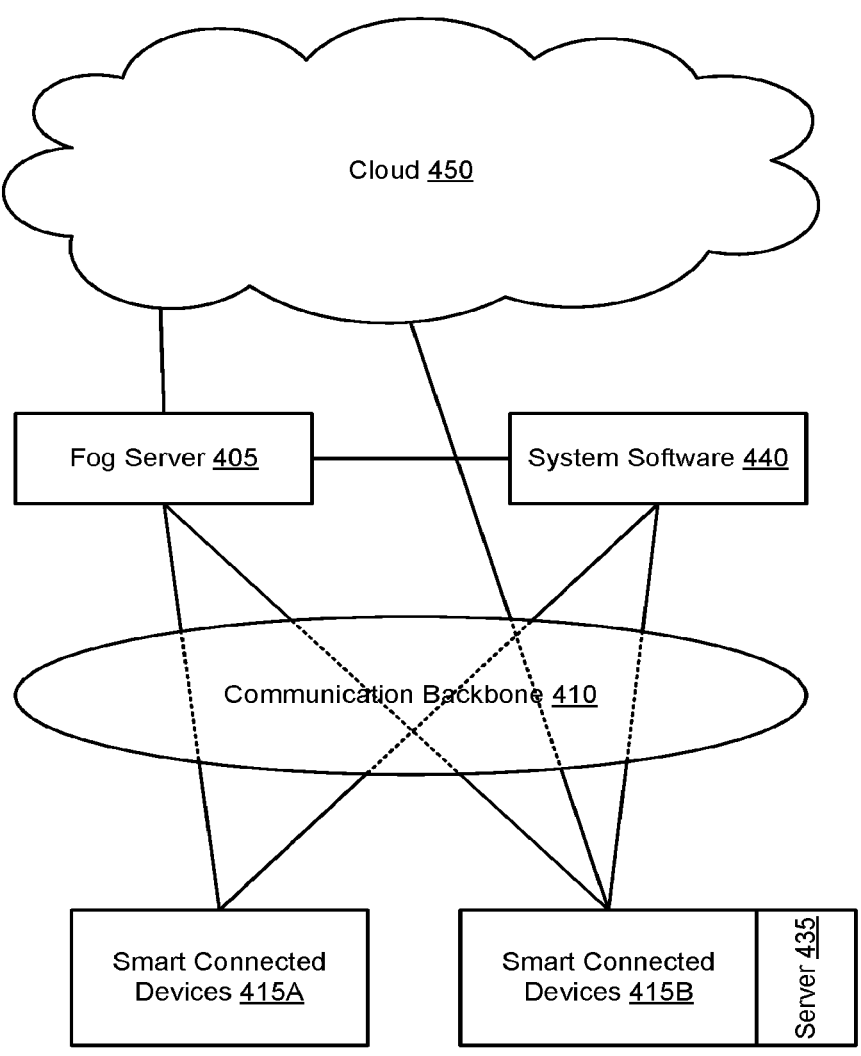
FIG. 4 is a diagram illustrating a simplified architecture of an SDA system in accordance with some embodiments.

FIG. 4 is a diagram illustrating a simplified architecture of an SDA system in accordance with some embodiments. The architecture depicts a fog server 405 linked to a system software 440, and smart connected devices 415A, 415B that are communicatively coupled to the fog server 405 and the system software via a communication backbone 410. The architecture also depicts that at least some smart connected devices 415B and the fog server 405 can be communicatively coupled to a cloud 450.

The fog server 405 is comprised of a collection of control resources and compute resources that are interconnected to create a logically centralized yet potentially physically distributed system for hosting the automation systems of an enterprise. The "fog server" or "fog platform" as used herein is a cloud management system (or localized subsystem or localized system) that has been localized into one or more compute and/or control nodes. In other words, the fog server 405 is cloud technology that has been brought down to the local ground or installation (hence the term "fog") in the form of one or more compute and/or control nodes to manage the entire automation system or a portion thereof. The fog server 405 enables virtualization by providing a virtualization infrastructure on which automation system(s) can be run and/or managed. The virtualization infrastructure includes compute nodes which execute hosts such as virtual machines, containers and bare metals (or bare metal images). The hosts themselves can execute guests which include applications and/or software implementations of physical components or functional units and an automation portal or system software 440. As used herein, virtualization is the creation of a virtual version of something. For example, a virtual component or a virtualized component (e.g., a virtual PLC, a virtual switch, network function virtualization (NFV)) represents a function that is executed on a host running on a compute node. It does not have a physical existence by itself. Fog server 405 need not be localized in a centralized control room; controllers, devices and/or servers 435 close to the sensors and actuators (e.g., JO device, embedded device) can also be considered under the management of the fog server 405. In some embodiments, the fog server 405 can also aggregate, store and/or analyze data, and/or report the data or analytics to the cloud 450. The cloud 450 can be an enterprise cloud (i.e., private cloud), public or hybrid cloud. The system software 440 provides a single entry point for an end user to define (e.g., design, provision, configure, and the like) the automation system. One way to define the automation system is by managing distribution of applications/application functions where users want them to be executed.

The smart connected devices 415A, 415B (also smart connected products) monitor and/or control devices, sensors and/or actuators close to equipment/raw materials/environment by executing applications/application functions. In various embodiments, a smart connected device has the following features: (1) physical and electrical components, (2) firmware or a "smart" embedded part, and (3) connectivity and interoperability. In some embodiments, a smart connected device can also have a cybersecurity component that may be running remotely, or on board.

Some smart connected devices 415A can run applications or application functions ("applications") locally (e.g., the speed/torque regulation loop of a speed drive) because they have the processing capability to do so. This means that there is no need to execute those applications elsewhere (e.g., on a connected PC, a server or other computing devices) to get data to perform its functions. This has the advantage of faster response time (i.e., less latency) and savings on network bandwidth. Another advantage of onboard or local execution of applications is that it improves the consistency of data and the robustness of the architecture because the device can continue to produce information (e.g., alarm) or to log data even if the network is down.

In some embodiments, smart connected devices 415B can be wholly or partially executed in one or more servers (e.g., server 435, fog server 405). For example, a smart connected device 415B can be responsive to remote signals (e.g., remote method calls, application programming interface or API calls) as if an application is running locally, when in actuality the application is running remotely, for example in the fog server 405. In some embodiments, smart connected devices can capture real-time data about its own state and the state of its environment (e.g., the devices it is monitoring) and send such data to the fog server 405 and/or a remote cloud 450. In some embodiments, the smart connected devices 415A, 415B can transform the captured real-time data into information (e.g., alarms), store them and perform operational analytics on them. The smart connected devices 415A, 415B can then combine both monitoring and controlling functions described above to optimize own behavior and state.

The communication backbone 410 facilitates interaction between the fog server 405, the system software 440 and the smart connected devices 415A, 415B. The communication backbone (or the Internet of Things (IoT)/Industrial Internet of Things (IIoT) backbone) encompasses a set of network architectures and network bricks that enable physical and logical connections of the smart connected devices 415A, 415B, the fog server 405 and any other components that are part of the SDA architecture. For example, various equipment in a plant can be connected to each other and with the enterprise system (e.g., MES or ERP) using technologies based on various standards such as: Ethernet, TCP/IP, web and/or software technologies. The communication backbone in the form of a unified global Industrial Ethernet backbone can provide: an easy access to the data, from the plant floor (OT) to the enterprise applications (IT), a flexible way to define different types of network architectures (e.g., stars, daisy chain, ring) fitting with customer needs, robust architecture that can fulfill requirements such as availability, safety and harsh environment support and the right information to the right people at the right time in one cable.

The communication backbone 410 includes a full Industrial Ethernet infrastructure offering switches, routers and/or cable system to address the needs of all topologies. The communication backbone 410 also supports a set of connectivity protocols based on standards based on various standards (e.g., Modbus/TCP-IP, Ethernet IP, OPC UA, DHCP, FTP, SOAP, REST etc.). The communication backbone 410 can also support a set of web functions offering functions like diagnostic, monitoring and configuration using standard web pages and device integration reference architecture that defines the patterns, brick to integrate group of devices to controllers at application level and network level for configuration, tuning and diagnostic. In some embodiments, cyber security elements can be built in to the architecture. The communication backbone 410 also adheres to a set of architecture rules structuring the architecture at performances (Quality of Service or QoS), robustness (RSTP and PRP HSR for redundancy) and safety level (IEC61508). In some embodiments, the communication backbone 410 also supports integration of a set of gateways to connect to legacy (i.e., non-Ethernet) equipment to the network.

The communication backbone 410 can use multiple protocols to provide multiple services to fill multiple needs. Some examples of communication needs and suitable protocols are listed in table 1.

TABLE 1

| Services and Protocols | |
|---|---|
| Service | Protocol |
| Device to device | Modbus/EtherNet/IP, DDS, OPC UA, pub/sub |
| Device to control | Modbus/Eip, NTP, DHCP, FTP |
| Device to control for hard real-time | SercosIII, Profinet IRT, EtherCat |
| Control peer to peer | DDS, OPC UA, pub/sub |
| Control to control room | OPC, Modbus, TCP |
| Across architecture | Modbus/Eip, SNMP, SMTP, NTP, HTTP, FTP |

The networks in the existing systems are very segmented to allow guaranteed or reliable communication. The communication backbone 410 in the SDA architecture can overcome the problems of the existing systems through Software Defined Networking (SDN) and Time Sensitive Networking (TSN) technologies. SDN technology enables separation of a network's control logic from the underlying network hardware or device (e.g., switches, routers) and logical centralization of network control. SDN technology can bring simplicity and flexibility in these networks allowing communication at and through different layers driven by network policies. TSN technology adds a set of capabilities to standard Ethernet to provide real time capability and time guaranteed exchanges in areas or through the whole architecture. Moreover, cybersecurity solution can also be integrated and adapted to the SDA architecture.

B. Functional Architecture

In some embodiments, the SDA architecture enables management of an automation system via a set of controllers which provide system wide management of the resources. These controllers constitute the control resources of the fog server and provide a homogenous method to manage the entire system. A system administrator can interact with these controller nodes for the initial setup, system extension, diagnostic, maintenance, and the like. Similarly, applications executing in or outside the system can interact with these controller nodes to manage specific facets or functions in the system (e.g., ICS tool, Network tool, electrical system tool), manage compute resources (e.g. monitoring, management of other applications and/or resources), and the like. This functional view of the SDA architecture is depicted in FIG. 5.

Figure 5:
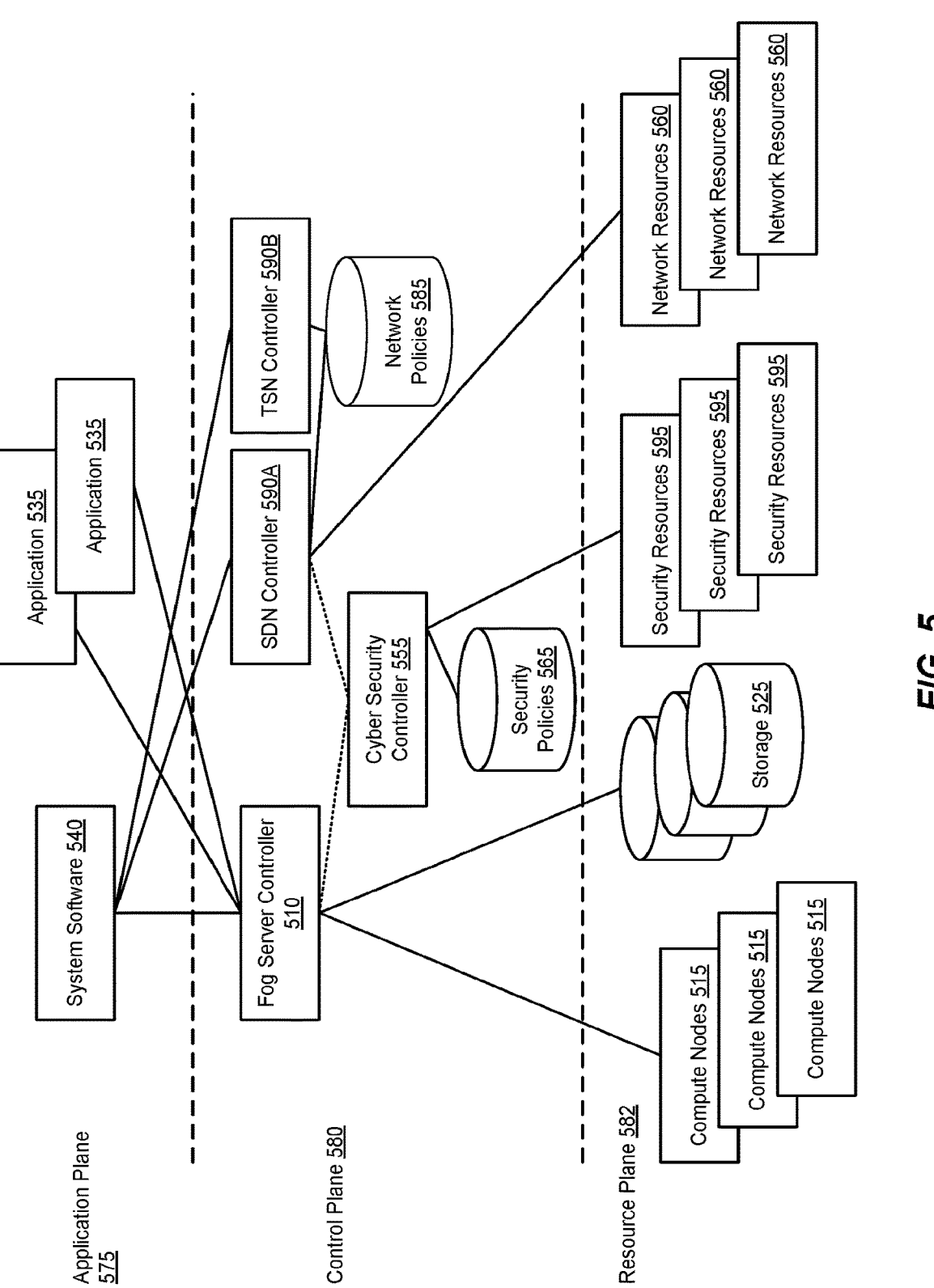
FIG. 5 is a block diagram illustrating a functional architecture of SDA in accordance with some embodiments.

The example functional view of an SDA system depicted in FIG. 5 includes an application plane 575, a control plane 580 and a resource plane 582. The application plane 575 encompasses the system software 540 and software components or applications 535 that are executed in the system and which both use and manage a set of resources of the system. The control plane 580 includes a set of controllers including a fog server controller 510, an SDN controller 590A/TSN controller 590B (or network controller) and a CS controller 555. These controllers provide a standardized set of interfaces to the applications in the application plane 575 to access and/or manage the resources in the resource plane 582 of the system. In some embodiments, the controllers also provide diagnostics, availability management, and the like. The SDN controller 590A/TSN controller 590B manage and distribute network policies at the system level. Similarly, the CS controller 555 enforces security policies 565 at the system level.

In some embodiments, these controllers can have a hierarchical relationship with one another. For example, an SDA system can include a top level controller (not shown) and a set of centralized controllers (e.g., fog server controller 510, the network controllers 590A, 590B and the CS controller 555), each controlling a building or a site. The top level controller can for example distributes policies to the centralized controllers to enable those controllers to control their own building or site. The virtualization environment supports hierarchical distribution of the controllers.

The resource plane 582 can include network resources 560, compute resources represented by compute nodes 515, storage resources 525 and security resources 595. The system software 540 and applications 535 are executed in computes nodes 515 managed by the fog server controller 510. The computes nodes 515 which provide the compute resources to the system can be physically distributed and managed by the fog server controller 510. For example, some compute nodes in the form of servers are located in the fog server or private cloud while other compute nodes such as smart connected devices operate at the edge. Network resources 560 can either be virtual network resources in the fog server, physical infrastructure resources in switching/routing hardware or infrastructure resources located in smart connected devices. Storage resources 525 can be databases and/or other devices for storing virtual images, volumes, applications, process data, state data, and the like. Security resources 595 can include security components residing on the compute nodes 515, storage nodes 525, and/or standalone components that provide security services such as enforcement of security policies, intrusion detection and protection, and the like.

Controllers orchestrate and monitor some or all of the resources of the system. Applications managing the system (e.g., system software 540 or automation portal, Network administration tool, etc.) send requests to the system to apply specific strategies. For example, the system software can be used to deploy a new PLC connected to a set of devices with specific real time network requirements, security requirements and availability/resilience requirements. In some embodiments, applications correspond to software/firmware implementations of components. These applications can be deployed on compute resources and can use storage resources and network resources to communicate.

3. SDA System

Figure 6A:
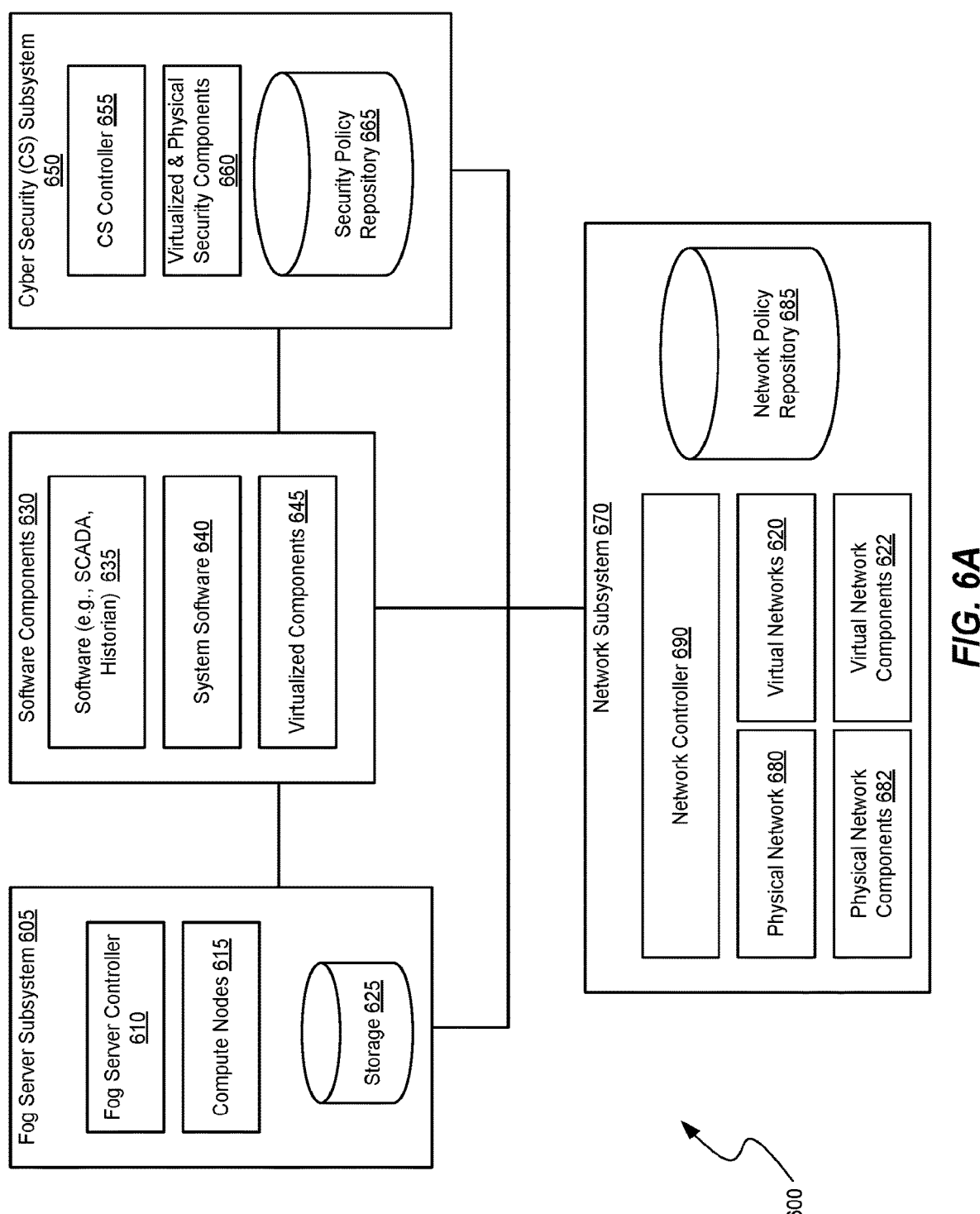
FIG. 6A is a block diagram illustrating subsystems of an SDA system in accordance with some embodiments.

An SDA system comprises of various subsystems that work together to provide a fully integrated solution for creating, managing and operating automation systems. FIG. 6A is a block diagram illustrating the subsystems of an SDA system in accordance with some embodiments. An SDA system 600 in some embodiments includes a fog server subsystem 605 ("fog server") having a fog controller or redundant fog controllers 610, one or more compute nodes 615 and storage 625. The SDA system 600 also includes a software components subsystem 630. In other embodiments, the SDA system can further include a cybersecurity ("CS") subsystem 650 having a security controller or redundant security controllers 655, physical and/or virtualized security components 660 and a security policy repository 665. In yet other embodiments, an SDA system can also include a network subsystem 670 having a network controller or redundant network controllers 690, physical network 680, physical network components 682, virtual networks 620, virtual network components 622 and a network policies repository 685.

The fog server 605 provides a virtualization environment on which automation system(s) can be run and/or managed. The fog server 605 comprises compute nodes 615 which provide logic processing capabilities and can host applications, databases and the like with a high level of elasticity. Non limiting examples of compute nodes include: servers, personal computers, automation devices including smart connected devices and the like.

The fog server controller 610 utilizes a fog server management software to perform its functions. The fog server management software can be based on cloud management software such as OpenStack. Cloud management software such as OpenStack in their standard/off-the-shelf form are typically used in the Information Technology (IT) world for data center management. Automation system management, however, involves different set of challenges. For example, some automation systems can run time-critical and/or safety-critical applications that need deterministic guarantees with respect to delay, reliability and/or other factors. Consider an automated cheese slicing system where a high speed synchronized motion between a knife blade slicing through a cheese block and the movement of the cheese block is critical to produce cheese slices of uniform thickness. If there is any processing or network delay, it can result in cheese slices of different thickness, resulting in wastage and loss of productivity.

The fog server controller 610 manages all aspects of the virtualization environment and the complete life cycle of the compute nodes 615. For example, the fog server 605 can stand up and stand down hosts such as virtual machines, containers or bare metals on compute nodes, and create and destroy virtualized components 645 and virtual networks 620. A virtualized component/element/instance 645, as used herein, is a logical equivalent of a physical device or a portion of the physical device it represents, implemented as a software entity to run inside of the fog server 605. Virtualized components 645 can also include software components such as applications and/or application functions on a host (e.g., a virtual machine configured with an application is a virtualized component/element/instance).

The fog server controller 610 can provide high availability (HA) through redundancy of the controller and management of compute node failures. The controller can also manage startup, shutdown and patching of the individual compute nodes. In some embodiments, the fog server platform can provide support for high availability of virtualized components. In some embodiments, the fog server 605 can include a storage node or data store 625. The storage 625 can store virtual images, volumes (i.e., hard drive of an instantiated image), application and process data, and the like.

The software components subsystem 630 can include virtualized components 645 that are hosted by the virtualization ecosystem of the fog server 605. The software components subsystem 630 can also include virtualized instances of software 635 that run within the virtualization environment (e.g., software for programming, configuration, and/or management (e.g., Unity, SoMachine, SCADA) that are used to program, configure, manage or otherwise interact with automation devices. In some embodiments, the software component subsystem 630 can also include a system software 640 (also called automation portal) that provides a single interface for managing topology, inventory, configuration, programming, control, and/or diagnostics of the automation devices and/or the automation system as a whole.

Through the system software 640 users can access various applications for system definition and system management over all life cycle phases. For example, the system software 640 can be used to configure and parametrize equipment during the engineering phase and tune, program, and/or diagnose equipment during the maintenance phase. Some of the benefits of the system software 640 includes simplicity and ease for end users and cost reduction as all aspects of any equipment in an automation system can be managed from a single portal. In addition to providing a single entry point to the entire system, the system software 640 also presents a consistent user interface and user experience, which help reduce inconsistency and increase efficiency and productivity. System software 640 and its components are described in detail in reference to system software 740 FIG. 7B.

The CS subsystem 650 includes an associated CS controller or redundant CS controllers 655 and virtualized and/or physical security components 660. The security subsystem 650 provides a holistic cyber-security solution through security policies and security components such as intrusion detection/protection systems, virtualized next generation firewalls, certificate authority and identification systems, and the like. The CS controller 655 disseminates security policies to the virtualized and/or physical components to ensure that necessary security protections are put in place. In some embodiments, the CS subsystem can also provide security policy and authentication services to other components and subsystems. The security policies of the CS system 650 can be stored in a security policy repository 665 in some embodiments.

The network subsystem 670 includes the Ethernet network infrastructure for the entire SDA system solution. In some embodiments, the network subsystem 670 is an SDN network subsystem having an SDN controller or redundant SDN controllers as the network controller 690. The SDN network provides separation of network's control logic from the underlying network hardware (e.g., routers, switches) and logical centralization of network control through the SDN controller. This means that the SDN controller can disseminate network policies throughout the network infrastructure (i.e., physical network 680 and physical network components 682 as well as virtual networks 620 and virtual network components 622) to control connectivity, bandwidth and latency, Service Level Agreements (SLAs) (e.g., re: deterministic response time/transfer time), traffic flow control, etc., and the network hardware can implement those policies. The network policies of the network subsystem 670 can be stored in a network policy repository 685 in some embodiments.

In some embodiments, the network subsystem 670 can comprise a mesh radio network. In mesh radio network, each node can connect to at least two other nodes with data being passed from node to node in a process called hopping. Because the nodes themselves serve as routers, radio mesh networks typically do not require designated routers. However, some mesh radio networks include one or more mesh routers along with the mesh nodes to relay traffic on behalf of other mesh routers and/or mesh nodes. In some embodiments, the network subsystem 670 can comprise virtual circuits on a high speed radio frequency (RF) mesh or hybrid network with communication facilitated by only the radio transceivers of the nodes, without any external devices. Thus, in some embodiments, configuration of network elements of network subsystem or network infrastructure can include configuration of the mesh nodes and/or mesh routers (e.g., OpenFlow enabled mesh routers) in the mesh radio network.

In some embodiments, the network subsystem 670 can be a Time Sensitive Network (TSN) subsystem having a TSN controller as the network controller 690 and TSN infrastructure. The TSN network subsystem ensures that mission critical and time-sensitive data are transferred/shared as per predefined maximum deterministic transfer time and with high reliability. Typically, TSN infrastructure includes TSN capable network components. It should be noted that in some embodiments, the network subsystem 670 can comprise both SDN and TSN networks (and thus SDN and TSN controllers and SDN and TSN components). In various embodiments, the network controller 690 can be a native fog server virtual network controller, a traditional network management system controller, an SDN controller, a TSN controller, and/or any combination thereof.

Figure 6B:
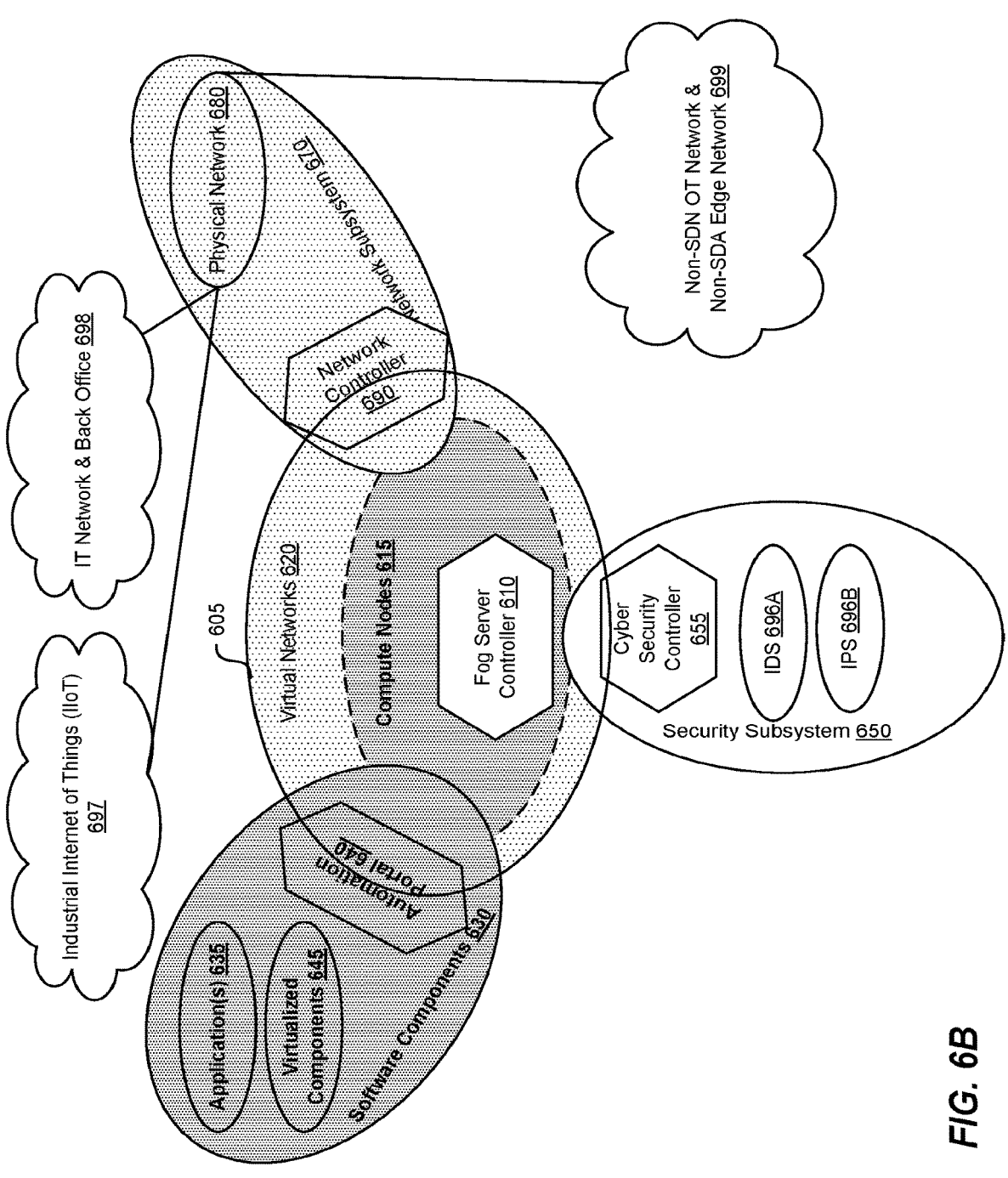
FIG. 6B is a diagram illustrating the scope of control of each of the SDA subsystems in accordance with some embodiments.

The roles of the subsystems in the SDA solution complement each other to provide a fully integrated solution. Specifically, the fog server 605 can interact with each of these subsystems through hosting virtualized elements of the subsystem and/or through the control functions of the subsystem. While the fog server 605 has integral relationships with each of the SDA subsystems, they are not considered within the scope of the fog server 605. FIG. 6B is a diagram illustrating the scope of control of each of the SDA subsystems in accordance with some embodiments.

The realm of the fog server 605 is the fog server controller 610, the compute nodes 615 and management of the virtualized components 645 within the fog server 605. The virtualized components 645 and software 635 (e.g., historian, SCADA, SoMachine, Unity) are not within the scope of control of the fog server 605, but under the scope of control of the software components subsystem 630. The software components 630, through the system software 640, however interact with the fog server controller 610 and compute nodes 615 to provide configuration and control inputs to the fog server 605 and/or other subsystems to drive their operation.

To provide a system wide solution, continuity of the network control extends to include both the virtual and physical components of the network. Therefore, the realm of the network subsystem 670 includes not only the physical network components 682 and the physical network 680, but also the virtual networks 620 and the virtual network components 622 which are created and exist within the fog server 605. This requires full integration between the network subsystem 670 and the fog server 605 to provide the mechanisms to exercise this control. For example, the fog server controller 610 can create the virtual networks 620 in the fog server 605 and control connectivity between the virtual machines/containers hosted on the compute nodes 615 and the virtual networks 620, while the network controller 690 can configure the virtual network components 622 of the virtual networks 620 in accordance with one or more network policies. This level of integration requires orchestration of instantiation and deletion sequences as, clearly, the virtual network 620 must exist before the virtual machines and containers can be connected.

The CS subsystem 650 has control over security components such as intrusion detection systems (IDS) 696A, intrusion protection systems (IPS) 696B (e.g., virtualized next generation firewalls) and the like as well as the CS controller 655 that disseminates security policies to different entities. The CS subsystem 650 can be integrated with all aspects of the SDA system solution in some embodiments. For example, the network controller 690 can utilize the security services provided by the CS subsystem 650 to provide security configuration information to the network components (e.g., physical or virtual) within its scope. In some embodiments, the fog server 605 can utilize this service to authenticate logins, provide security polices for host (virtual machine, container, bare metal) configurations, validate host images before instantiation, and the like.

In some embodiments, certain subsystems can be considered as being external to the SDA system solution. These external subsystems include non-SDN OT network and non-SDA edge devices 699 (e.g., legacy devices) and IT Network and back office equipment 698. In some embodiments, Industrial Internet of Things (IIoT) 697 or other a cloud based service may be considered external to or a part of the SDA system solution.

4. System Software or Automation Portal

Figure 7A:
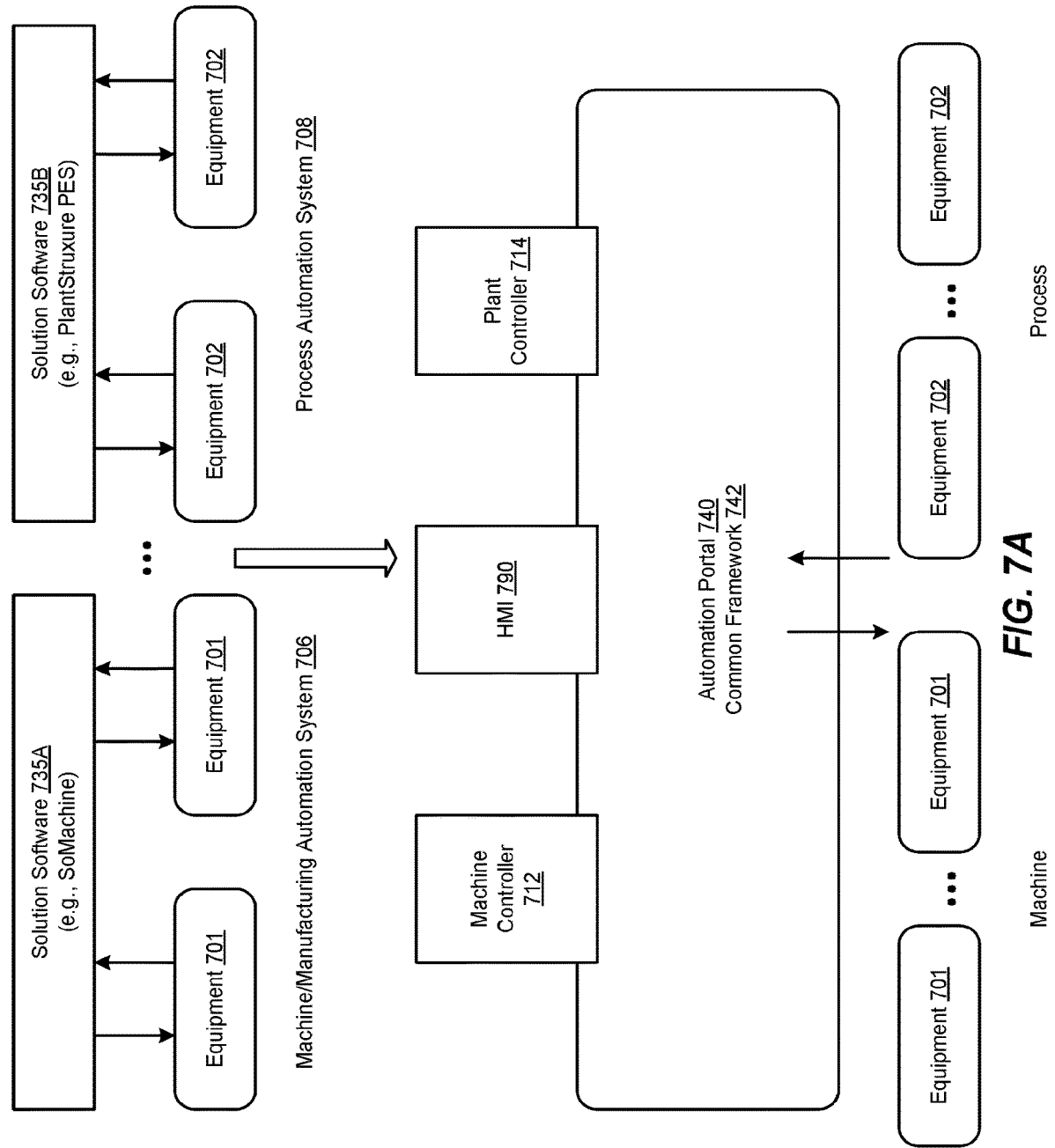
FIG. 7A is a block diagram illustration interaction between solution software and automation equipment in traditional automation systems and between a system software and automation equipment in an SDA environment in accordance with some embodiments.

FIG. 7A is a block diagram illustration interaction between solution software and automation equipment in traditional automation systems and in the SDA environment in accordance with some embodiments.

Typically, each type of equipment has its own specific software (also called tool or software tool) using which the equipment can be configured, parameterized and/or programmed. For example, in machine/manufacturing automation systems 706, solution software 735A such as SoMachine is used to configure, parameterize and/or program machine equipment 701. Similarly, in process automation systems 708, another solution software 735B such as PlantStruxure PES (Process Expert System) is used to configure, parameterize and/or program process. At the system level where automation equipment are more connected and more tightly integrated, it is highly inefficient for a user to manage these software solutions separately. In addition to the management concerns such as keeping track of software solution versions, upgrading and so on, the separate software solution also means that it is not possible for a user to have a system view of all equipment, i.e., machine equipment and process equipment.

In an SDA system, a system software 740, through a common framework 742 and other components, reconciles individual views in a system view. In other words, the system software 740 provides a system level view of all automation devices/equipment, taking into account the full automation scope. In the above example of an industrial automation system, this means that through the system software 740, a user can see the entire machine 701 and process equipment 702, and can configure, parameterize and/or program those machine and process equipment 701, 702 without having to separately launch or invoke equipment type specific software. The common framework 742, in particular offers consistent user interfaces, programming rules and infrastructure to simplify communication with the controllers (e.g., machine controllers 712, plant controllers 714), HMI 790, equipment 701, 702, and the like regardless of whether they are machine or process related. In this manner, the system software 740 facilitates design, development and management of an automation system as a whole.

Figure 7B:
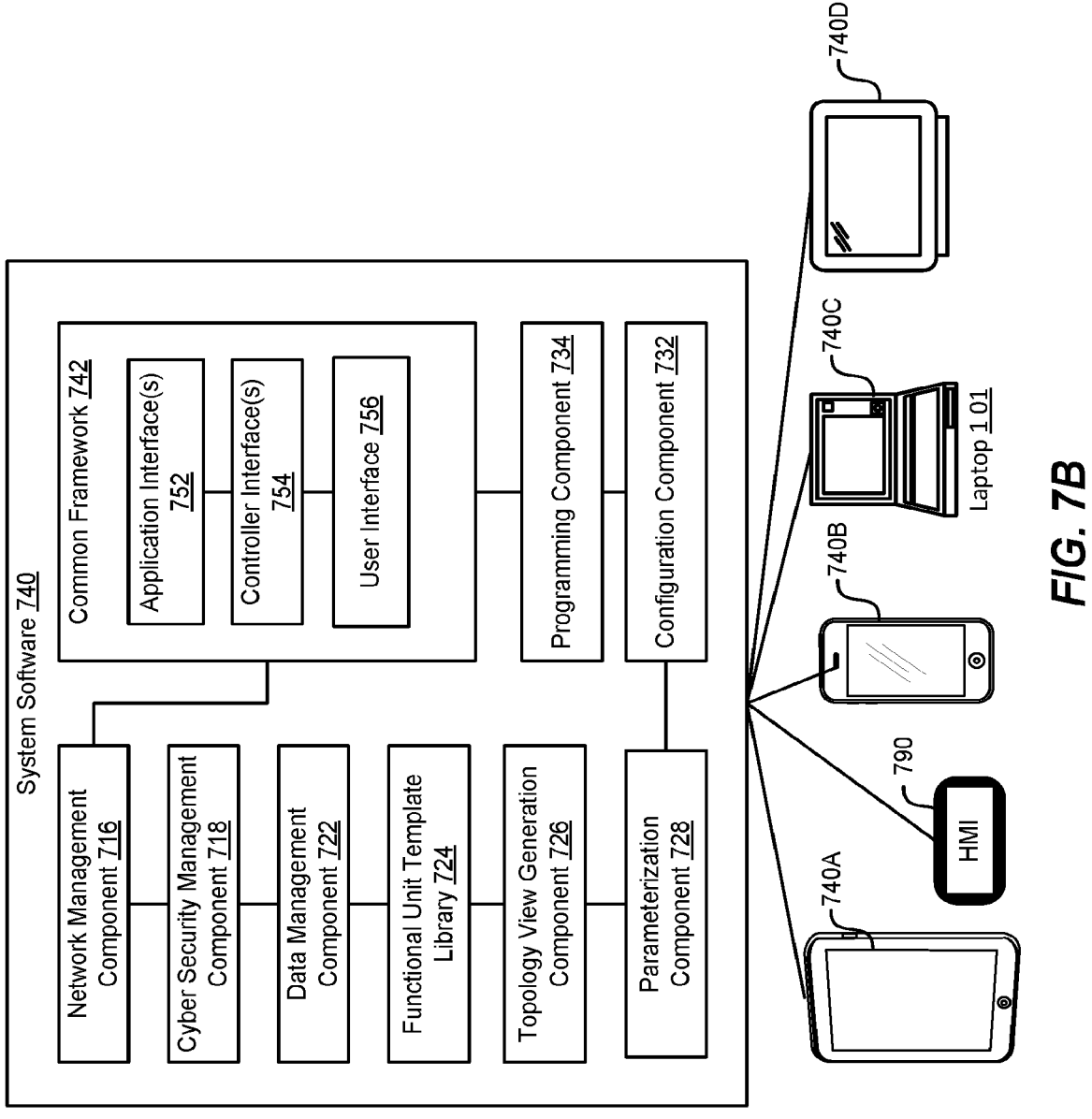
FIG. 7B is a block diagram illustrating example components of a system software of an SDA system in accordance with some embodiments.

FIG. 7B is a block diagram illustrating example components of a system software of an SDA system in accordance with some embodiments.

The system software 740 can be a web-based portal or a software application accessible from client devices. As used herein, client devices can include, but are not limited to: engineering stations, tablets 740A, mobile devices 740B, laptop computers 740C, desktop computers 740D, human machine interfaces (HMIs)/mobile HMIs 790, and the like. As previously described, the system software provides a single entry point through which a variety of SDA system managed automation devices or equipment, whether they are in the fog server or on the plant floor, can be configured, parameterized and programmed. Depending on the embodiments, the system software 740 can include more or less components. It should be noted that only select components of the system software 740 have been depicted for brevity.

The system software 740, in some embodiments, includes a common framework 742 as described above. The common framework 742 can provide application interface(s) 752, controller/device interface(s) 754 and user interface(s) 756 making tasks such as programming, configuration, tuning, diagnostics, etc., achievable from the system software user interface, and more efficient.

In some embodiments, the system software 740 includes a topology view generation component 726 which can collect topology information from various parts of an automation system and render a system level visualization of all automation equipment, whether physical or virtualized, and the links between them. In some embodiments, a topology view of a portion of the automation system can be generated. The topology view can be a table view (e.g., shown in a navigation panel of the system software 740) or a chart view (e.g., shown in a design panel of the system software 740). The topology information can be collected by querying components of the system software 740, the fog controller (e.g., fog server controller 410 in FIGS. 4A-4B, fog server controller 610 in FIG. 6A), the network controller (e.g., the network controller 690 in FIG. 6A, connections and existence of flows between components), and/or other subsystems of the SDA system in some embodiments.

The system software 740 can also include a functional unit template library 724 in some embodiments. The templates of functional units are software models of functional units that can be parameterized and instantiated in the fog server. A functional unit, as used herein, is a hardware entity, a software entity or a hybrid entity with hardware and software portions capable of performing a specified purpose or function. It should be noted that a functional unit can be composed of other functional units. For example, a PLC, a drive, a motor and an I/O module can each be considered a functional unit, and so can a conveyor belt system comprising of three PLCs, two IO modules, a drive and a motor.

In some embodiments, the system software 740 can include a set of components implementing domain specific logic or applications. For example, a parameterization component 728 can carry out parameterization of equipment and functional unit templates described above (e.g., HMI parameterization). As used herein, parameterization includes setting or defining properties. For example, a user can select an equipment from a topology view to parameterize. The parameterization component 728 can automatically launch a parameterization interface (e.g., menu) of a parameterization software associated with the equipment. Likewise, a configuration component 732 can carry out configuration of equipment (e.g., motion drive configuration). As in the case of parameterization, a user can select an equipment from the topology view to configure. In response, the configuration component 732 can display a configuration interface of a configuration software associated with the selected equipment. Similarly, a programming component 734 can launch the programming interface of a programming software associated with a selected equipment. A user can write or edit program code directly from the programming interface displayed in the system software without having to launch the programming software. If the user wants to change the program code of another equipment (e.g., an equipment of the same type but different vendor, or completely different equipment type (e.g., drive instead of PLC)) that uses a different programming software, the programming component 734 automatically identifies the equipment and launches the programming interface suitable for that equipment along with any program code associated with or currently deployed on the equipment. In some embodiments, the associations between equipment/equipment type and applications can be user-defined and stored in a storage node.

In some embodiments, the system software 740 can also include a set of components that support cybersecurity management, network management, data management, and/or other aspects of an automation system. For example, the network management component 716 can monitor automation equipment connected to the device and/or management networks (e.g., to discover new devices as they connect to a network, to discover a device that goes offline). In some embodiments, the network management component 716 can also monitor network components such as switching and routing hardware that are part of the physical network.

The cyber security management component 718, in some embodiments, can manage cyber security aspects of the automation system. For example, the CS management component 718 can create and maintain security profiles that can be associated with any new functional unit or automation equipment in the automation system. The data management component 722 in some embodiments can manage how data is shared among the different components and equipment in the automation system. Typically, large quantities of different data are generated by different parts of the system. Pulling the large quantities of data into one place, and managing, organizing and displaying such data becomes a complex and daunting task. The system software 740, through the data management component 722, solves this problem by aggregating data from the different parts of the system in one place, making organization and analysis of the data much more efficient. In some embodiments, the data management component 722 can provide various filters which can be applied to view select data associated with a specific equipment or a subset of equipment, without having to access different software associated with different equipment. In some embodiments, the data management component 722 can also manage and display in the system software environment, system variables which include data shared between different devices in the system and publishers of the data.

Figure 7C:
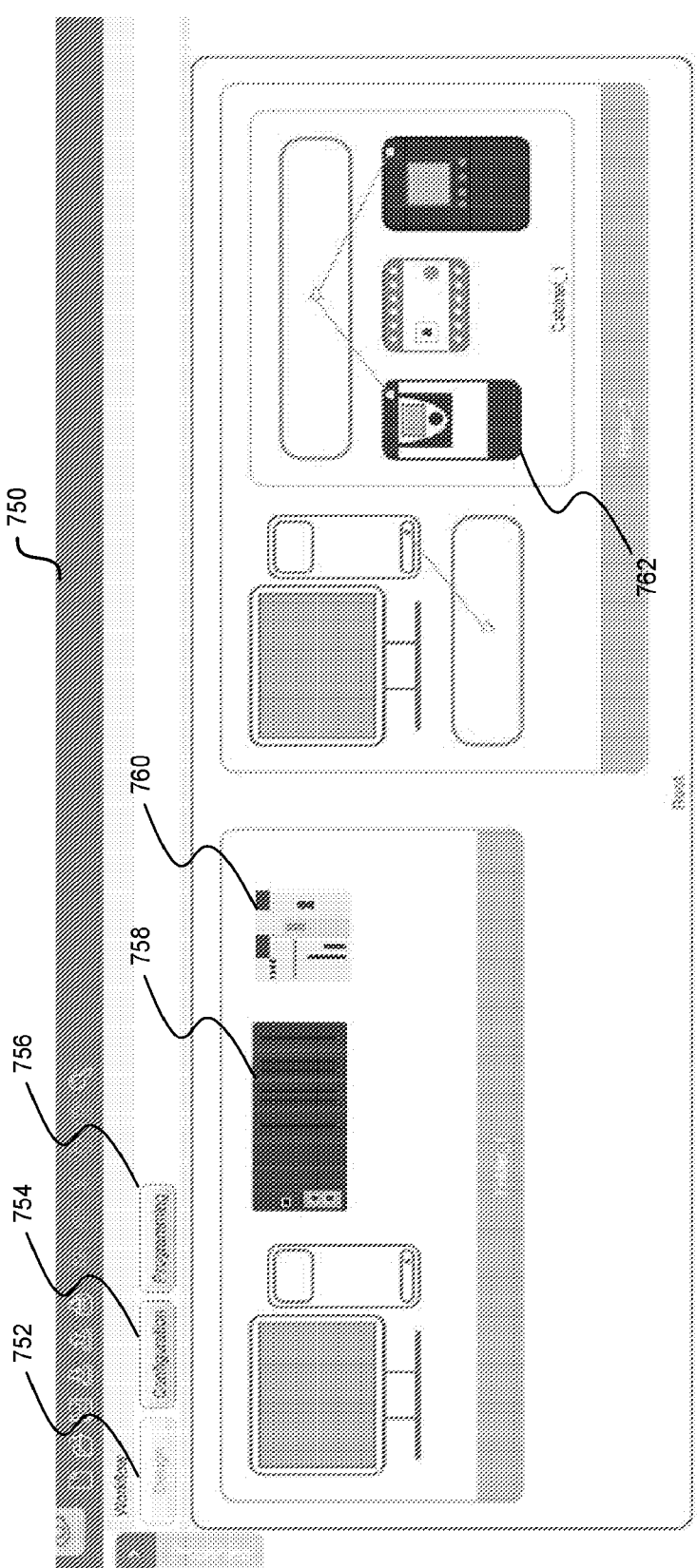
FIGS. 7C-7F are screenshot diagrams illustrating example user interfaces of a system software in accordance with some embodiments.
Figure 7D:
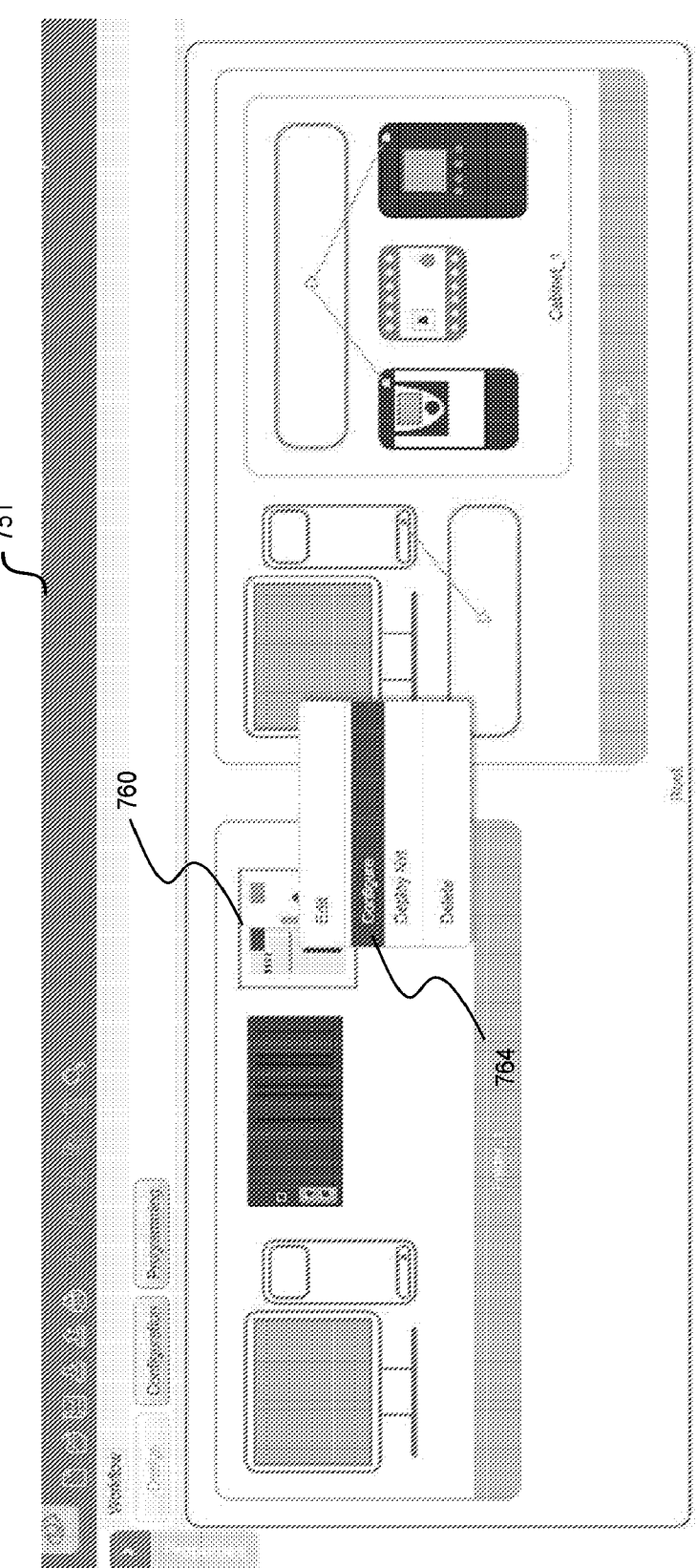

FIGS. 7C-7F are screenshot diagrams illustrating example user interfaces of the system software in accordance with some embodiments. FIG. 7C depicts an example screenshot of a user interface 750 of the system software 740 providing a graphical view of devices in an example automation system. Through the system software, a user can manage the entire lifecycle of the system starting from design 752, configuration 754 and programming 756. As depicted, the example automation system includes a PLC 758, a PLC 760 and a drive 240 among others.

Figure 7E:
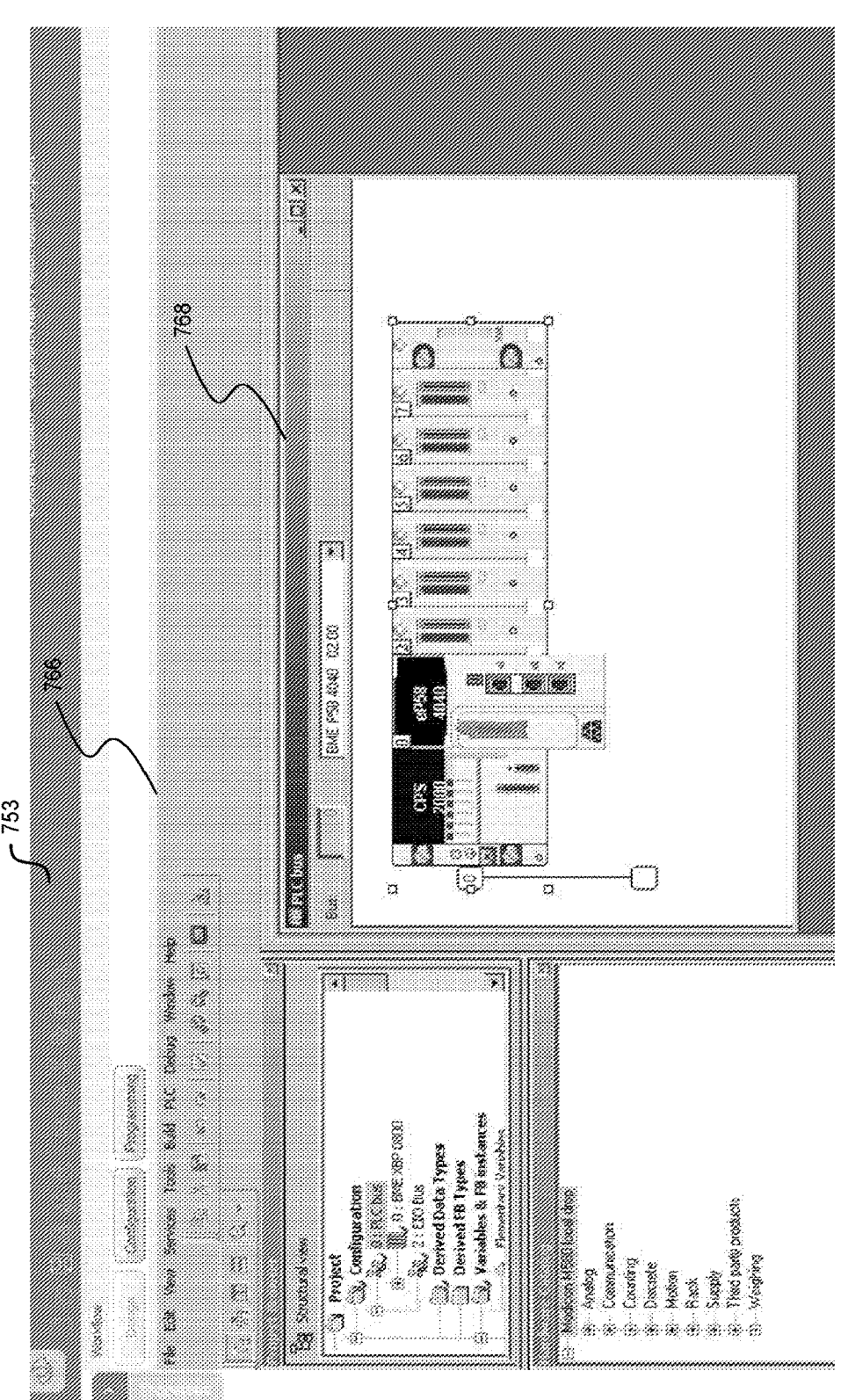
Figure 7F:
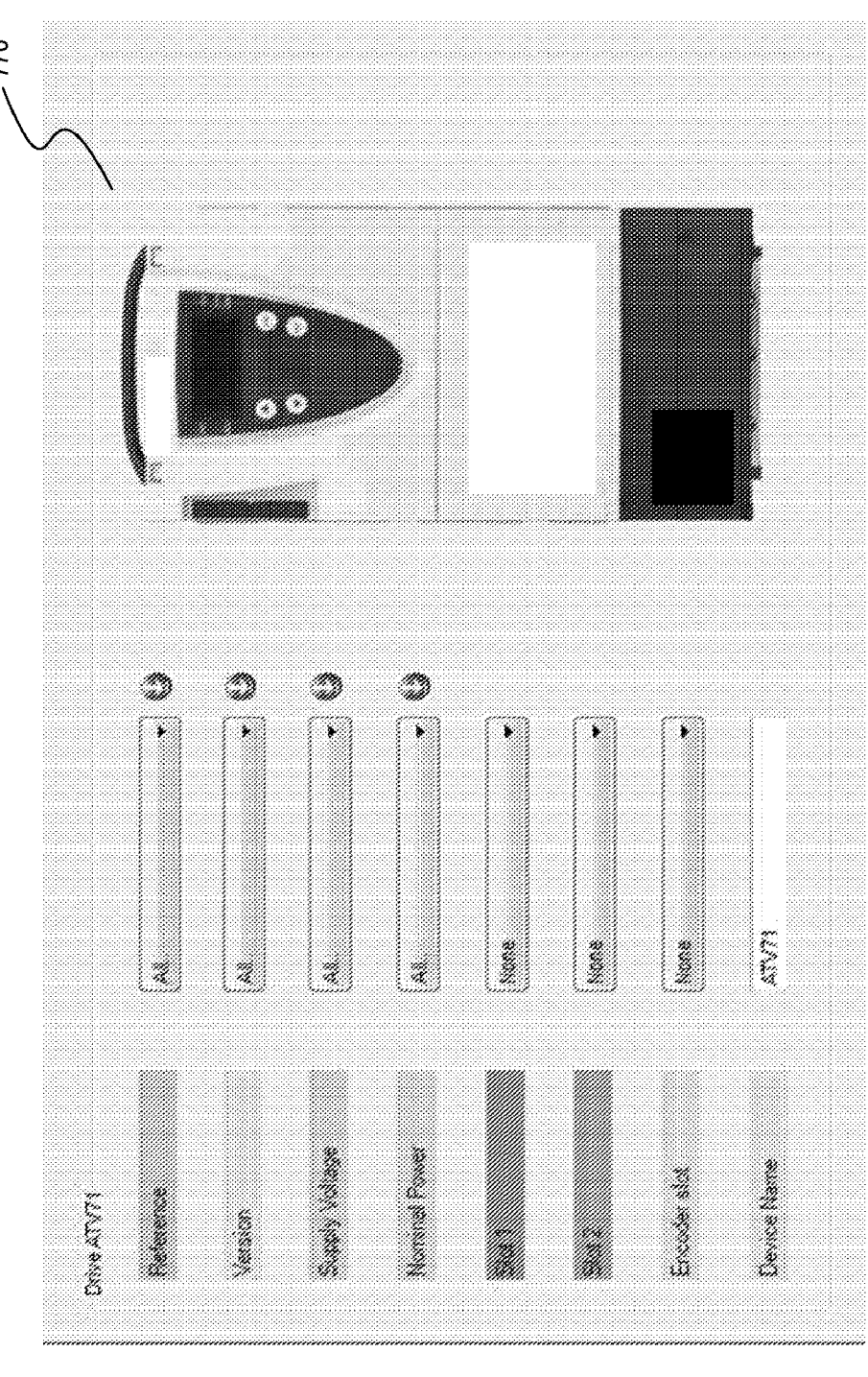

In some embodiments, the system software enables different software applications associated with the devices shown in the graphical view to be directly accessed from the system software interface (or design view). For example, as depicted in the screenshot 751 of FIG. 7D, a user can select the PLC 760 and click on "configure" from the menu 764. The screenshot 753 of FIG. 7E depicts a PLC configuration interface 768 of the PLC configuration application 766 that is launched in response to the configure request. Similarly, an example configuration screen 770 associated with the drive 762 depicted in FIG. 7C can be accessed directly from the system software as depicted in the screenshot 755 in FIG. 7F. In some embodiments, the code programmed into a device can also be accessed, edited and redeployed to the device directly from the system software.

5. Fog Server

Figure 8A:
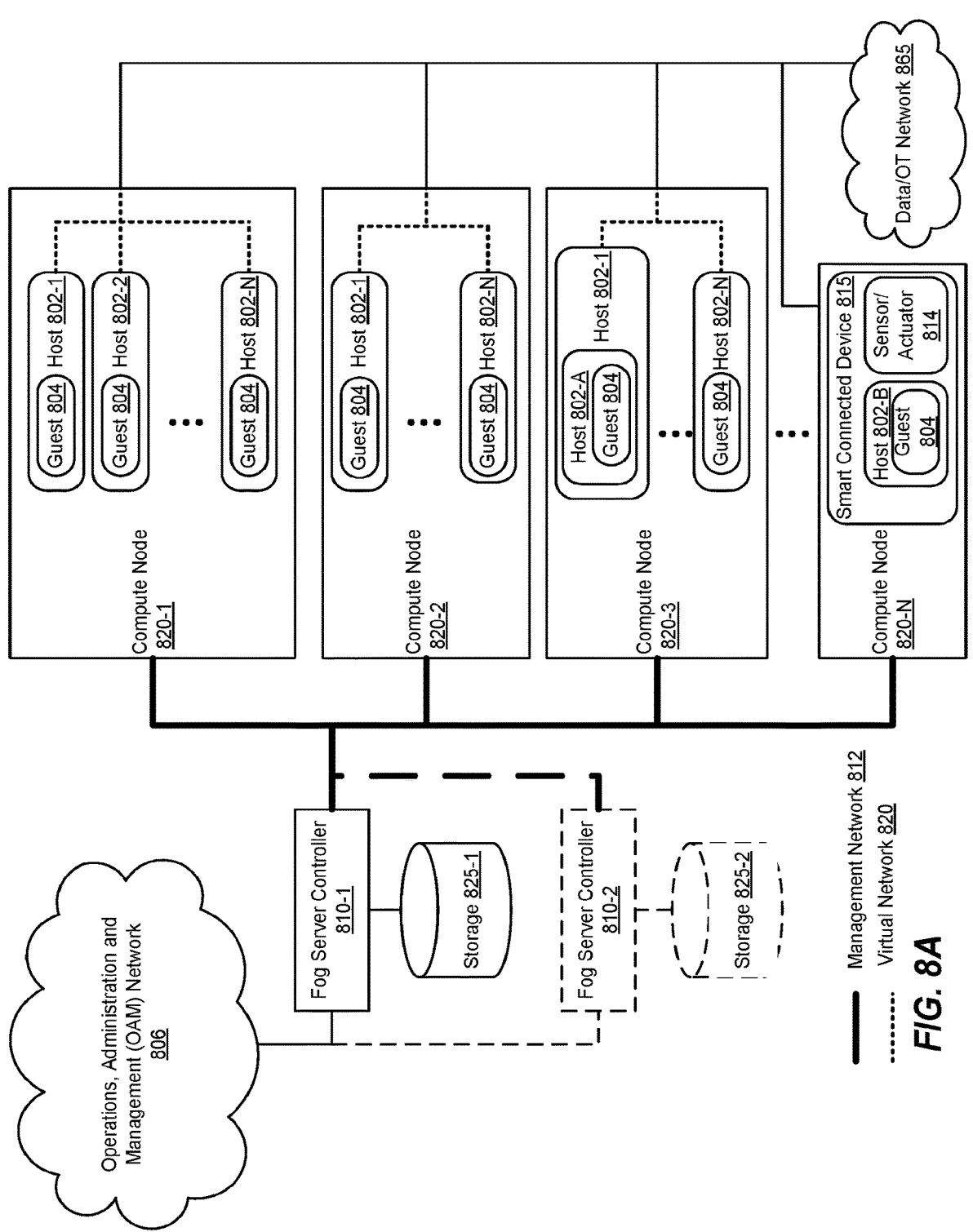
FIG. 8A is a block diagram illustrating example fog server components in accordance with a first embodiment.

FIG. 8A is a block diagram illustrating fog server components in accordance with a first embodiment. The fog server is comprised of a control and management infrastructure called the controller nodes 810-1, 810-2 along with the associated compute nodes 820-1, 820-2, 820-3, . . . , 820-N. Each of the compute nodes 820-1, 820-2, 820-3, . . . , 820-N can execute a number of hosts 802-1, . . . , 802-N and associated virtual networks 820. These hosts can be virtual machines, containers or bare metals. Each host in turn can execute a guest 804. A guest 804 can include an application, an application function (i.e., a piece or portion of an application corresponding to or performing a function), or any software implementation of a physical device, component or functional unit. In some embodiments, a host 802-1 can execute another host 802-A which in turn can run a guest. For example, the host 802-1 of compute node 820-3 can be a virtual machine on which a container 802-A is instantiated to run guest 804. The virtual networks 820 connect from within the compute nodes (e.g., 820-1, 820-2, . . . ) through external interfaces (e.g., Ethernet ports) to the external physical networks (e.g., Data/OT network 865). Virtual networks 820 reside inside the compute nodes (e.g., 820-1, 820-2, . . . ) and provide connectivity between the virtualized entities and the physical world. In some embodiments, a compute node can be a smart connected device, which can have a physical part and a virtual part. For example, the compute node 820-N can be a smart connected device 815 which can execute a host 802-B running a guest 804. The same smart connected device 815 can also have a physical sensor/actuator 814. The compute node 820-N as other compute nodes can connect to the data/OT network 865.

The guests 804 are not considered part of the fog server; however, the management of these entities is within the realm of the fog sever. Some of the management actions include distribution and re-distribution of the hosts, host instantiation, resource planning and management (e.g., allocating RAM, network interfaces, and other resources), storage allocation, destruction, and the like.

While the virtual networks 820 are configured through services provided by the fog server, the responsibility for the orchestration of these networks belongs to the network subsystem. This allows for cohesive network management between the physical and virtual networks.

The fog server controller nodes 810-1, 810-2 are interconnected to the compute nodes 820-1, 820-2, . . . , 820N via management network links 812. These links may be physical with dedicated cabling or may be logical links on an underlying physical network. For example, link 812 can be on the physical networks 806 or 865. By way of another example, links 806, 812 and 865 can share the same physical network, but different logical networks. Use of technologies such as VLANs, VxLANS, VTNs, and the like, to provide logical separation of the physical network enables a single network to be used for multiple purposes concurrently. In some embodiments, the fog server controller 810-2 can be a redundant controller that provide high availability (HA) capability.

The storage node(s) 825-1/redundant storage node 825-2 can provide a high volume storage solution that is optimized for the type of access and data and latency requirements needed to run an automation system. This node may be optional in some embodiments. The storage node(s) may be incorporated into the system as storage node(s) directly connected to the management network(s) 812 and/or OAM network(s) 806. If the storage node is not provided, this role can be assumed by the controller nodes 810-1, 810-2 and/or compute nodes 820-1, . . . , 820-N. The storage nodes can use redundancy to provide HA in some embodiments. It should be noted that in some embodiments, the storage node 825-1, 825-2 can be a logically centralized node comprising of other storage nodes that may be potentially distributed.

Figure 8B:
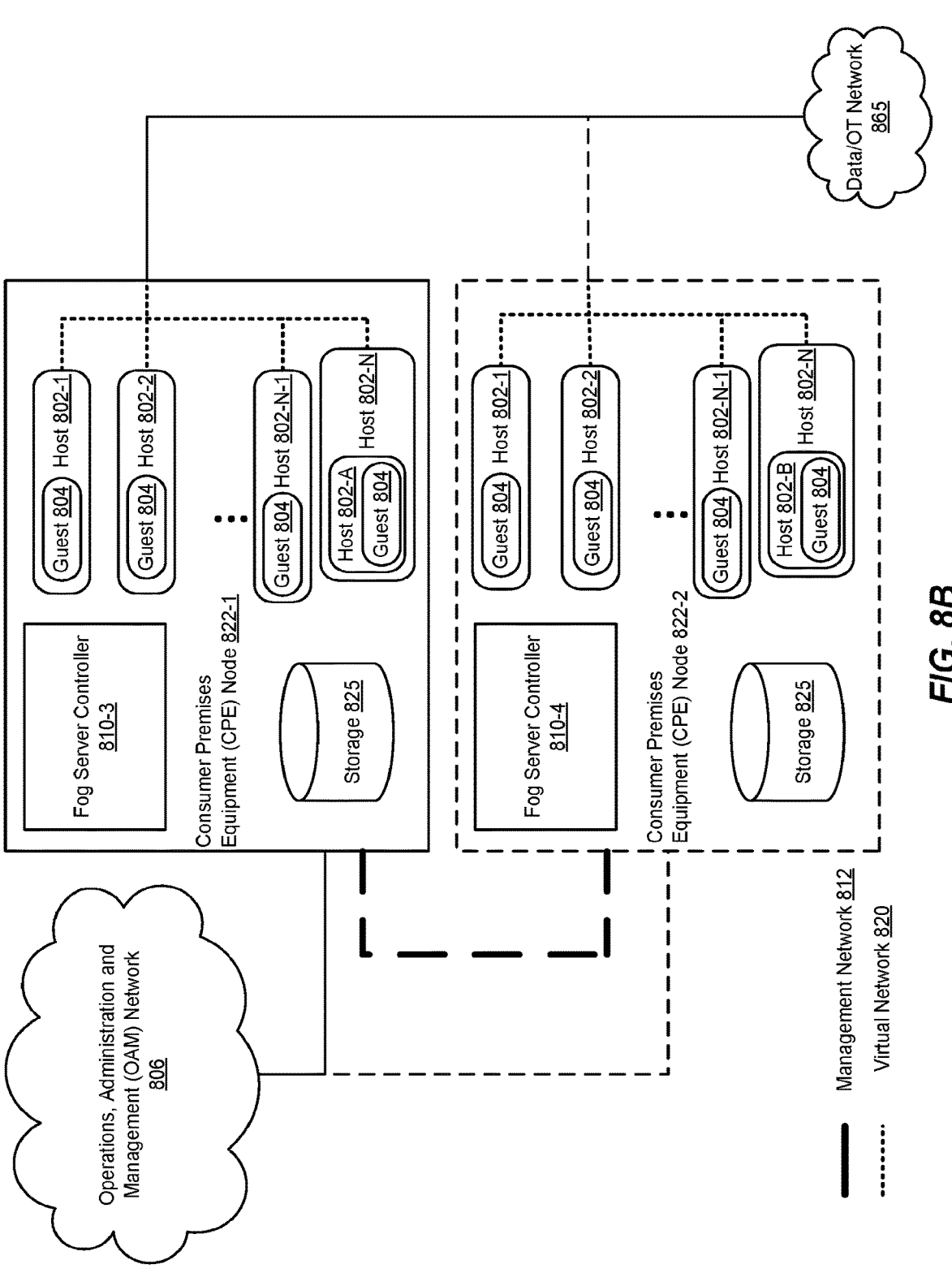
FIG. 8B is a block diagram illustrating example fog server components in accordance with a second embodiment.

FIG. 8B is a block diagram illustrating fog server components in accordance with a second embodiment. This alternative deployment scenario optimizes the hardware used to implement the fog sever. This deployment scenario, known as Customer Premise Equipment (CPE) model, collapses the controller, storage, and compute functions into a single server device, i.e., CPE node 822-1. The CPE server node can also be duplicated (i.e., CPE node 822-2) to provide HA deployments in some embodiments. In this embodiment, the CPE server nodes may communicate through a management network 812. Storage node(s) 825 may be incorporated into the system as storage nodes(s) directly connected to the management network(s) 812 and/or OAM network(s) 806 and/or data network(s) 855. If the storage node is not provided, this role can be assumed by the CPE nodes 822-1 and 822-2. This scenario provides a low cost solution that could be used in smaller deployment targets that accept the constraint of not having distributed compute nodes.

Figure 9A:
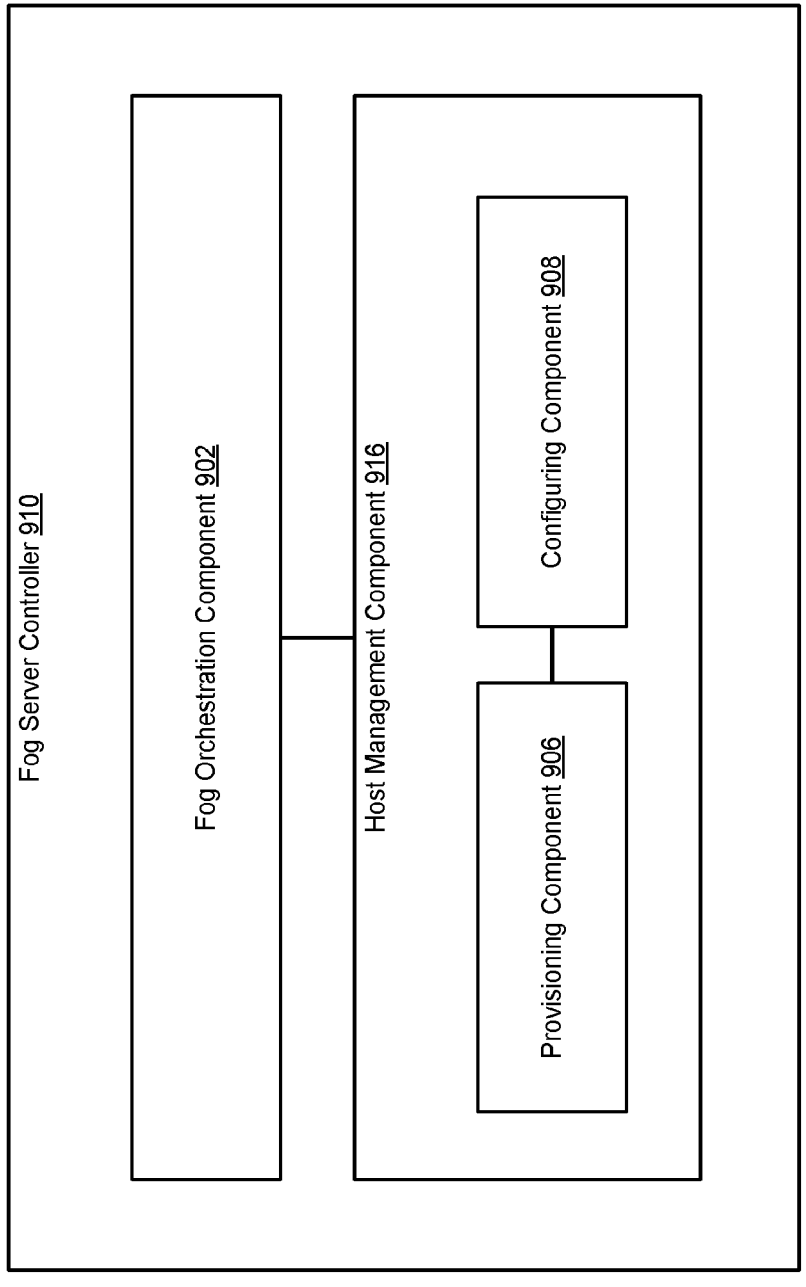
FIG. 9A is a block diagram illustrating example components of a fog server controller in accordance with some embodiments.

FIG. 9A is a block diagram illustrating example components of a fog server controller in some embodiments. As depicted, a fog server controller 910 can include a fog orchestration component 902 and a host management component 916 among others. The fog orchestration component 902 interacts with the orchestration components of other subsystems of an SDA system for provisioning, configuring, management, and the like. The role of the fog orchestration component 902 is discussed in detail in FIGS. 10B and 11.

In some embodiments, the host management component 916 can utilize one or more host virtualization technologies to provide a virtualization infrastructure on which an automation system can be run and/or managed. For example, the host management component 916 can utilize host virtualization technologies to create virtualized instances of a device (e.g., software implementation of the device on a virtual machine), application or function in the automation system. The virtualized device runs as a software only instance in an environment that presents to the virtual device an abstraction of the physical hardware isolated from the host system. In addition to devices, various other aspects of the automation system such as networks and security elements can also be virtualized in some embodiments. Some of the host virtualization technologies that can be utilized by the host management component 916 are described in detail below.

A. Classic VM

Figure 9B:
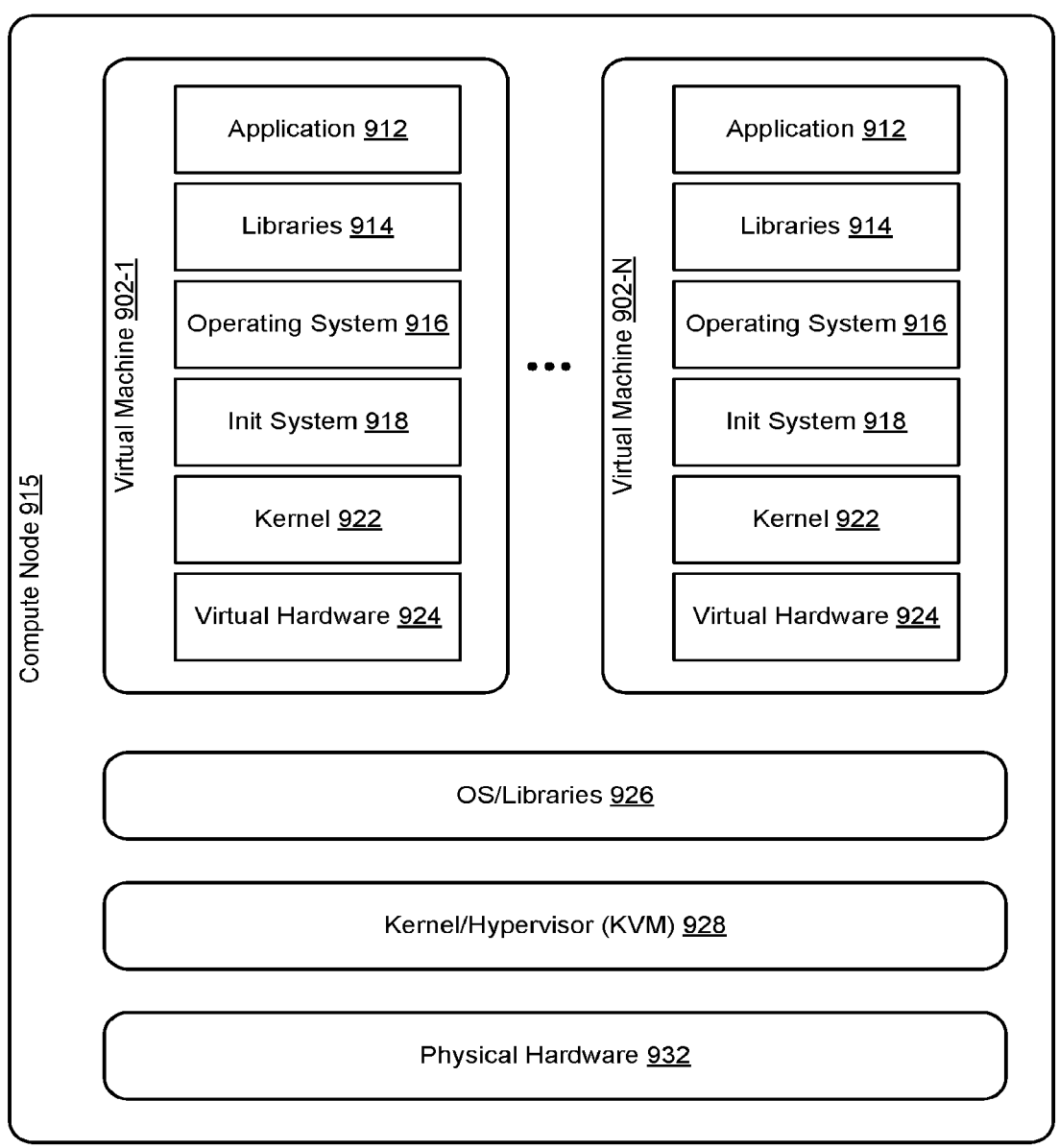
FIG. 9B is a block diagram illustrating example components of a compute node hosting virtual machines in accordance with some embodiments.

FIG. 9B illustrates example components of a compute node hosting virtual machines. In some embodiments, compute nodes 915 with virtualization support can use virtual machines (VM) (host) 902-1, . . . , 902-N to provide highly flexible, sandboxed applications 912 (guest). A compute node 915 hosts one or more virtual machines 902-1, . . . , 902-N including the business logic of the application 912 and its own OS/libraries 926. This mechanism provides a flexible application as the guest VM can be based upon any operating system 916 and can even use emulation to release constraints on hardware architecture. As such the virtual machine can have its own virtual hardware. Indeed, because VMs are provided with direct access to the CPU through the hypervisor and each classic VM has its own virtual hardware 924, kernel 922, init system 918, and OS 916, it is possible to run completely different OSes (e.g. Windows, Linux) on the same compute node concurrently, regardless of the compute node's native OS. The penalty compared to the other solutions (described below) may be in performance and determinism. Another downside may be the size of the application which could be substantially larger as it must include a full kernel 922, init system 918, an operating system 916, and associated libraries 914. Typically access to the physical hardware 932 is provided through a hypervisor 928 which adds an additional layer and associated latency. Some vendor specific accelerations can be used to mitigate this effect.

The virtual machines 902-1, . . . , 902-N can be migrated live, i.e., running VMs can be migrated from one compute node to another with very minimal impact to the running VMs and the associated application processes. This enables the host management component 916 and/or fog orchestration component 902 to provide a degree of load balancing, high availability, and energy management by optimizing VM distribution among multiple compute nodes 915 and to shut down unneeded compute nodes.

B. Containers

Figure 9C:
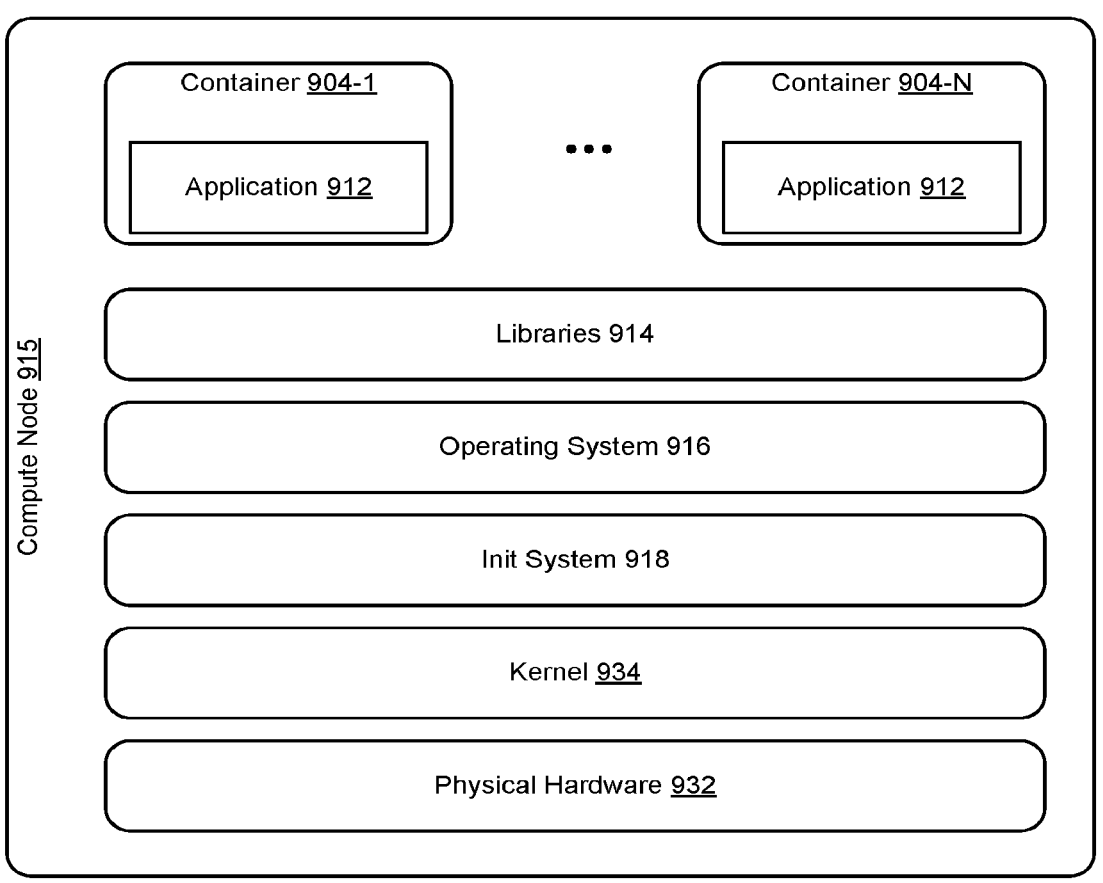
FIG. 9C is a block diagram illustrating example components of a compute node hosting containers in accordance with a first embodiment.
Figure 9D:
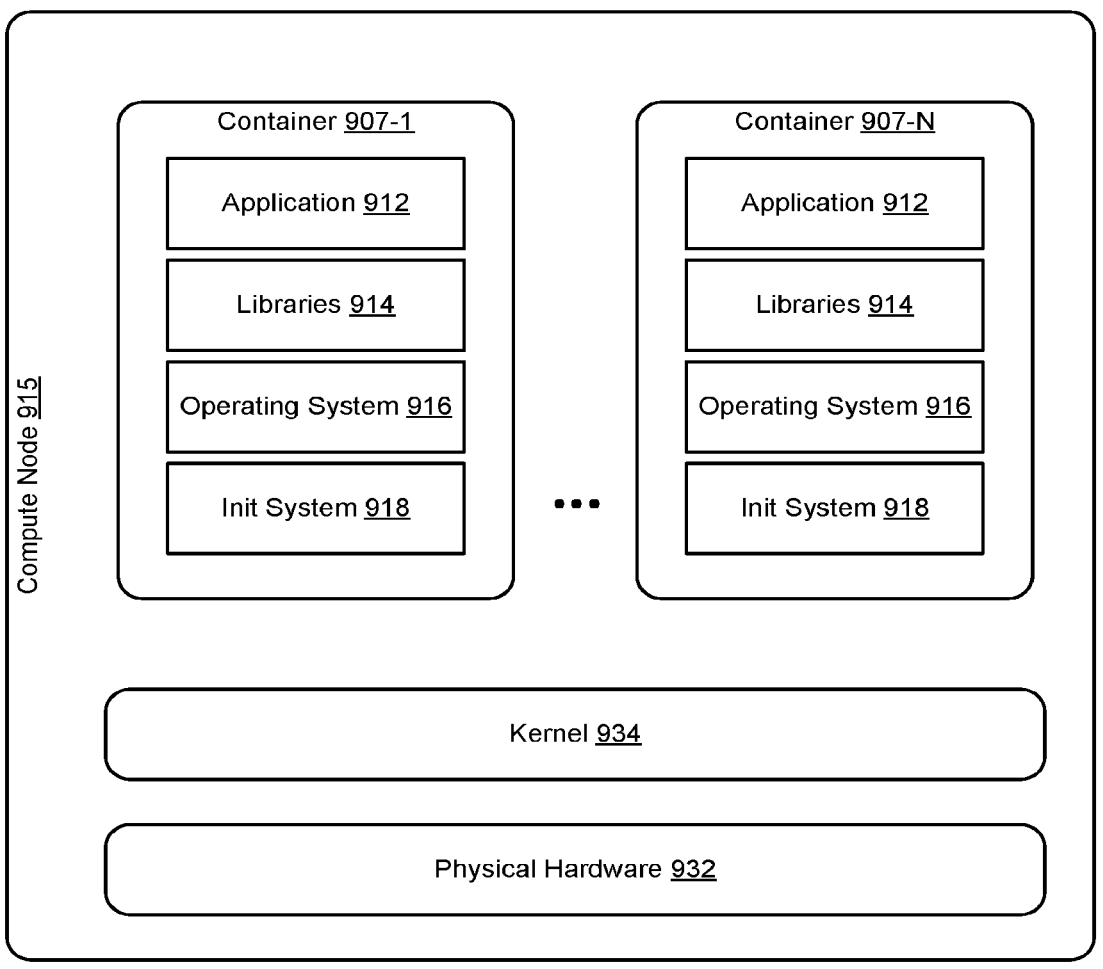
FIG. 9D is a block diagram illustrating example components of a compute node hosting containers in accordance with a second embodiment.
Figure 9E:
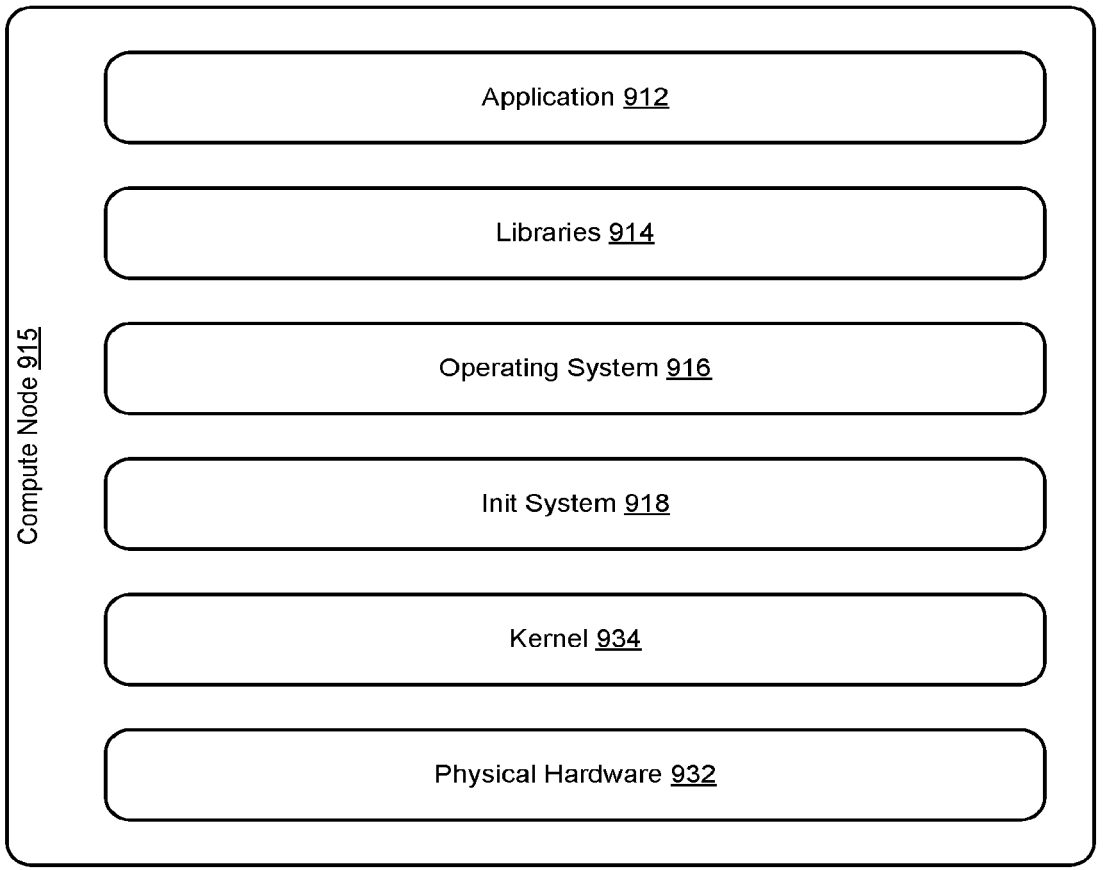
FIG. 9E is a block diagram illustrating example components of a compute node hosting a bare metal image.

FIGS. 9C and 9D illustrate example components of compute nodes hosting containers. Containers provide performance, flexibility and size improvements for the applications but come with their own set of constraints. Containers use a memory sandbox that is supported by the hardware of the host machine to provide a secure and isolated environment to run the application. Use of a container provides some performance and size improvements over a VM as it directly uses the host's drivers without the hypervisor layer. However, with containers, an application is inextricably linked to the host's hardware architecture and kernel. One example application of containers is in a demand response scenario.

Referring to FIG. 9C, to achieve better performance, some containers 904-1, . . . , 904-N can include only the application 912, while relying upon the kernel 934, init system 918, operating system 916, and libraries 914 native to the compute node. These containers have more limitations from a libraries/application development point of view, but are lighter weight, smaller, faster to spawn, and are capable of the better performance.

Referring to FIG. 9D, some containers 907-1, . . . , 907-N can include the full operating system 916 (minus the kernel) for the guest application 912, init system 918, and libraries 914 but run within the sandboxed container space of the host. Since the containers rely upon the host's kernel 934 and its associated physical hardware 932, they must also match the hardware architecture and kernel lineage of the host 915.

Like VMs, containers can also be migrated live from one compute node to another.

C. Bare Metal

FIG. 9D illustrates example components of a bare metal compute node. In some embodiments, compute nodes 915 can serve as bare metal hosts to enable embedded systems to be managed by the fog server host management component 916. The bare metal hosts run a purpose built binary image that is tightly coupled to the host hardware 932—much like a traditional embedded device. This binary image can take full advantage of the direct access to the hardware 932 just as if the image were installed at the factory. In some embodiments, similarly to how VMs are managed within the fog server, bare metal compute nodes can be provisioned and configured through the provisioning component 906 and configuring component 908 of the host management system 916 in FIG. 9A.

In some embodiments, the bare metal image may be a complete kernel 934 and OS 916 to turn the bare metal node into a full compute node with VMs and/or containers with its own support for VMs and/or containers.

Referring to FIG. 9A, the provisioning component 906 can create provider and/or tenant virtual networks and virtualized instances and connect them together. The configuring component 908 can facilitate configuration of the virtualized instances and/or physical devices under the management of the fog server. The data that is used for configuration can be received from the system software in some embodiments.

6. Orchestrations in an SDA System

Figure 10A:
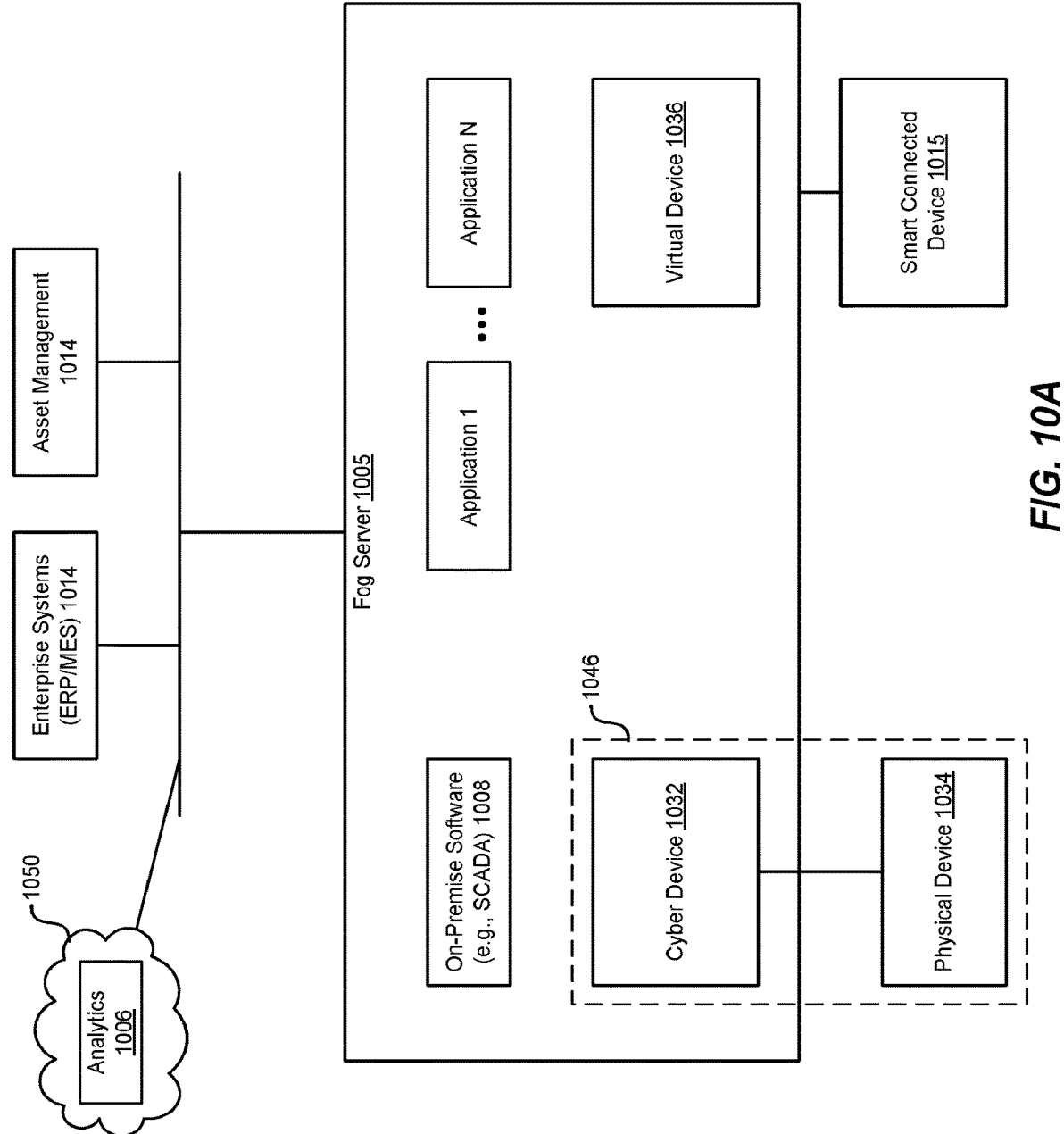
FIG. 10A is a block diagram illustrating an example of a component view of an SDA system in accordance with some embodiments.

FIG. 10A is a block diagram illustrating an example of a component view of an SDA system in accordance with some embodiments. In the fog server (or the fog platform) 1005, one or more virtual devices 1036 and instances of applications 1-N can run on one or more compute nodes (not shown) and/or edge devices depicted as a smart connected device 1015. In some embodiments, analytics application(s) or engines 1006 can run on a remote cloud 1050 (e.g., cloud 450 in FIG. 4) as depicted, in the fog server 1005 or both. In an industrial automation system, applications relating to enterprise systems 1035 (e.g., Enterprise Resource Planning (ERP), Manufacturing Execution System (MES)) and asset management 1014 can run at the enterprise room level (e.g., level 4, enterprise room level 205 in FIG. 2B) or on the fog server 1005, while some on-premise software 1008 (e.g., SCADA) can run in the fog server 1005. In a building automation system, the applications running at the enterprise level and at the fog server 1005 level can be of building management systems (not shown).

In some embodiments, a physical device 1034 may not have the capability to connect to the network to become a fog server managed device. Such a device can still be managed and controlled via a cyber device 1032 that is managed by the fog server 1005. This cyber device 1032 can be a virtual representation of one or more physical devices. The cyber device 1032 can publish/subscribe to real time data in the fog server 1005 or alternatively can use point to point communication to get access to data from applications/devices managed by the fog server 1005. The cyber device 1032 can communicate with the physical device 1034 over an OT protocol. The fog managed cyber device 1032 can thus be communicatively coupled to a physical device 1034 via an OT protocol to form a software defined machine 1046.

Figure 10B:
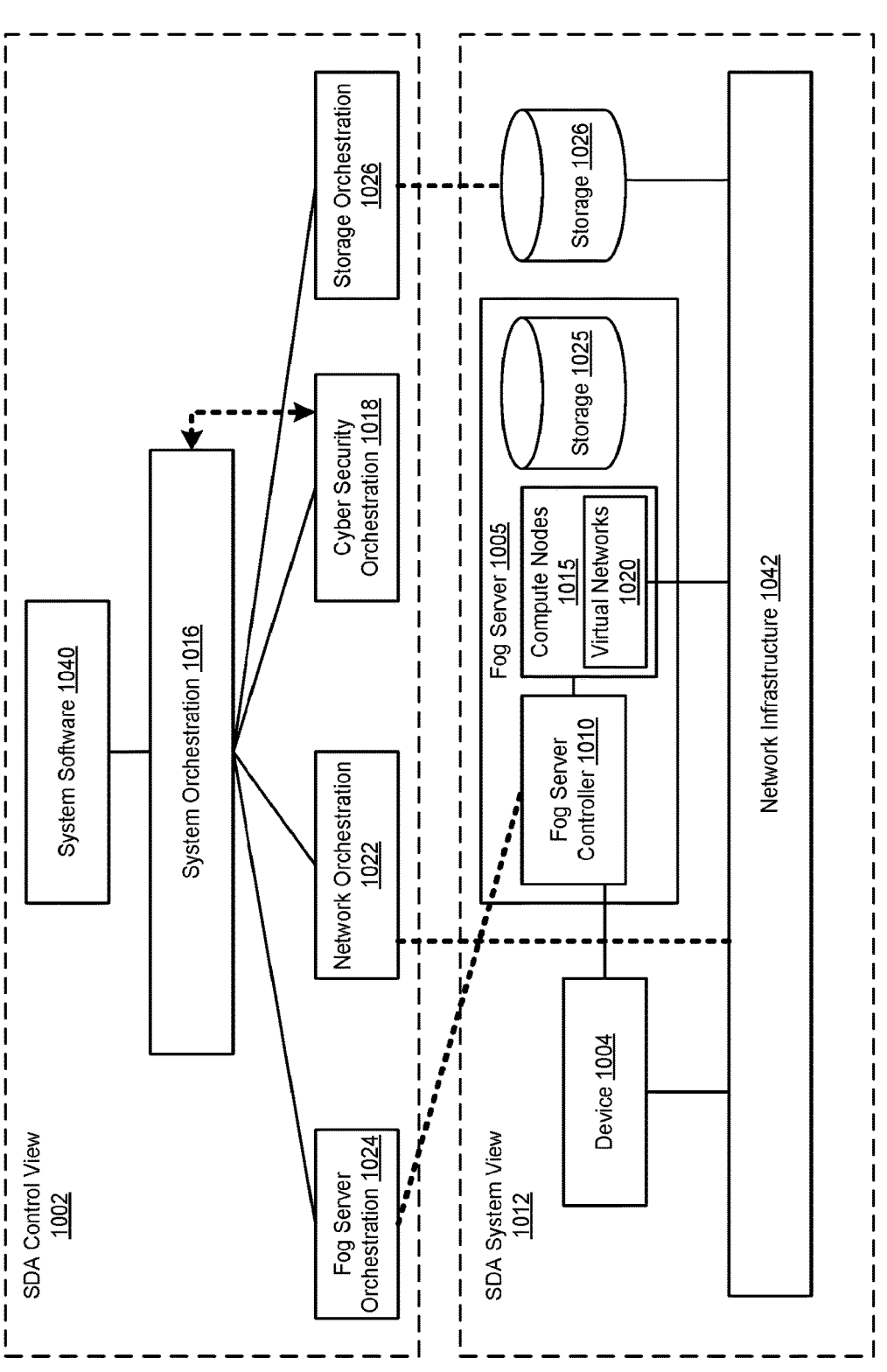
FIG. 10B is a block diagram illustrating examples of a control view and a system view of an SDA system in accordance with some embodiments.

FIG. 10B is a block diagram illustrating examples of a control view and system view of an SDA system in accordance with some embodiments. The SDA control view 1002 includes a system software 1040 and a number of orchestration components which ensure that each of the SDA subsystems work in coordination with one another to define or commission and manage the automation system. The orchestration components include a fog server orchestration component 1024, a network orchestration component 1022, a cyber security orchestration component 1018 and a storage orchestration component 1016.

The SDA system view 1012, in some embodiments, includes a fog server 1005 having a fog server controller 1010, one or more compute nodes 1015 and storage 1025. In some embodiments, storage may be outside of the fog server 1005 as depicted by storage 1026. The compute nodes 1015 and storage 1025 in the fog server 1005 can be can be orchestrated together by the fog server orchestration component 1024 in some embodiments (i.e., fog server orchestration 1024 and storage orchestration 1026 can be combined). While each one of the orchestration components are individually orchestrated, a top level orchestration component—the system orchestration component 1016—orchestrates them together to virtualize devices and applications on compute nodes 1015 in the fog server 1005 (via fog server orchestration 1024), manage data associated with those virtualized devices and applications in storage 1025/1026 (via storage orchestration 1026), define and disseminate cyber security policies to all components of the SDA system (via cyber security orchestration 1018), and network flows and communications (via network orchestration 1022). A system software 1040 interfaces with the system orchestration component 1016 to transform commands/instructions/signals (e.g., from user or another system) via fog server orchestration 1024, network orchestration 1022, cyber security orchestration 1018 and/or storage orchestration 1026 into automation system changes. Moreover, the system software 1040 can run on the fog server 1005 and has a complete view of the automation system.

In some embodiments, network orchestration includes SDN orchestration (e.g., via SDN controller), TSN orchestration (e.g., via TSN controller) or SDN-TSN orchestration, which is a combination of SDN and TSN orchestrations (via both SDN and TSN controllers).

In some embodiments, the application instances miming in the fog server 1005 or on an edge device 1004 can share data using a communication protocol such as Data Distribution Service (DDS) or Open Platform Communications Unified Architecture (OPC-UA). DDS enables any equipment connected to the network 1042 to subscribe to any data produced by fog server managed devices (e.g., device 1004, virtual devices/components in the compute nodes 1015). The devices can update the subscribers in real time by publishing the data value when those values change in some embodiments.

In other embodiments, data may be shared via point to point communication. Regardless of the shared or point to point communication protocols used, data traffic to/from the application instances executing on virtual devices/components in the compute nodes 1015 are carried on virtual networks 1020 which map to the physical network 1042. Similarly, data traffic to/from applications executing on physical devices are carried by the physical network 1042.

Figure 11:
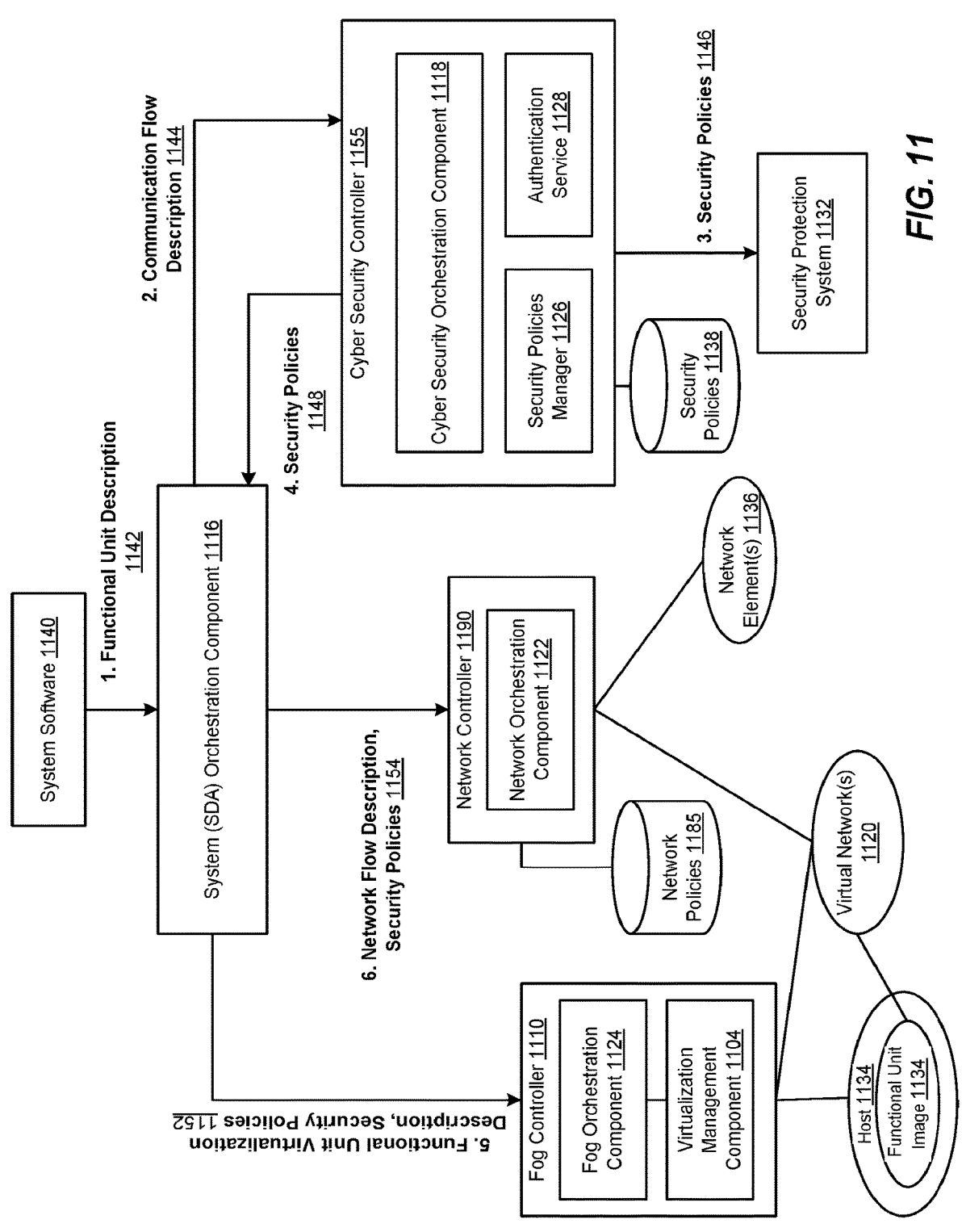
FIG. 11 is a block diagram illustrating an example of orchestration of SDA subsystems to provision a functional unit on a compute node in accordance with some embodiments.

FIG. 11 is a block diagram illustrating an example of orchestration of SDA subsystems to provision a functional unit on a compute node in accordance with some embodiments.

In some embodiments, a system software 1140 running an instance of an engineering toolchain enables a user to instantiate and manage an SDA system. An engineering tool chain can be specific to a targeted automation system. For example, a toolchain targeted for an industrial automation system would be different from one targeted for a building automation system because those automation systems can have different types of automation devices (and thus different device/functional unit templates) as well as one or more software applications for parameterization, configuration, programming, and the like. The engineering toolchain is integrated with a system (SDA) orchestration component 1116 via an application programming interface (API). So when the toolchain user issues a command, the toolchain drives the system orchestration component 1116 in a way that causes the SDA system as a whole to work in coordination with one another to execute the command.

Consider a scenario in which the baggage handling capacity in an airport needs to be increased by adding a new conveyer belt. A user can access the system software 1140 (loaded with a suitable toolchain) and select a functional unit template, for example a template for a conveyer belt system, from a pick list and add it to the control system design panel. The user can parameterize the template to provide instance information for the new functional unit. For example, the conveyor belt template may comprise of three virtual PACs, a number of IOs, a number of physical and virtual switches. The user can provide instance information such as but not limited to: instance identity (e.g., component/device names, IP addresses, etc.), I/O connectivity (e.g., how the elements of the functional unit are connected, which I/O devices can the functional unit read from/write to), timing constraints (e.g., maximum deterministic response time or transfer time between the functional unit and another entity, e.g., the equipment it controls), security profiles (e.g., ability to read/write access to data, ability to program the functional unit), and the like. The functional unit description 1142, i.e., the information describing the functional unit template to be instantiated is communicated by the system software 1140 to the SDA orchestration component 1116. In some embodiments, the functional unit description 1142 can include information related to functional unit virtualization description, communication flows, network flows, security profiles, and/or the like. By way of example, the functional unit virtualization description can include the instance information including type and quantity of components to be instantiated or provisioned (e.g., 3 PLCs, 2 distributed I/O modules, 1 virtual switch in the conveyer belt example), redundancy requirements, and the like. The functional unit virtualization description can also include, for each component, associated applications and version of applications, associated programming package (e.g., Unity for the PLC) and the like to facilitate configuration and programming of the functional unit or the components therein.

The communication flow description can include information relating to I/O connectivity or links, I/O priority type (e.g., high priority, low priority), timing constraints, I/O list with connection information (e.g., data, rate), peer-to-peer data exchange, SCADA data exchange, other flows declarations (SNMP, Web, email, etc.), and the like. Security profiles can include access control lists (ACLs), port and protocol lists, authorized bandwidth restrictions, black/white listed sites/addresses, and/or the like. In some embodiments, the functional unit description 1142 can also include guest (e.g., virtual machine) configurations such as but not limited to: processor types, memory, affinity, virtual machine image validation and the like. Network flow description can include information such as bandwidth and port lists, flow path restrictions (e.g., no video or high bandwidth data on high priority I/O links), port connectivity, interface speed, and the like.

The SDA Orchestration component 1116 parses the functional unit description into sub-descriptions and begins driving the orchestrators of the various sub-systems accordingly. For example, the SDA orchestration component 1116 passes a description of the requested communication flows 1144 extracted from the function unit description 1142 to the cyber security orchestration component 1118 of the CS controller 1155. The CS orchestration component 1118, based on the requested communication flows 1144, derives securities policies for host/guest access, network traffic segmentation, firewall configurations, ACL configurations (e.g., IP address/name of connection entity and nature of intended connection such as TCP/UDP port, allowed access types, block unauthorized protocols and ports, and the like), authorized logins for monitoring, configuration, and the like. Control of traffic types allowed to an end points, configuring secure channels, controlling packet data length and addressing, and the like. In some embodiments, the various security policies can be managed by a security polices manager 1126. The authentication service 1128 in some embodiments can provide authentication service to the other subsystems. For example, it can authenticate requests to virtualize a functional unit.

The cyber security orchestration component 1118, in some embodiments, provides necessary security policies for the fog server controller 1110 and the network controller 1190 (e.g., SDN, TSN and/or other network controller(s)) to the SDA orchestration component 1115. In other embodiments, the CS orchestration component 1118 can cause the securities policies to be distributed directly to the relevant controllers. For example, security policies relating to virtualization functions to the fog controller 1110, and security policies relating to the network functions to the network controller 1190. In some embodiments, the CS controller 1155 can disseminate device and switch policy rules to the security protection system which can then manage deployment and enforcement of those policies at the device level.

The SDA orchestration component 1116 upon receiving the security policies 1148 from the CS controller 1155, passes a description of the virtualized elements of the functional unit extracted from the functional unit description 1142 and relevant security policies 1152 to the fog orchestration component 1124. In some embodiments, the fog orchestration component 1124 can request the CS controller 1155 for the relevant security policies. The fog orchestration component 1124 drives the fog server controller 1110 (e.g., host management component 916 in FIG. 9A) to create, as necessary, the provider and/or tenant virtual networks 1120 in one or more compute nodes. This can include instantiating virtual switches or virtual routers. The fog orchestration component 1124 creates a virtualized instance of the functional unit 1134 which includes creating a virtualized instance of each component in the functional unit (i.e., 3 vPACs and 1 virtual switch in this example) and connecting the virtualized instances to the associated virtual networks 1120. In some embodiments, based on redundancy requirements (e.g., predefined or specified with the request), more than one instance of the functional unit 1134 can be provisioned.

The SDA orchestration component 1116 passes a description of the network flows 1154 associated with the functional unit and any required security policies 1154 to the network orchestration component 1122. From this description, the network orchestration component 1122 can discern the required network paths, segmentation, and the like, and drive the network controller 1190 to configure the network elements 1136 in the physical network, as well as the network elements in the virtual networks 1120 accordingly. In some embodiments, all devices (e.g., physical and virtual infrastructure and end devices) can request their associated security policies from a policy server 1138. In this manner, the SDA system can not only provision a functional unit on a compute node, but can also provision the network resources that the functional unit needs in order to be in operation.

After the functional unit has been created or provisioned and the networking infrastructure is configured accordingly, the system software can then be used to configure and program the components of the functional unit. For example, the vPACs of the functional unit can be configured and programmed using associated software through the system software portal to control the operation of the conveyor belt system. In some embodiments, configuring the functional unit can also include configuring the associated physical components of the functional unit. For example, the fog server controller 1110 can reconfigure an I/O module by updating its ACLs to allow the vPACs to connect. In some embodiments, the I/O module can be a smart connected device into which the fog server controller 1110 can program associated logic (e.g., logic for processing security-based functionality).

7. Example Methodologies Implemented in the SDA System

FIG. 12 is a logic flow diagram illustrating an example method of creating an automation system in accordance with some embodiments.

At block 1202, a fog server subsystem that includes a fog server controller and multiple compute nodes creates or instantiates virtual components of the automation system on one or more compute nodes (e.g., via provisioning component 906 in FIG. 9A). The elements of the automation system can be virtualized using virtualization technologies such as virtual machines, containers and bare metals. Moreover, the compute nodes on which the virtual components are executed can be physically distributed in some embodiments. For example, one compute node can be in the plant floor, while another compute node can be in a control room. Regardless of where the compute nodes are located, the communication between the fog server controller and the compute nodes is over a dedicated management network separate from the physical network, or over the same physical network.

At block 1204, the fog server subsystem (e.g., via provisioning component 906 in FIG. 9A) creates associated virtual networks within the compute nodes. At block 1206, the fog server subsystem (e.g., via provisioning component 906 in FIG. 9A) connects the virtual components to the virtual networks. The virtual networks are then connected to a physical network. At block 1208, a network subsystem including a network controller configures physical network components of the physical network and/or virtual network components of the virtual networks. In some embodiments, the network subsystem configures the physical and/or virtual network components by deploying network policies. The network policies can include policies for controlling connectivity, bandwidth, latency and/or traffic flow. The network controller can be an SDN controller, a TSN controller or a combination thereof.

At block 1210, a CS subsystem that includes a security controller distributes security policies to the fog server subsystem and the network subsystem for deployment to the virtual components executing on the compute nodes and the physical and/or virtual network components. At block 1212, the fog server subsystem utilizes the physical and/or virtual network components to communicate with physical components (e.g., field devices) of the automation system to control operation and management of the automation system.

FIG. 13A is a logic flow diagram illustrating an example method of adding a functional unit to an automation system via a system software in accordance with some embodiments.

Figure 13B:
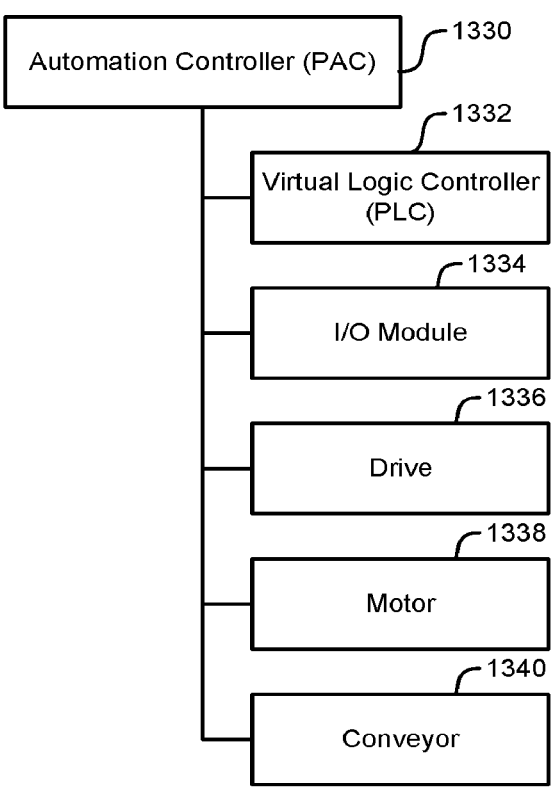
FIG. 13B depicts an example of a topological view of a conveyor system in accordance with some embodiments.

Starting at block 1302, a user can launch the system software. At block 1304, the system software can present a topological view of all the devices, physical and virtual, that are managed by the automation system. FIG. 13B depicts an example of a topological view of a conveyor system that includes a PAC 1330 at the top of the hierarchy, a virtual PLC 1332 and associated I/O module 1334, a drive 1336, a motor 1338 and a conveyor (i.e., actuator) 1340. At block 1306, the system software can receive a selection of a functional unit template (e.g., conveyor system template) to add to the automation system. The functional unit template may be selected from a template library in some embodiments. The system software can update the topological view to include the new functional unit at block 1308. At block 1310, the system software can launch a first application for configuring the functional unit. In some embodiments, configuring the functional unit can include information such as but not limited to: IP addressing, I/O configuration, access control lists, local sub-components and supporting libraries, event triggering, passwords, and the like. At block 1312, the system software can receive configuration data for the functional unit. At block 1314, the system software can launch a second application for system data management. At block 1316, the system software can configure the new functional unit to receive/send data (e.g., via point to point communication or through shared real time data bus). In some embodiments, configuration and data management can be performed through the same application. In such a situation, the system software can launch an application for configuration and data management of the functional unit at block 1318. The system software can receive the configuration data and/or instructions for data management at block 1320. The system software can then configure the functional unit to receive and/or send data at block 1322.

Figure 14:
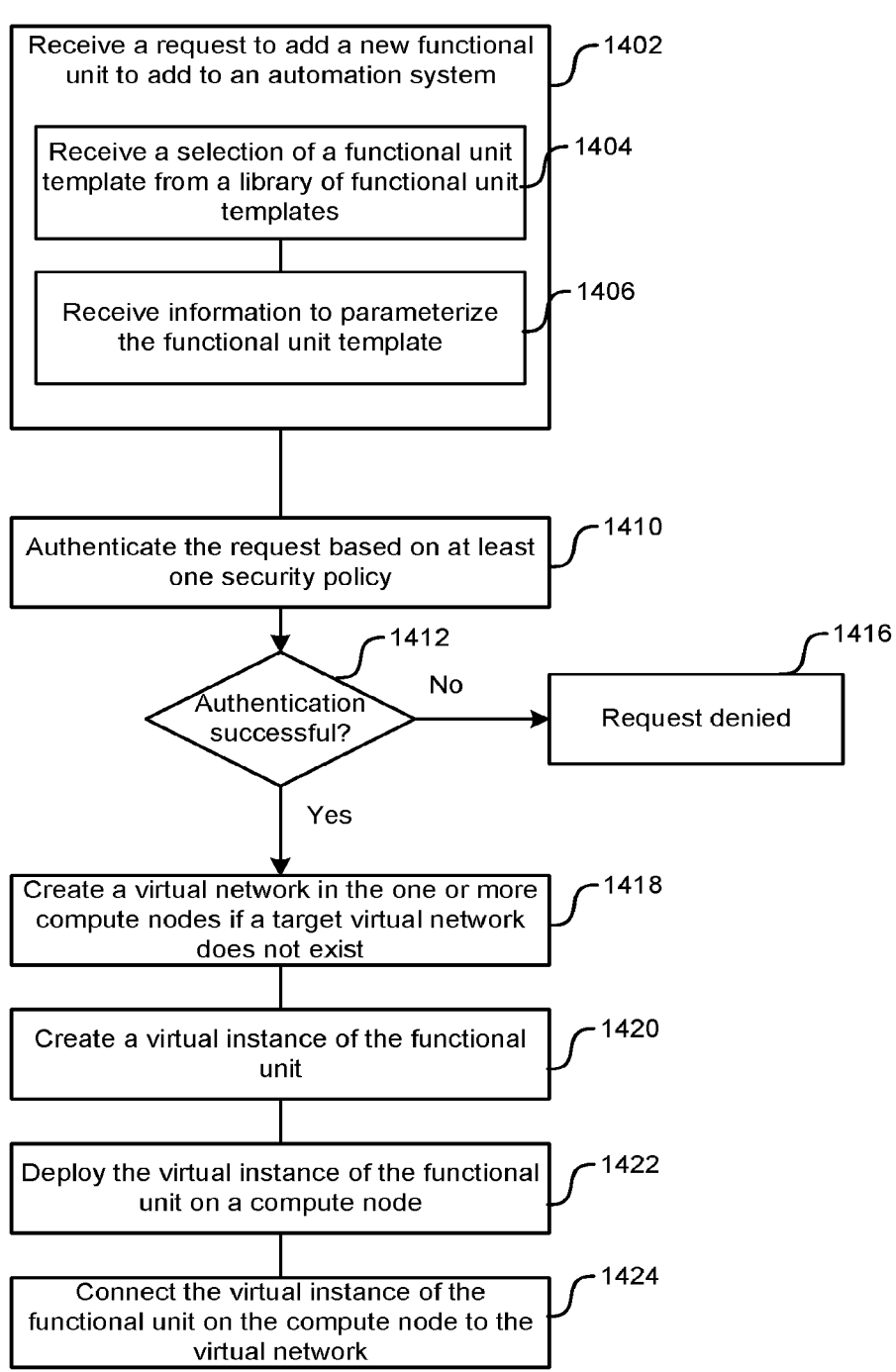
FIG. 14 is a logic flow diagram illustrating an example method of provisioning a functional unit in an SDA system accordance with some embodiments.

FIG. 14 is a logic flow diagram illustrating an example method of provisioning a functional unit in an SDA system accordance with some embodiments. At block 1402, the SDA system can receive a request to create or add a new functional unit to an automation system. In some embodiments, receiving the request can include receiving a selection of a functional unit template from a library of functional unit templates at block 1404. The selection can be made by a user via the system software user interface in some embodiments. In other embodiments, the definition of the new functional unit to be added to the automation system can be received from an entity that is communicatively coupled to the system software (e.g., through an API). Receiving the request can also include receiving information to parameterize the functional unit template at block 1406. At block 1410, the SDA system can authenticate the request based on at least one security policy. In some embodiments, the authentication can be performed by the fog server subsystem using the at least one security policy from the cyber security subsystem. At decision block 1412, if the authentication is not successful, the request can be denied by the SDA system at block 1416. The authentication step ensures that unauthorized changes to the automation system are not carried out by the SDA system.

If the request is successfully authenticated, the SDA system can create at least one virtual network in one or more compute nodes at block 1418, if a target virtual network does not exist. The SDA system can also create a virtual instance of the functional unit at block 1420. Creating a virtual instance of the functional unit includes creating a virtual instance of each element of the functional unit. For example, if a functional unit comprises of three PACs, virtualization of the functional unit would mean creation of three virtual PACs (vPACs). At block 1422, the SDA system can deploy the virtual instance of the functional unit on a compute node. At block 1424, the SDA system can connect the virtual instance of the functional unit on the compute node to the virtual networks to provision or commission the functional unit on the compute node.

FIG. 15 is a logic flow diagram illustrating an example method of configuring a functional unit in an SDA system accordance with some embodiments.

Once a functional unit has been created or provisioned (e.g., via provisioning component 906 in FIG. 9A), the functional unit can be configured using the system software. At block 1502, the SDA system (e.g., SDA system 600 in FIG. 6A) can receive configuration information for the new functional unit from the system software. At block 1504, the SDA system (via a network controller, e.g., network controller 690 in FIG. 6A) can determine at least one network path traversing through virtual and physical networks. The SDA system can configure one or more network components in the at least one network path at block 1506. Configuring the network components can include providing and/or enforcing one or more network policies which specify how the network components are to direct different types of traffic flows. For example, a virtual/physical switch can be associated with a network policy that specifies allowing only HTTP traffic. So, the switch in operation would allow HTTP traffic to flow through, but other traffic such as MODBUS traffic would be blocked. At block 1508, the SDA system can configure the virtual instance of the functional unit using the configuration data (e.g., via configuration component 908 in FIG. 9A). At block 1510, the SDA system can then allow data traffic to flow from the functional unit to a device (e.g., field device) via the at least one network path to control an automated process.

FIG. 16A is a logic flow diagram illustrating an example method of commissioning or provisioning a functional unit in an SDA system in accordance with some embodiments.

The example method includes creating, by a system controller (e.g., fog server controller 910 in FIG. 9A) of a localized subsystem (e.g., fog server subsystem), a virtualized instance of a functional unit of an automation system in one or more compute nodes managed by the system controller at block 1602. These compute nodes can include an automation system controller, a server, a personal computer, and/or a smart connected device. In some embodiments, creating a virtualized instance of a functional unit can include creating a fully virtualized instance of the functional unit or partially virtualized instance of the functional. For example, if a functional unit includes two components (e.g., PLC 1 and PLC 2), then a fully virtualized instance of this functional unit would include virtualization of both the components (i.e., two virtual components, for e.g., vPLC 1 and vPLC 2). Similarly, a partially virtualized instance of the functional unit could include virtualization of one component (i.e., one virtual component, e.g., vPLC 1), with the other component being a physical component (e.g., PLC 2). In some embodiments, the physical component can also be commissioned in the SDA system (i.e., brought under the management of the fog server). The method of commissioning a functional unit having a physical component is described in reference to FIG. 16B.

The virtualized instance of the functional unit can be created from a functional unit template selected from a library of functional unit templates. A system software provides an interface for a user to access the library of functional unit templates to select the functional unit template and parameterize the functional unit template. Parameterizing the functional unit template includes defining instance identity, input/output connectivity and security profile for the functional unit in some embodiments.

The system controller can create a virtual network in the one or more compute nodes at block 1604, and then connect the virtualized instance of the functional unit to the virtual network at block 1606. The virtual network is mapped to a physical network to enable the virtualized instance of the functional unit to interact with a field device of the automation system to control an automated process.

At block 1608, the system controller can configure security of the virtualized instance of the functional unit by applying one or more security policies from a cyber security subsystem. In some embodiments, this can include creating a virtualized instance of a security protection system (e.g., a virtual next generation firewall) on the one or more compute nodes based on a security policy. In some embodiments, the virtualized instance of the functional unit includes one or more hosts on which software implementation of the functional unit is running. As such, configuring the security of the virtualized instance of the functional unit can include configuring the security of: software implementation of the functional unit, the one or more hosts, and/or the one or more compute nodes on which the one or more hosts are running. In some embodiments, a host from the one or more hosts includes a virtual machine, a container or a bare metal. In some embodiments, in responsive to a request to create the virtualized instance of the functional unit of the automation system, the system controller can apply at least one security policy to authenticate the request prior to creating the virtualized instance of the functional unit. The security controller can also apply at least one security policy to validate an image of each host associated with the virtualized instance of the functional unit.

At block 1610, the network controller of the network subsystem can determine at least one network path from the virtualized instance of the functional unit to a field device through the virtual and physical networks. Then at block 1612, the network controller can configure one or more network elements in the at least one network path to enable flow of data traffic between the virtualized instance of the functional unit and the field device. At block 1614, the network controller can configure security of the one or more network elements in the at least one network path by applying one or more security policies provided by the cyber security subsystem.

Figure 16B:
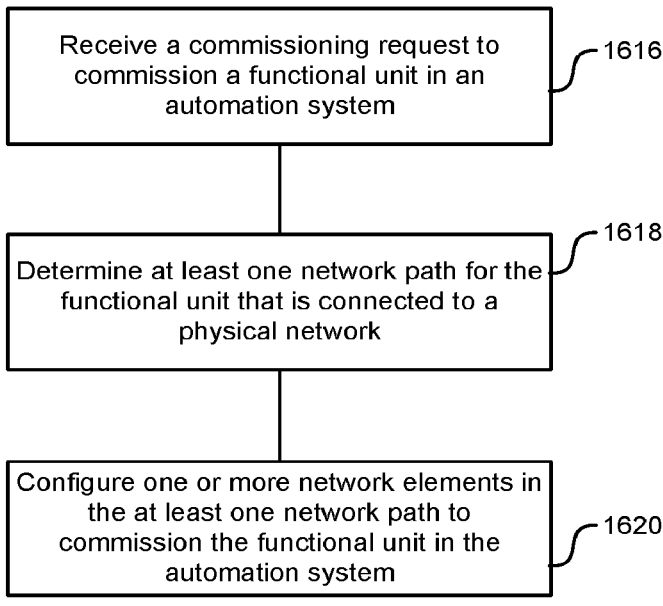
FIG. 16B is a logic flow diagram illustrating an example method of commissioning or provisioning a functional unit in an SDA system in accordance with some embodiments.

FIG. 16B is a logic flow diagram illustrating an example method of commissioning or provisioning a functional unit in an SDA system in accordance with some embodiments.

The example method includes receiving, by a system controller (e.g., fog server controller 910 in FIG. 9A, fog server controller 610 in FIG. 6A), a commissioning request to commission a functional unit at block 1616. In response to the commissioning request, a network controller (e.g., network controller 690 in FIG. 6A) responsive to receiving of the commissioning request by the system controller, at least one network path for the functional unit that is connected to a physical network at block 1618. At block 1620, the network controller configures one or more network elements in the at least one network path to commission the functional unit in the automation system which enables data traffic flow between the functional unit and a field device in the automation system.

8. Management of the SDA System

Figure 17:
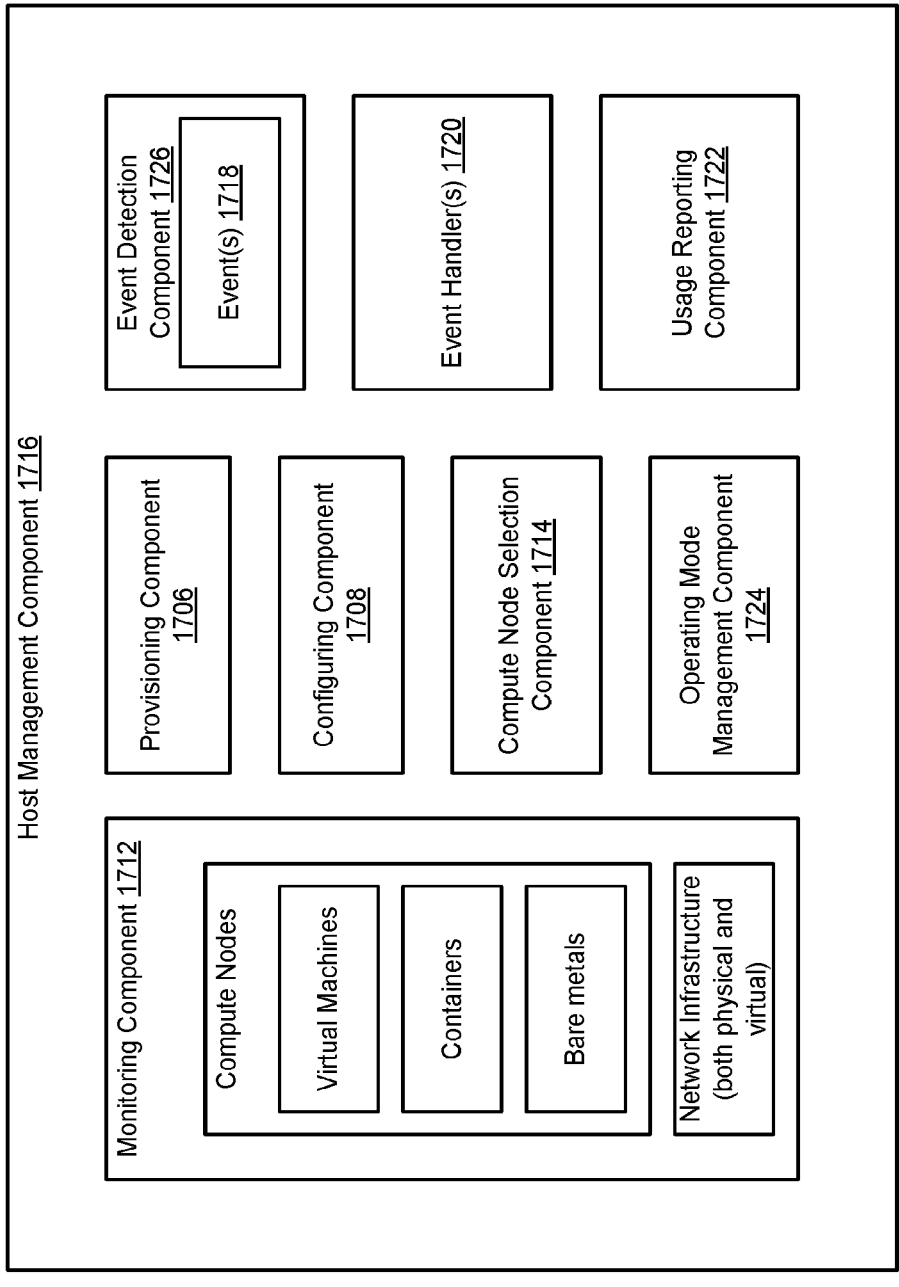
FIG. 17 is a block diagram illustrating example components of a host management component of a fog server controller of an SDA system in accordance with some embodiments.

FIG. 17 is a block diagram illustrating example components of a host management component 1716 in accordance with some embodiments. In some embodiments, host and guest managements are centrally coordinated through this component. The host management component 1716 can include components such as a provisioning component 1706, a configuration component 1708, a monitoring component 1712, and a compute node selection component 1714 in some embodiments. In further embodiments, the host management component 1716 can include an event detection component 1726 and an event handler component 1720. In yet other embodiments, the host management component 1716 can include a usage reporting component 1722 and/or an operating mode management component 1724. It should be noted that one or more of these components can be divided into sub-components and/or consolidated into one or more components. Details relating to the functioning of the provisioning and configuration components have already been described in reference to FIG. 9A.

The monitoring component 1712 can monitor the health and performance of compute nodes and/or hosts (e.g., containers, virtual machines, bare metals) running on the compute nodes. In some embodiments, the monitoring component 1712 can also monitor guests (e.g., applications running on hosts), physical and virtual network elements (e.g., routers, switches), log data, event data from logs and local events (e.g., simple network management protocol or SNMP traps, OpenFlow events), exception responses to protocols such as Ethernet IP and Modbus, state of processing engines (e.g., stuck in a state in a state machine), bandwidth utilization (too high can indicate a rogue device) hosted on the compute nodes. For example, the monitoring component 1712 can periodically receive heartbeats from monitoring agents (not shown) in the compute nodes and/or other infrastructure components. In some instances, the monitoring component 1712 can also receive resource usage statistics such as real time CPU and memory usage information per compute node and/or per VM, container or bare metal node. In some embodiments, the monitoring component can obtain data relating to the operational states of the hosts and/or guests along with the usage statistics. For example, for a virtual PLC, usage statistics associated with operational states such as solving logic, stop (i.e., not solving) halt (error) and unconfigured can be obtained.

In some embodiments, the usage reporting component 1722 can utilize the monitoring information from the monitoring component 1712 to log use of virtualization service and resources. For example, the monitoring component 1712 can detect when a virtual machine deployed on a compute node starts and stops executing an application as well as the resource usage statistics for that virtual machine, and can provide the start/stop time stamps and related resource usage statistics to the usage reporting component 1722. The usage reporting component 1722 can aggregate the usage data based on one or more criteria (e.g., by application, by customer) and/or by reporting period. In some embodiments, the component 1722 can apply one or more business rules to determine the cost of utilizing the SDA system resources. In some embodiments, the monitoring data and/or aggregated usage data can be periodically uploaded to a remote cloud (e.g., cloud 450 in FIG. 4) for further analysis, cost determination for use of the SDA system resources, cost allocation to different types of SDA system resources, and the like.

In some embodiments, the operating mode management component 1724 can manage the operational states of the compute nodes, hosts (e.g., virtual machines, containers and bare metals) and/or guests that run on the hosts. For example, consider a virtual PLC running on a compute node, the operating mode management component 1724 can request the virtual PLC to start, stop, halt, init, shutdown, reset, get and set state, and the like.

The compute node selection component 1714 can select a compute node for deploying a guest. Deploying a guest on a compute node includes deploying a host in the form of a virtual machine, container or bare metal on the compute node and deploying the guest on the host. In some embodiments, deploying a guest can include deploying a first host, deploying a second host on the first host and deploying the guest on the second host. This type of deployment may be chosen in instances where the guest requirements cannot be met by the compute node hardware in its native form. For example, an application that runs in the Windows environment cannot be deployed on a container on a Linux based compute node because the container relies on the kernel of the compute node. In this instance, a virtual machine would need to be deployed first, then a container on top of the virtual machine and then the application on the container.

The compute node selection component 1714 can be triggered by the configuring component 1708 in some embodiments. The fog server includes one or more compute nodes which may be physically distributed and may range in capabilities. For example, some compute nodes can be located in a control room of an industrial operation and can include a multi-processor Xeon or the like, with multiple cores to provide high end computing power. Similarly, some other compute nodes may include a smaller single- or multi-core Atom processor or the like and yet others may be high end ARM processor or the like based machines located in a plant floor or near the environment that they control, for example. It should be noted that hardware of the compute nodes can be realized in the form of a PC, industrial PC, an HMI module, servers, specialized controllers (e.g., industrial controllers such as M580 PLC manufactured by Schneider Electric), smart connected devices, and/or the like in various embodiments. Some of the compute nodes can also have networking capabilities such as high-end networking interconnection (e.g., 1 GB or 10 GB Ethernet switch) between modules in the chassis and power distribution. Given these variations in capabilities and how the compute nodes can be physically distributed, existing approaches for selecting a compute node for deploying a virtual machine such as random selection, round robin and simple greedy are highly inefficient and ineffective. Moreover, in automation environment, applications can have time-sensitive and safety-critical requirements. These application or guest constraints make the process of selecting a compute node for virtualization of an application or machine more complex.

The compute node selection component 1714, in some embodiments, can use one or more rules governing the resource requirements of a given guest and/or host associated with the guest to select a compute node for deployment. Examples of the rules that the compute node selection component 1714 can apply include, but are not limited to:

If the host virtualization technology is a virtual machine, then select a compute node with a high end processor (e.g., multi-core Xeon processor).

If the host virtualization technology is a container, then select a compute node with a medium end processor (e.g., multi-core Atom processor).

If the guest has a small size (e.g., under 32 MB, between 16 MB and 64 MB), then select a baremetal compute node.

If the guest has a computation intensive processing requirement, then select a compute node with a high end processor (e.g., multi-core Xeon processor).

If the guest has a time sensitive processing and communication requirement, then select a compute node that is in proximity to a machine/process that the guest controls.

If the guest has a time sensitive processing and communication requirement, then select a compute node with time sensitive networking capability.

If the guest has a time sensitive processing and communication requirement, then select a compute node without a NUMA (non-uniform memory access) neighbor.

If the guest is written for a specific type of chip technology (e.g., ARM, X86), operating system (OS) (e.g., Linux, Windows, VxWorks), OS version, and the like, then select a compute node having compatible chip technology, OS and OS version.

As used herein, proximity determination can be based on one or more considerations. For example, proximity can be measured in terms of throughput and latency when it concerns network performance. Proximity can also be measured in physical distance when the concerns include safety & maintenance (e.g., no really long cables), common power sources, environmental (e.g., the environment in which it operates), cyber security, physical security, cost, mounting (cabinets), and the like. Proximity can also be defined by security zones in some instances.

In some embodiments, the rules can include affinity and/or anti-affinity rules. One example affinity rule can specify that a host executing a guest run together or coexist with another host executing a guest on the same compute node. This can allow for very fast data transfers between the hosts/guests, for example, through the 10 GB internal virtual switch in the compute node. Another example affinity rule can specify that a guest always runs on a specific compute node. Yet another example affinity rule specifies that a guest not run on the same compute node as another guest. This rule can be applicable in cases where one guest is a standby for the other for example.

In some embodiments, the rules can be generated based on heuristics and/or historical data. Moreover, these rules can be updated and/or validated using historical data patterns. It should be noted that one or more of these rules can be combined (e.g., using logic such as AND, OR, and the like), used in isolation or used in a cascading manner when making a selection of a compute node. By utilizing these rules, the compute node selection component 1714 ensures that a compute node that is selected meets not only the nm time resource requirements (e.g., processing and communication, storage, memory, and the like) of the guest and the host and but also achieves performance optimizations (e.g., reduced network delay, faster memory access).

In some embodiments, selection of a compute node to deploy a guest can be based on an ordered set of operational parameters. By way of example, the operational parameters can include a process critical level, a time sensitive level, a cost of execution, a proximity critical level, cost performance, and the like.

In some embodiments, process critical level can depend on level of redundancy, availability need of application, safety requirement, fall back options, and the like. For example, if an industrial steel processing plant operating a furnace in a steel mill can under no circumstance cool down, then the application(s) relating to maintaining the operation of the furnace can be considered process critical. In some embodiments, time sensitive level operational parameter can depend on the precision of execution time, quantified time duration, and the like. Examples of time sensitive applications include high speed motion control applications (e.g., production line cheese slicer). In some embodiments, cost of execution operational parameter can depend on the amount of processing time, resource consumption, processing capacity demand, and the like. In some embodiments, proximity critical level operational parameter can relate to interdependence between or among two or more guests, or the proximity between a guest and a sensor/actuator that it controls. In some embodiments, cost performance operational parameter can be based on capital expenditure such as resource cost and operational expenditure such as overall process reliability.

In some embodiments, the compute node selection component 1714 can assess the relevance of at least some of the operational parameters to the guest to generate an ordered or ranked list of operational parameters. Based on the ordered list of operational parameters, the compute node selection component 1714 can select a compute node for deploying the guest.

Figures 18A, 18B:
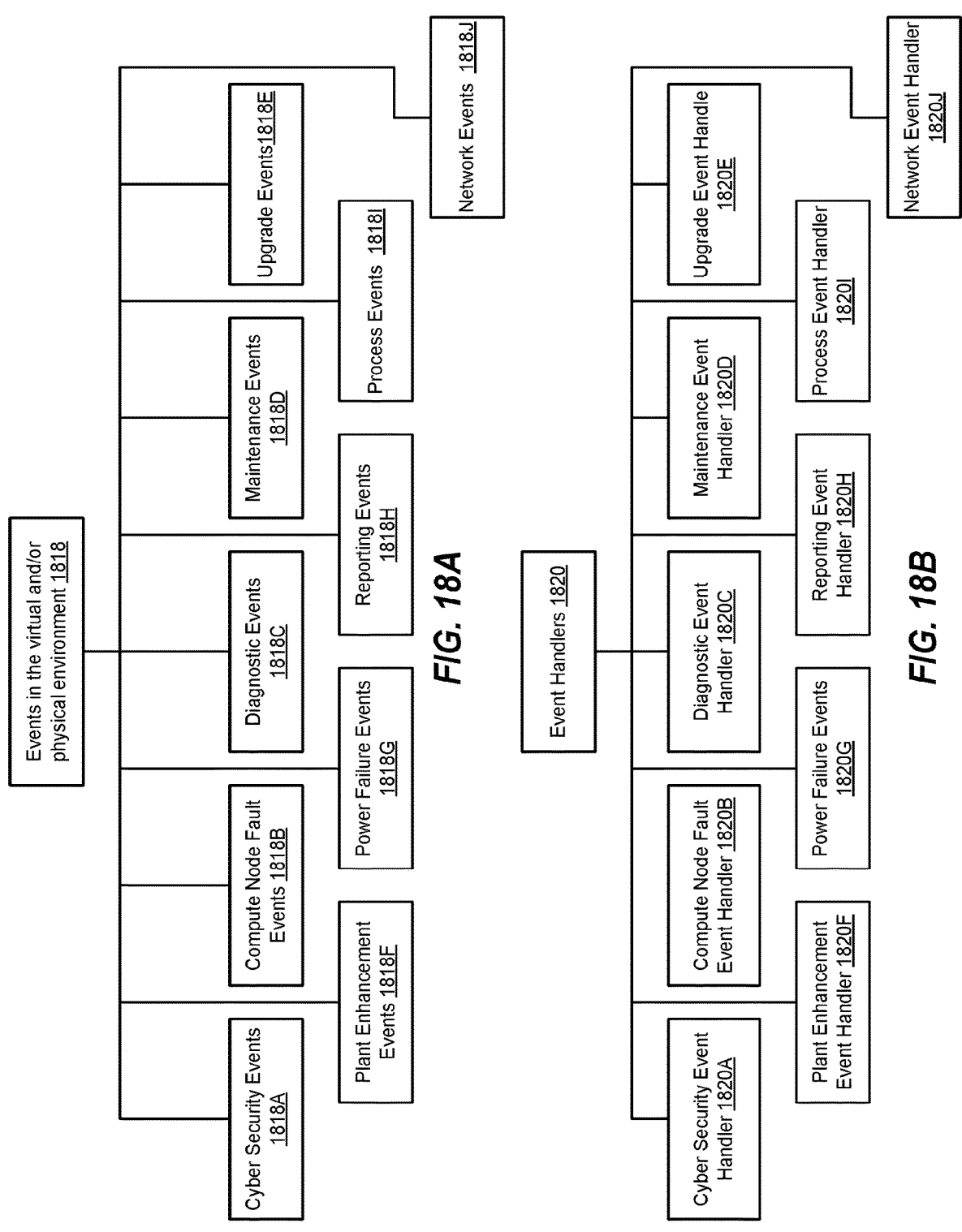
FIG. 18A is a block diagram illustrating some example classes of events in the virtual and/or physical environment of an SDA system that can be detected in accordance with some embodiments.
FIG. 18B is a block diagram illustrating some example event handlers in an SDA system in accordance with some embodiments.

The event detection component 1726, in some embodiments, can detect events 1718 that can occur in the virtual and/or the physical environment of the SDA system. FIG. 18A depicts some example classes of events 1818 in the virtual and/or physical environment that can be detected by the event detection component 1726. Referring to FIG. 18A, some examples of event classes 1818 include, but are not limited to: cyber security events 1818A, compute node fault events 1818B, diagnostic events 1818C, maintenance events 1818D, upgrade event 1818E, plant enhancement events 1818F, power failure events 1818G, reporting events 1818H, process events 1818I, network events 1818J, and the like. Each of these events can be detected by the event detection component 1726 based on monitoring information from the monitoring component 1712 in some embodiments. It should be noted that the event detection component 1726, in some embodiments, can comprise of one or more event detection sub-components to detect different classes of events. In some embodiments, each of these events can be handled or managed by an event handler 1720. It should be noted that one or more event handlers 1720 can exist to handle various classes of events. It should also be noted that in some embodiments, the event detection component(s) and event handler(s) can be distributed among the fog server controller, network controller and cyber security controller depending on which controller drives the event handling response. Referring to FIG. 18B, some example event handlers 1820 include but are not limited to: a cyber security event handler 1820A, a compute node fault event handler 1820B, a diagnostic event handler 1820C, a maintenance event handler 1820D, an upgrade event handler 1820E, a plant enhancement event handler 1820F, a power failure event handler 1820G, a reporting event handler 1820H, process event handler 1820I, a network event handler 1820J, and the like.

For example, cyber security events 1818A can occur when there is an attempt to gain unauthorized access to an automation system (e.g., compute nodes), disrupt processes, disable safety monitoring systems and in general cause harm. Cyber security attacks can have multiple entry points including through network elements such as routers and firewalls. Some examples of these cyber security events, more often deliberate than accidental, include external hacks, virus/worms/malware and denial of service (DoS) attacks to name a few. In some embodiments, the components that have been affected by cyber security events can generate a log entry documenting such activities. In some embodiments, security protection systems can monitor network traffic against a database of known vulnerabilities to detect suspicious traffic and generate an alarm. A cyber security event detection component of the CS controller (e.g., CS controller 655 in FIG. 6B) can analyze these activities collectively to detect a cyber security event 1818A.

In response to detection of a cyber security event 1818A, a cyber security event handler 1820A of the CS controller can initiate or provide a response. The response can vary depending on various aspects of the cyber security event 1818A including the type and severity of the cyber security event and the components or control systems impacted for example. For network based cyber security events, the response can include partitioning the network to isolate the impacted portion of the network to mitigate the impact of the event. For device based attacks, response can include shutting down of ports and communication links and even bringing the impacted device offline. Similarly, a response to an unauthorized attempt to change a control program on a device can include blacklisting the user to prevent the user from accessing any other devices, blocking traffic to/from the potentially compromised device as well as switching to a virtual standby (i.e., a standby device in the virtual environment) so that processes can operate without interruption.

Figure 19:
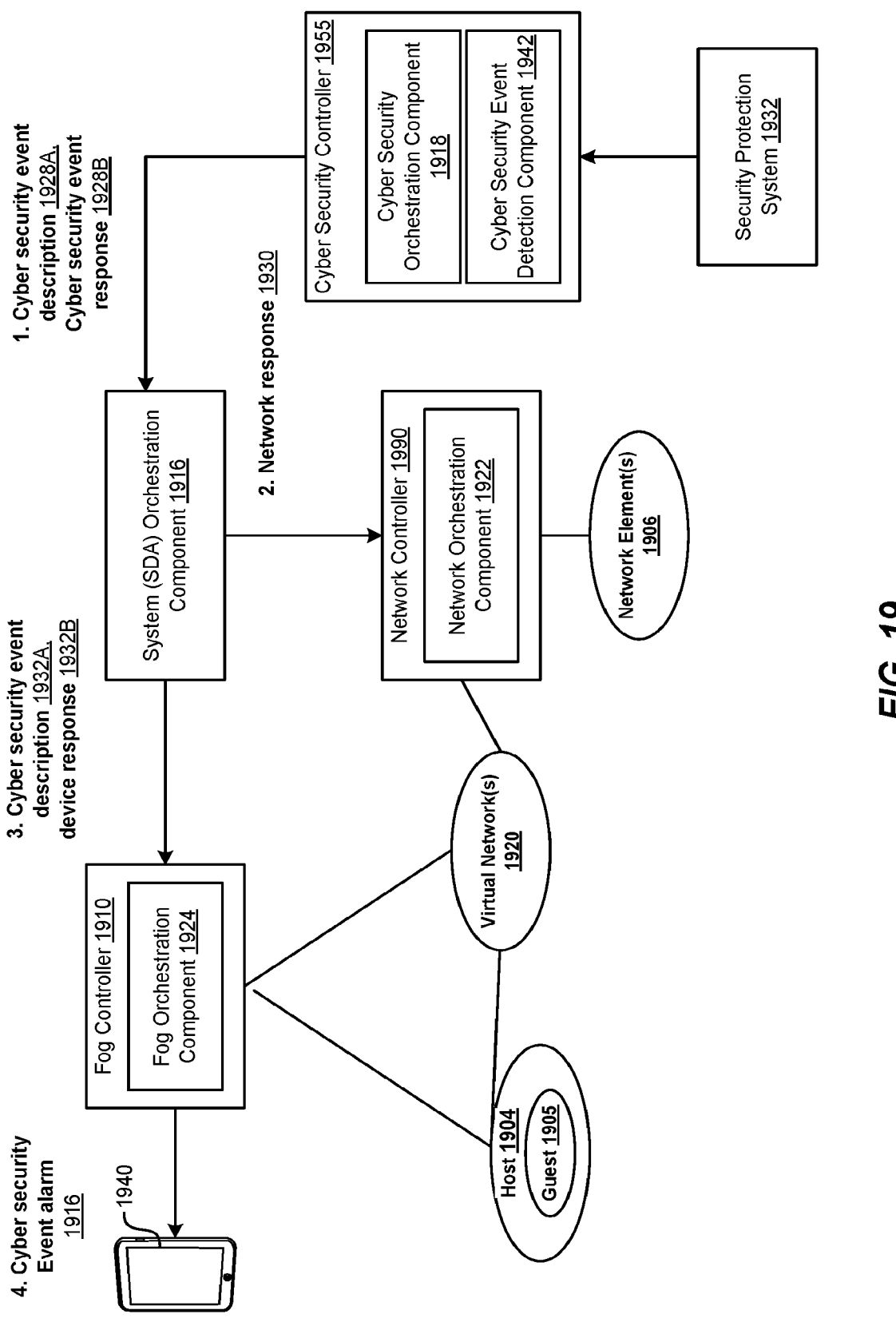
FIG. 19 is a block diagram illustrating an example of a coordinated response to a cyber security event from an SDA system in accordance with some embodiments.

These responses are typically coordinated among the orchestration components as depicted in FIG. 19. Referring to FIG. 19, in some embodiments, a CS event detection component 1942 of the CS controller 1955 can generate an alarm associated with a cyber security event and provide cyber security event description 1928A including details of the event to the SDA orchestration component 1916. The cyber security event description 1928A can include details such as, but not limited to: type of incident or attack (e.g., virus attack), entry point (e.g., router, firewall), components impacted (e.g., compute node with IP address/MAC address), and the like. In some embodiments, the CS orchestration component 1155 can determine the response measures (or cyber security event response 1928B) needed to mitigate the cyber security event and provide relevant network response measures 1930 (e.g., related to network elements) to the network orchestration component 1922 and relevant device (e.g., physical or virtual) response 1932B measures to the fog server orchestration component 1910 to implement in their respective control domains (i.e., compute nodes and virtualized instances 1904 for the fog controller 1910, and virtual networks 1920 and network elements 1906 for the network controller 1990). For example, the fog server orchestration component can, as a cyber security response, cause the fog server controller to bring an impacted device offline, and restart the application running on the device on another compute node. Similarly, the network orchestration component can cause the network controller to switch off the impacted router and/or switch ports so that traffic can bypass the impacted router and/or switch ports when flowing through the network. In alternative embodiments, a cyber security event response 1928B including the device and/or network response can be provided to the SDA orchestration component 1916. The SDA orchestration component 1916 can then parse the cyber security response 1928B and provide the cyber security device response 1932B to the fog orchestration component 1924 and/or the cyber security network response 1930 to the network orchestration component 1922. In some embodiments, the SDA orchestration component 1916 can also provide the cyber security event description 1932A to the fog orchestration component 1924, which in turn can cause the fog server controller (e.g., via the event detection component 1726 or another alarm module) to send a cyber security event alarm 1916 to a client device 1940 to notify a user of the cyber security event and the response.

Another class of events is the compute node fault event (e.g., compute node fault event 1818B depicted in FIG. 18A). This type of event can be triggered when a compute node fails due to a variety of reasons such as power failure, host OS crashing, memory corruption, disk failure, management/data network failure, and the like. An event detection component 1726 can detect a compute node fault event based on an alert from the monitoring component 1712, for example. The monitoring component may generate an alert when it fails to receive heartbeats at the expected intervals from the compute node. No heartbeats can indicate loss of communication due to network failure, or failure of the compute node itself. In some embodiments, supplementary information such as error state from a log message or error message can be used to detect compute node fault event.

Figure 20:
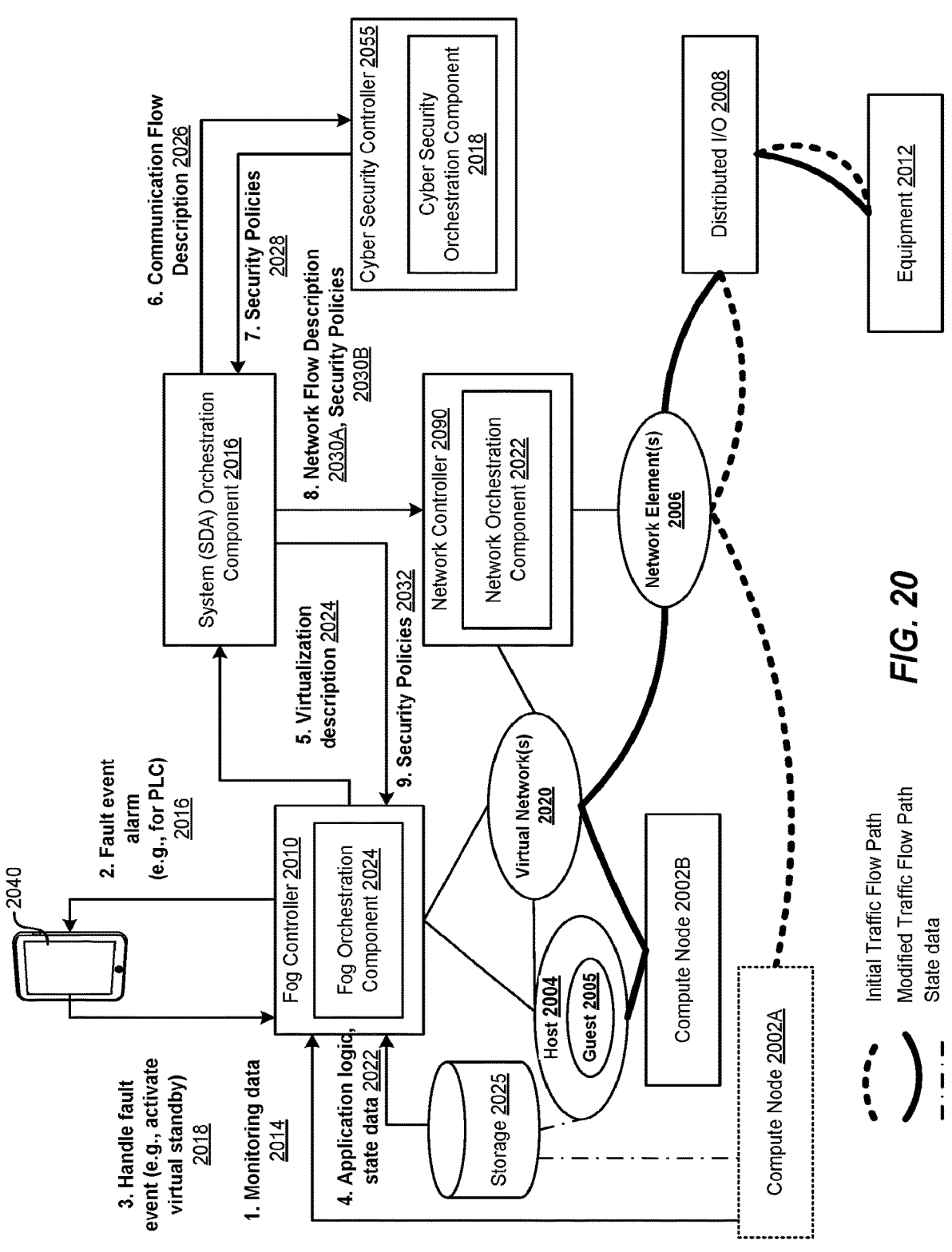
FIG. 20 is a block diagram illustrating an example of a coordinated response to a compute node fault event from an SDA system in accordance with some embodiments.

A compute node fault event handler (e.g., component 1820B in FIG. 18B) can provide a response to a compute node fault event 1818B to mitigate the impact of the failed compute node on the SDA system. The response can be a coordinated response among at least two of the SDA subsystems. One example of a coordinated response from the SDA system to a compute node fault event is depicted in FIG. 20. Referring to FIG. 20, a compute node (e.g., running a PLC application) that is one of multiple compute nodes monitored by the fog server controller 2010 (e.g., via the monitoring component 1712 in FIG. 17) is depicted. The fog server controller 2010 receives the monitoring data 2014. As described above, monitoring data 2014 can include heartbeat messages, resource usage statistics such as real time CPU and memory usage per compute node and/or per VM or container that can provide information about the health of the compute node. The fog server controller 2010 (e.g., via the monitoring component) can analyze the monitoring data 2014 and generate an alarm when it determines that the compute node or host on the compute node has failed. An event detection component of the fog server controller 2010 (e.g., event detection component 1726 in FIG. 17) can detect the alarm indicating a compute node fault. In some embodiments, the alarm 2016 can be transmitted to a client device 2040 to notify a user (e.g., plant operator). The user can then instruct the SDA system, directly from the client device 2040 or another interface (e.g., system software), to handle the event. The fog server controller (e.g., via the event handler 1720 in FIG. 17) can receive the instructions 2018 to handle the event and in response, retrieve information 2022 about an application (i.e., guest) that was running on a host on the compute node that failed from a storage node 2025. Examples of information retrieved from the storage node can include, but are not limited to: application logic and state data. Such data can enable the application to start from the last synchronized state, instead of a complete restart. In some embodiments, the fog server controller 2010 can create a host 2004 to execute the guest 2005 that was running on the failed compute node 2002A. The fog server controller 2010 can also create the necessary virtual network(s) 2020 and connect the host 2004 configured with the guest 2005 to the virtual network(s) 2020. The fog server controller 2010 can then select a compute node 2002B (e.g., via the compute node selection component 1714) on which the host 2004 is deployed.

Once the guest 2004 is deployed on the compute node that meets the resource and/or performance optimization requirements of the guest 2005 running on the host 2004, the fog server controller 2010 can provide virtualization description 2024 including information about the host 2004 and associated virtual networks to the SDA orchestration component 2016 in some embodiments. The virtualization description 2024 can include information such as but not limited to: communication flows and network flows associated with the host 2004 and associated networks. The SDA orchestration component 2016 can parse the virtualization description to extract the communication flows 2026 and network flows 2030A and forward them to the CS orchestration component 2018 and the network orchestration component 2022 respectively. The CS orchestration component 2018 can then cause the CS controller 2055 to retrieve security policies 2028 for the requested communication flow 2026 and forward those security policies to the system orchestration component 2016. Similarly, the network orchestration component 2022 can cause the network controller 2090 to utilize the network flow description 2030A and security policies 2030B to configure the physical and/or virtual network elements 2006. Moreover, security policies 2032 can also be forwarded to the fog server controller 2010 to distribute to the host 2004.

One of the advantages of having a CS subsystem including a CS controller is that associations between a device and its cyber security are maintained until those associations are deliberately broken. In other words, cyber security follows the device wherever it is deployed. Just as the network is reconfigured as part of a response to an event, so is the cyber security. In the example of FIG. 20, the compute node 2002A can be a PLC running a PLC application and a security policy associated with the PLC requires a firewall in front of it. When the PLC application is deployed on a host 2004 on a compute node 2002B, the fog server controller automatically creates a virtual firewall in front of the host 2004 running the PLC application because the security policy associated with the logical function (i.e., the PLC application) persists even when the logical function moves from one host to another or one compute node to another.

Once the guest and the host are deployed on the new compute node 2002B is set up with the application, and the network and security configurations are made, outbound application traffic from the host 2004 can flow through the virtual networks 2020, through the virtual and/or physical network elements 2006, to a distributed I/O 2008 and then on to an equipment 2012 (e.g., an actuator) in this example.

Similarly, inbound traffic from the equipment 2012 that the host 2004 controls is allowed through the network elements 2006 to the host 2004.

While the host 2004 on the compute node 2002B is in operation, the compute node 2002A that failed can be repaired or replaced. For example, if the compute node 2002A is a physical PLC device, then while its application and processes are running on the host 2004 on the compute node 2002B, the PLC device can be repaired or replaced. In some embodiments, the PLC device 2002A need only to be turned on to have its application and processes shifted from the compute node 2002B back to the PLC device 2002A. In other words, the PLC device 2002A would be back in charge of controlling the equipment 2012. To complete the control transfer, the SDA subsystems coordinate among each other to reconfigure or remediate the network (e.g., via the network controller 2090) and/or the security environments (e.g., via the CS controller 2055) to redirect flows back to the compute node 2002A. This shifting of control means that the host 2004 can be shut down by the fog controller 2010, thereby freeing up the resources.

In some embodiments, a host can be a standby for an active device, i.e., in a 1 to 1 ratio or for multiple devices, in a N to 1 ratio in a warm/hot standby system. When a device fails, a maintenance team has to diagnose, identify and restart the device as quickly as possible. In a conventional plant, the diagnosing and repair work can be difficult and time consuming and can cause downtime. With a virtual standby, the virtual resources are immediately available to take over any application processes, reducing or eliminating the downtime and enabling the system to run with little or no issues or delay. In the example of FIG. 20, the host 2004 on the compute node 2002B can be a virtual standby for the failed compute node 2002A (e.g., a PLC device).

In some embodiments, to reduce the hardware and energy costs of having standby systems at a N to 1 ratio, an elastic infrastructure of virtualized standby systems can be configured. If a device fails or errors out, a host from a pool can take over the failed device's processes, assuming all responsibilities and functions. In some embodiments, a standby for one or more devices can be selected from an active pool of hosts of different types (virtual machines, containers, and bare metals) and flavors (e.g., capabilities, OS, OS versions, memory size, etc.) based on one or more criteria. The pool of hosts may be generic, unconfigured hosts in some embodiments such that only application logic and state data need be transferred at the time of standby activation.

In some embodiments, real time state data of an application or process can be maintained in the storage node 2025. When standing up a virtual standby, the state data for an application process that was previously running on a device can be retrieved from this storage node and transferred to the virtual standby so that the state of the virtual standby corresponds to the state of the device that it is temporarily replacing, enabling the secondary or standby device to quickly assume the role of the primary or failed device.

It should be noted that the transfer of control from one compute node to another or from a physical device to a host as described above occurs in a seamless manner. Consider an example of a cheese slicing production line for producing Swiss cheese slices having a specified weight. In such a system, a rotating blade moving at a high speed slices through a block of Swiss cheese as it is pushed towards the blade at a speed that is adjusted based on the holes in the cheese. Coordinating the rapid movement of the blade with the movement of the cheese block is time sensitive. Thus, any delay in transferring control of the cheese slicing process from one compute node to another can negatively impact the process (e.g., produce cheese slices of non-uniform weights). In view of these problems, in accordance with some embodiments, the transfer of control from one compute node to another can occur via a bumpless transfer that respects the time sensitivity of application processes. For example, a bumpless transfer for a high speed motion control system such as the cheese slicing system can occur in under a 1 ms which can result in seamless transition from a physical to virtual device.

In some embodiments, a bumpless transfer is enabled by cloning of a host. An SDA system can allow two or more exact copies of a host on a network. These copies or clones can have the same IP address, MAC address, Serial Number, configuration, and the like, running the same applications. In some embodiments, the clones can also synchronize states with each other to ensure that they are exactly alike in every respect at any point in time. In some embodiments, the SDN controller can direct/block flows based on any number of criteria. One such criteria is based on the producer of data traffic. For example, the network controller (e.g., SDN, TSN) allows all the clones to receive inputs from the network but only allows output from one selected clone to propagate through the network. In some embodiments, the output of all clones may be duplicated to a validation node(s) for comparison and validation. The exact clone of a component whether virtual or physical existing on the same network provides redundancy, with the network controller (e.g., SDN controller and/or TSN controller) directing inbound traffic to all the clones but allowing only outbound traffic from one. The control transfer is then a matter of switching which component to allow to propagate output to facilitate instantaneous switch from one node to another (standby) node.

In some embodiments, the cloning technique can be extended to multiple clones with a voting scheme implemented by a component (e.g., in fog controller 910 in FIG. 9A). The component can compare the multiple outputs and accept the value obtained through a consensus. The cloning technique also enables validated upgrade of a device where upgraded device's output is validated for a probationary period before it is allowed to participate in the automation system. The cloning technique also makes possible averaging of multiple compute processes to account for stochastic error in the computation. In some embodiments, clones can also be set up as security "honey pot" where exposed devices are sacrificed to cyber attackers.

Referring to FIGS. 17 and 18, a diagnostic event 1818C, in some embodiments, can be associated with any components of the SDA system including, for example, compute nodes, network components (e.g., switches), and the like. A diagnostic event is typically triggered when a predefined condition is met. For example, when an equipment has reached its time limit for continuous operation, when an equipment does not reach a certain position on time, or when network delay exceeds a certain time. In some embodiments, a diagnostic event can be triggered by an external signal. For example, an analytics engine running on a cloud (e.g., cloud 450 in FIG. 4) that can gather data including monitoring data from the field and convert into actionable information such as diagnostic information real time. Such an engine can generate a signal when diagnostic data indicates potential problem. A diagnostic event detection component (e.g., event detection component 1726 in FIG. 17) can detect the diagnostic event and in response, a diagnostic event handler (e.g., component 1820C in FIG. 18B) can either schedule or perform a diagnostic check of the component that triggered the diagnostic event. In some embodiments, the diagnostic event handler can coordinate with the orchestration components to facilitate the diagnostic check of the component. For example, if a network switch has a diagnostic event, then the diagnostic event handler can request the network controller (e.g., via the network orchestration component 1922 in FIG. 19 and/or system orchestration component 1916 in FIG. 19) to redirect network flows away from that network switch while diagnostic checks are performed on it. In some embodiments, a diagnostic event can trigger another event such as a maintenance event or an upgrade event.

Another type of event that the event detection component 1726 can detect is a maintenance event 1818D. A maintenance event can be scheduled in advance, initiated on demand by a user to inspect and/or repair one or more compute nodes or in response to other events such as diagnostic events. At the scheduled time or in response to a user request, a maintenance event can be triggered and detected by the event detection component. In response to the event, a maintenance event handler 1820 can be invoked. The maintenance event handler can utilize the fog server orchestration component to shift application processes from a compute node scheduled to undergo maintenance to another compute node (e.g., virtual machines, containers or bare metals). The maintenance event handler can also, via the network orchestration component and the CS orchestration component, remediate or reconfigure the network and the security environments to enable the virtualized application functions to control a machine or process. In some embodiments, one example response to a maintenance event can be similar to a response to a compute node fault event described in reference to FIG. 20.

Another type of event in the physical and/or virtual environment is an upgrade event. Like maintenance events, upgrade events can also be scheduled in advance or initiated on demand by a user to upgrade hardware, firmware and/or software. For upgrade events, the hardware, firmware and/or software could be fully operational, but an upgrade may be desired in response to cyber threats, discovery of potential defects, availability of new features, and the like.

Plant enhancement event 1818F can be triggered when a part of a plant is to be enhanced. This event can be scheduled in advance or in some cases triggered on demand. In response to detecting this event via the event detector component 1716, a plant enhancement event handler 1820F can cause the part of the plant that is to be enhanced to be moved to the virtualization environment of the fog server where the associated control systems can run on virtual machines and/or containers. The plant enhancement handler 1820F can also signal the orchestration components to work together to reconfigure or remediate the network environment and the security environment, and bring the part of the plant offline.

A power failure event 1818G can be triggered when power supply to an automation system is cut off. In response to such an event, a backup power system such as an uninterrupted power supply (UPS) is typically used to provide a clean and unbroken supply of power to keep the system fully operational for some time. The length of time that the system can be kept operational would depend on the size of the battery in the UPS. In some embodiments, the monitoring component 1712 can monitor the system and detect the power failure event. In some embodiments, the power failure event handler 1820F can determine or compute the length of time the system can stay operational based on the power requirements of the system and the capability of the UPS system. The power failure event handler 1820F can then, based on the operational time remaining, initiate shut down of processes and compute nodes starting with the non-critical ones so that the critical ones can run longer and may continue to run until power is restored.

A reporting event 1818H can be triggered by a user, or automatically based on predefined conditions such as whenever a security event occurs or whenever a security event is handled. A reporting event handler 1820H can handle a reporting event by gathering relevant data and generating a report based on the data. Such a report could include information such as event ID, type of event, component(s) that triggered the event, action(s) taken to mediate the event, and the like. Another example of a report that can be generated in response to a reporting event can be a report that includes a list of events of a certain type. For example, a report that lists all the cyber security events that occurred in a month on the system.

A process event 1818I is a type of event triggered by the processes running on the compute nodes. A process event can be generated when a process variable or measurement runs out of bounds or when an alarm is tripped indicating that the process is abnormal. In some embodiments, a process event handler 1820H can handle a process event by, for example, moving the guest component from one compute node to another, or from one host to another in the same compute node or another, changing the process type (e.g., from real time processing to batch processing), performing energy management (e.g., by consolidating processing into a few compute nodes to save energy), and the like. The response from the process handler 1820I can thus include reconfiguration of the hosts and/or guests, which can trigger reconfiguration of the cyber security environment and the network environment.

Another class of events that occur in the virtual and/or physical environment is a networking event 1818J. Examples of networking events can include but are not limited to: connectivity loss (e.g., connection point failure, infrastructure equipment failure) in the virtual and physical environment, congestion detection, path reconfiguration, and the like. These types of networking events can be detected by an event detection component (e.g., component 1726 of FIG. 17) and handled by a network event handler (e.g., network event handler 1820J). The network event handler, upon detecting a networking event indicating network failure of any type, can instantly reroute traffic through another network path as a response to the event.

9. Example Methodologies for Managing an SDA System

FIG. 21A is a logic flow diagram illustrating an example method of selecting a compute resource for deploying a virtualized instance/component in accordance with some embodiments. At block 2102, a compute node selection component (e.g., the compute node selection component 1714 of the host management system 1716 in FIG. 17) can identify compute resources that are available to potentially receive deployment of a virtualized component. In some embodiments, a compute resource can be a server machine, a personal computer, an embedded hardware, a human machine interface (HMI) module or an industrial controller. In some implementations, compute resources that are available can include at least one machine in a control room and at least one machine in a floor of a plant. The compute resources that are available need not be physically centralized, but can be physically distributed but monitored by the fog server controller.

At block 2104, the compute node selection component can select, based at least in part on any time sensitive processing and communication requirements of the virtualized component at run time, candidate compute resources from the available compute resources. In some embodiments, the candidate compute resources that are selected based on time sensitive processing and communication requirements of the virtualized component can be in physical proximity to a process or machine (e.g., in the floor of the plant) that the virtualized component controls.

At block 2106, the compute node selection component can select a compute resource from the candidate compute resources based on a set of rules that governs resource requirements of the virtualized component. In some embodiments, the selection can consider both the component (i.e., logical component or component image) and the virtualization technology associated with the component. In some embodiments, the set of rules that defines the resource requirements of the virtualized component includes at least one affinity rule that governs coexistence of two or more virtualized devices or applications on the same compute resource. Other examples of rules can include a rule that governs type of compute resources suitable for a virtualization technology associated with a component and a rule that governs networking capability required for devices or applications with time sensitive processing and communication needs.

At block 2108, the fog server controller can deploy the virtualized component on the selected compute resource. In some embodiments, the deploying the virtualized component on the selected compute resource can be in response to an event such as a fault event or a maintenance event or a request to provision the virtualized component on a compute resource. The fault event can be triggered by failure of a compute resource on which the virtualized component was deployed.

FIG. 21B is a logic flow diagram illustrating an example method of selecting a compute resource for deployment of a guest (e.g., application, image) in accordance with some embodiments. The example method can be performed by a compute node selection component (e.g., compute node selection component 1714 of the host management system 1716 in FIG. 17). The method includes identifying, by the compute node selection component, compute resources in an automation system that are available to potentially receive deployment of a guest at block 2110. In some embodiments, the compute resources that are available can be physically distributed but monitored by a system controller of the automation system. Non-limiting examples of compute resources include a server machine, a personal computer, a smart connected device, a human machine interface (HMI) module, an industrial controller, and the like.

At block 2112, the compute node selection component can assess constraints of the guest against a set of operational parameters to select a type of host for the guest. In some embodiments, the operational parameters can include one or more of: a process critical level, a time sensitive level, a cost of execution, a proximity critical level, cost performance, and the like. Based on the assessing, the compute node selection component can select a type of host for the guest at block 2114. In some embodiments, the type of cost can be a virtual machine, container or a bare metal. At block 2116, the compute node selection component can select, based on the type of host selected, the assessing, and attributes of the compute resources that are available, a compute resource for the guest. Some non-limiting examples of attributes of the compute resources include processing power, memory size, processor chip technology, operating system, CPU utilization level, NUMA neighbor number, and the like.

At block 2118, the compute node selection component can deploy a host of the type selected that is configured with the guest on the selected compute resource. In some embodiments, deployment of the host configured with the guest on the selected compute resource can be in response to a fault event, a maintenance event, a process event or a request to provision the guest on a compute resource. The fault event can be triggered by failure of a compute resource on which the guest was previously deployed for example. The process event can be triggered by a process variable running out of bounds for example.

FIG. 22 is a logic flow diagram illustrating an example method of managing an SDA system in accordance with a first embodiment. The example method includes monitoring by a monitoring component (e.g., monitoring component 1712 in FIG. 17) multiple compute nodes of the automation system at block 2202. In some embodiments, at least some of the multiple compute nodes host virtualization components (e.g., virtual machines, containers, baremetals) on which application functions are executed.

At block 2204, an event detection component (e.g., even detection component in FIG. 17) an event associated with a first compute node from the multiple compute nodes being monitored can be detected (e.g., via the event detection component 1726 in FIG. 17). In some embodiments, the first compute node can be an industrial automation device executing the one or more application functions and the second compute node can be a machine hosting at least one virtualization component on which the one or more application functions are executable. In various embodiments, the event associated with the first compute node being monitored can include a compute node fault event, a maintenance event or an upgrade event.

At block 2206, an event handling component (e.g., event handling component 1720 in FIG. 17) can respond to the event. The response to the event can be in response to user approval or automatic, without user intervention. For example, the event handling component can select a second compute node from the multiple compute nodes to take over execution of one or more application functions from the first compute node. In some embodiments, taking over of execution of the one or more application functions is via a bumpless transfer. The bumpless transfer can be facilitated by the second compute node that is a clone of the first compute node.

The event handling component can configure the second compute node to execute the one or more application functions at block 2208 and configure network environment of the automation system to complete control transfer from the first compute node to the second compute node at block 2210. In some embodiments, configuring the second compute node to execute the one or more application functions includes retrieving logic and state data relating to the one or more application functions from a storage node and utilizing the logic and state data to configure the second compute node to execute the one or more application functions.

In some embodiments, configuring the network environment of the automation system to complete control transfer from the first compute node to the second compute node includes configuring at least one physical or virtual network switch to allow inbound and outbound traffic associated with a control of a process or machine from the second compute node. In some other embodiments, configuring the network environment of the automation system to complete control transfer from the first compute node to the second compute node further includes configuring at least one physical or virtual network switch to block outbound traffic associated with the control of the process or machine from the first compute node. Prior to detecting the event associated with the second compute node, the network environment can be configured to propagate inputs from both the first and second compute nodes and output from only the first compute node.

FIG. 23 is a logic flow diagram illustrating an example method of detecting and handling a fault event in accordance with some embodiments.

The example method includes detecting, by an event detector component (e.g., event detection component 1718 in FIG. 17), an alarm associated with a fault event at block 2302. The fault event can be triggered by the failure of a compute node caused by power failure, host OS crashing, memory corruption, disk failure, management/data network failure, and the like. At block 2304, the event detector component can identify a compute node that is the source of the alarm as a failed node. At block 2306, the event detector component can send a notification of the alarm identifying the failed node and/or other information relating to the event and/or the failed node (e.g., associated application functions running on the failed node to a client device such as a tablet or HMI module. A user such as a plant operator can view the notification and approve the handling of the event by the automation system. At block 2308, an event handler (e.g., event handler 1720 in FIG. 17, compute node fault event handler 1820B in FIG. 18B) can receive the indication from the client device to handle the fault event. In alternative embodiments, the fault event can be handled automatically, without user approval or intervention.

In some embodiments, in response to receive the indication to handle the fault event (or upon detection of the event if no user approval is required), a provisioning component (e.g., provisioning component 1706 in FIG. 17) can create a virtualized instance to run the application functions of the failed node and associated virtual networks in a compute node at block 2310. At block 2312, the provisioning component can connect the virtualized instance to the virtual networks. Moreover, at block 2314 the network controller can configure the network infrastructure to direct traffic flows to the virtualized instance in the compute node instead of the failed node. At block 2316, the programming component can load the processes of the failed node on the virtualized instance.

In some embodiments, an elastic infrastructure of virtualized standby systems can be available. So, when the fault event needs to be handled, the fog server controller can select a virtual machine from a pool of virtual machines at block 2318 that can take over the failed node's processes, assuming all responsibilities and functions. In some embodiments, the pool of virtual machines can have virtual machines of different flavors (e.g., capabilities, OS versions, memory size, etc.) based on one or more criteria. Moreover, the pool of VMs may be generic, unconfigured VMs in some embodiments. At block 2320, the fog server controller can retrieve application logic and state data for processes of the failed node from a real time state database and load the application logic and state data on the selected virtual machine so that the virtual machine can over the processes of the failed node at block 2322.

Figure 24:
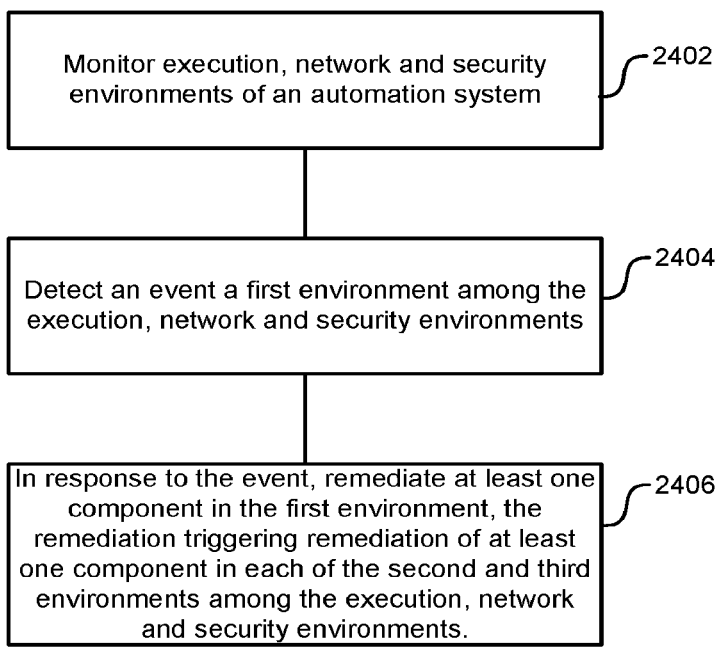
FIG. 24 is a logic flow diagram illustrating an example method of managing an automation system in accordance with a second embodiment.

FIG. 24 is a logic flow diagram illustrating an example method of managing an automation system in accordance with a second embodiment. The example method includes monitoring execution, network and security environments of an automation system (e.g., the SDA system) at block 2402, detecting an event in a first environment among the execution, network and security environments at block 2404 and in response to the detected event, remediating at least one component in the first environment, the remediating of the first environment creating a trigger to cause remediating of at least one component in each of a second and third environments among the execution, network and security environments at block 2406. For example, when the first environment is a security environment, then the event detected in the security environment is a security event. Reconfiguring the at least one component in the security environment can include partitioning network to isolate the component associated with the security event from the rest of the components of the automation system. In some embodiments, remediation of the security environment can be a response that does not require user intervention because security events are generally critical events that require immediate action to contain negative impacts such as data tampering or loss or loss of control of parts of a plant.

10. Computer Systemization

Figure 25:
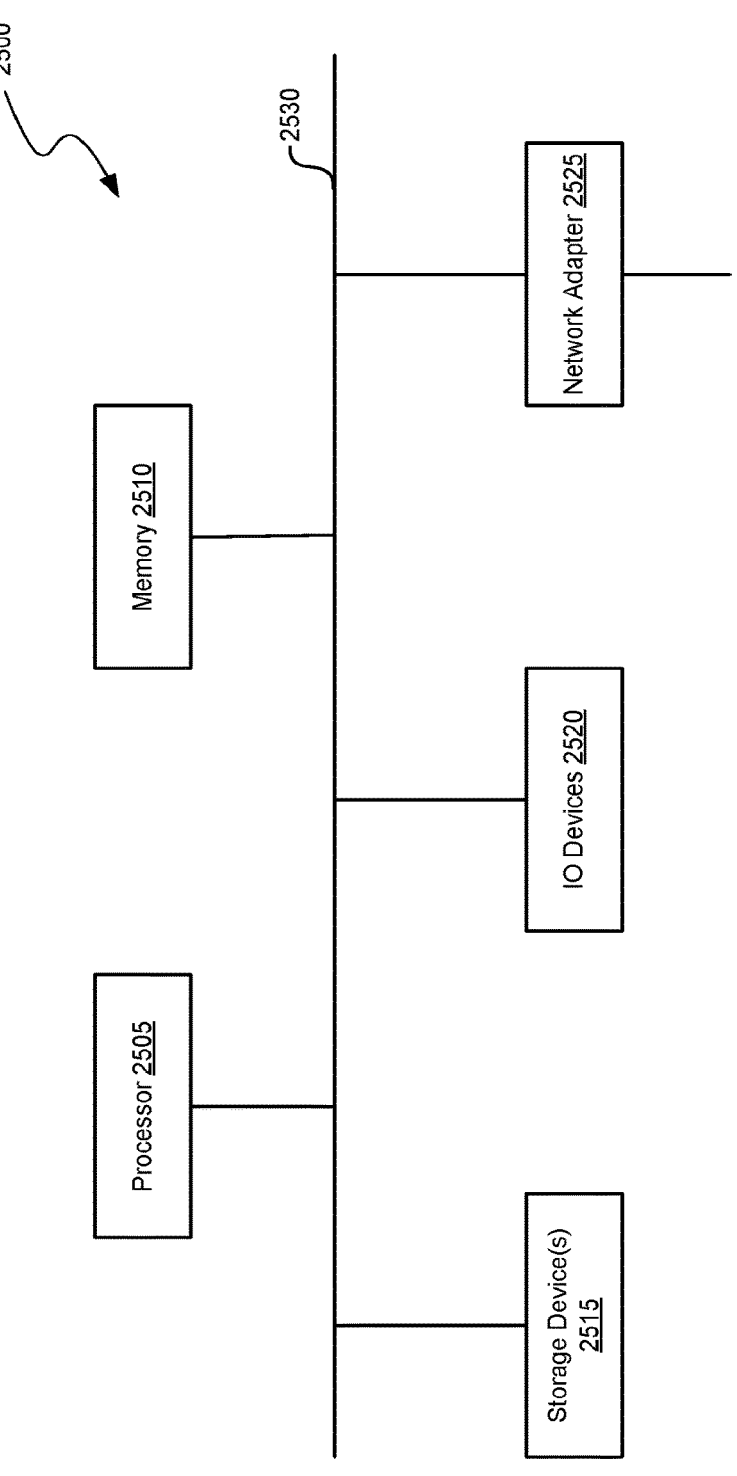
FIG. 25 shows a diagrammatic representation of a machine in the example form of a computer system within which a set of instructions, for causing the machine to perform any one or more of the methodologies discussed herein, may be executed.

FIG. 25 is a block diagram of an exemplary machine/computer/apparatus that may perform various operations, and store various information generated and/or used by such operations in accordance with some embodiments. The computer 2500 is intended to illustrate a hardware device on which any of the entities, components or services depicted in the examples of FIGS. 1-7B, 8A-11, 13B, 17-20 (and any other components described in this specification) and methodologies described in the examples of FIGS. 12-13A, 14-16B and 21A-24 can be implemented, such as a server, client devices, compute nodes, controller nodes (e.g., fog server controller (components 610, 810-x, 910, 1010, 1110, 1910, 2010), cyber security controller (e.g., components 655, 1155, 1955, 2055), network controller (e.g., components 690, 590A, 590B, 1190, 1990, 2090)), storage devices/nodes, databases, PLCs, PACs, and the like. The computer 2500 includes one or more processors 2505 and memory 2510 coupled to an interconnect. The interconnect can represent any one or more separate physical buses, point to point connections, or both connected by appropriate bridges, adapters, or controllers.

The processor(s) 2505 is/are the central processing unit(s) (CPU(s)) of the computer and, thus, control the overall operation of the computer. In certain embodiments, the processor(s) accomplish this by executing software or firmware stored in memory. The processor(s) may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2510 is or includes the main memory of the computer. The memory represents any form of random access memory (RAM), read-only memory (ROM), ternary content addressable memory (TCAM), flash memory, or the like, or a combination of such devices. In use, the memory may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) through the interconnect are a network adapter 2525, a storage device(s) 2515 and I/O device(s) 2520. The network adapter provides the computer with the ability to communicate with remote devices, over a network and may be, for example, an Ethernet adapter or Fibre Channel adapter or wireless radio. The network adapter may also provide the computer with the ability to communicate with other computers within the cluster. In some embodiments, the computer may use more than one network adapter to deal with the communications within and outside of the cluster separately.

The I/O device(s) can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory can be implemented as software and/or firmware to program the processor(s) to carry out actions described above. In certain embodiments, such software or firmware may be initially provided to the computer by downloading it from a remote system through the computer (e.g., via network adapter). In some embodiments, memory 2510 and the storage device(s) 2515 can be a single entity.

The components introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in the SDA system introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A computer can also be a server computer, a client computer, a personal computer (PC), a tablet PC, a laptop computer, a set-top box (STB), a personal digital assistant (PDA), a cellular telephone, a smart phone, a tablet, a phablet, a processor, a telephone, a web appliance, a network router, switch or bridge, a controller (e.g., PLC, PAC), or any machine capable of executing a set of instructions (sequential or otherwise) that specify actions to be taken by that machine.

A machine-accessible storage medium or a storage device(s) includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

11. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms.

Accordingly, the actual scope of the disclosure encompasses not only the disclosed embodiments, but also all equivalent ways of practicing or implementing the disclosure under the claims.

From the foregoing, it will be appreciated that specific embodiments of the disclosed system/technology have been described herein for purposes of illustration, but that various modifications may be made without deviating from the spirit and scope of the embodiments. Accordingly, the embodiments are not limited except as by the appended claims.

What is claimed is:

1. A method for provisioning and configuring a functional unit in a software-defined automation (SDA) system comprising:

receiving a request to add or create a functional unit in an SDA system;

authenticating the request based on at least one security policy;

identifying or creating at least one virtual network in one or more compute node managed by the SDA system;

creating and deploying a virtual instance of the functional unit in one or more compute nodes managed by the SDA system; and connecting the virtual instance of the functional unit to the at least one virtual network to provision the functional unit in the SDA system;

receiving configuration information;

determining at least one network path from the virtual instance of the functional unit to an automation device managed by the SDA system, the at least one network path traversing through the at least virtual network and a physical network;

configuring, based on the received configuration information, the virtual instance of the functional unit and one or more network components in the at least one network path to enable the virtual instance of the functional unit to communicate with the automation device to control an automated process.

2. The method of claim 1, wherein configuring the one or more network components includes implementing one or more network policies to specify how the one or more network components are to direct different types of traffic flows.

3. The method of claim 2, wherein the one or more network policies includes policies for controlling at least one of: connectivity, bandwidth, latency and traffic flow.

4. The method of claim 1, wherein configuring the virtual instance of the functional unit further comprises configuring security of the virtual instance of the functional unit by implementing one or more security policies.

5. The method of claim 4, wherein in accordance with a security policy, configuring the security of the virtual instance of the functional unit includes creating a virtual instance of a security protection system on one or more compute nodes managed by the SDA system.

6. The method of claim 4, wherein configuring the security of the virtual instance of the functional unit further comprises configuring the security of one or more hosts on which the functional unit is executing, and the one or more compute nodes on which the one or more hosts are executing.

7. The method of claim 6, wherein in accordance with a security policy, validating an image of each of the one or more hosts on which the functional unit is executing.

8. The method of claim 6, wherein a host from the one or more hosts is one of a virtual machine, a container or a bare metal.

9. The method of claim 1, wherein receiving the request to add or create the functional unit in the SDA system further comprises receiving via a user interface a selection of a functional unit template from a functional unit template library, wherein the virtual instance of the functional unit is created from the selected functional unit template.

10. The method of claim 9, further comprising parameterizing the selected functional unit template by defining an instance identity, input/output connectivity and security profile.

11. The method of claim 1, wherein the virtual instance of the functional unit corresponds comprises two or more automation system components.

12. The method of claim 1, wherein a compute node in the one or more compute nodes is one of an automation controller, a server, a personal computer or a smart connected device.

13. A software-defined automation (SDA) system comprising: a plurality of controllers and one or more compute nodes, wherein the plurality of controllers are communicatively coupled to the one or more compute nodes over a communication network, wherein the plurality of controllers are configured to work in coordination with one another to:

receive a request to add or create a functional unit in the SDA system; authenticate the request based on at least one security policy;

identify or creating at least one virtual network in one or more compute nodes managed by the SDA system;

create and deploy a virtual instance of the functional unit in one or more compute nodes managed by the SDA system; and connect the virtual instance of the functional unit to the at least one virtual network to provision the functional unit in the SDA system;

receive configuration information;

determine at least one network path from the virtual instance of the functional unit to an automation device managed by the SDA system, the at least one network path traversing through the at least virtual network and a physical network;

configure, based on the received configuration information, the virtual instance of the functional unit and one or more network components in the at least one network path to enable the virtual instance of the functional unit to communicate with the automation device to control an automated process.

14. The system of claim 13, wherein the plurality of controllers include a system controller, a network controller and a cybersecurity controller.

15. Non-transitory, computer-readable media comprising software instructions for provisioning and configuring a functional unit in a software-defined automation (SDA) system by:

receiving a request to add or create a functional unit in an SDA system;

authenticating the request based on at least one security policy;

identifying or creating at least one virtual network in one or more compute nodes managed by the SDA system;

creating and deploying a virtual instance of the functional unit in one or more compute nodes managed by the SDA system; and connecting the virtual instance of the functional unit to the at least one virtual network to provision the functional unit in the SDA system;

receiving configuration information;

determining at least one network path from the virtual instance of the functional unit to an automation device managed by the SDA system, the at least one network path traversing through the at least virtual network and a physical network;

configuring, based on the received configuration information, the virtual instance of the functional unit and one or more network components in the at least one network path to enable the virtual instance of the functional unit to communicate with the automation device to control an automated process.

16. The non-transitory, computer-readable media of claim 15, wherein configuring the one or more network components includes implementing one or more network policies to specify how the one or more network components are to direct different types of traffic flows.

17. The non-transitory, computer-readable media of claim 16, wherein the one or more network policies includes policies for controlling at least one of: connectivity, bandwidth, latency and traffic flow.

18. The non-transitory, computer-readable media of claim 15, wherein configuring the virtual instance of the functional unit further comprises configuring security of the virtual instance of the functional unit by implementing one or more security policies.

19. The non-transitory, computer-readable media of claim 18, wherein in accordance with a security policy, configuring the security of the virtual instance of the functional unit includes creating a virtual instance of a security protection system on one or more compute nodes managed by the SDA system.

20. The non-transitory, computer-readable media of claim 18, wherein configuring the security of the virtual instance of the functional unit further comprises configuring the security of one or more hosts on which the functional unit is executing, and the one or more compute nodes on which the one or more hosts are executing.

21. The non-transitory, computer-readable media of claim 20, wherein in accordance with a security policy, validating an image of each of the one or more hosts on which the functional unit is executing.

22. The non-transitory, computer-readable media of claim 20, wherein a host from the one or more hosts is one of a virtual machine, a container or a bare metal.

23. The non-transitory, computer-readable media of claim 15, wherein receiving the request to add or create the functional unit in the SDA system further comprises receiving via a user interface a selection of a functional unit template from a functional unit template library, wherein the virtual instance of the functional unit is created from the selected functional unit template.

24. The non-transitory, computer-readable media of claim 23, further comprising parameterizing the selected functional unit template by defining an instance identity, input/output connectivity and security profile.

25. The non-transitory, computer-readable media of claim 15, wherein the virtual instance of the functional unit corresponds comprises two or more automation system components.

26. The non-transitory, computer-readable media of claim 15, wherein a compute node in the one or more compute nodes is one of an automation controller, a server, a personal computer or a smart connected device.

* * * * *